(12) United States Patent
Yamakita et al.

(10) Patent No.: US 7,495,821 B2
(45) Date of Patent: Feb. 24, 2009

(54) DISPLAY DEVICE AND METHOD OF PREPARING PARTICLES FOR USE IN IMAGE DISPLAY OF A DISPLAY DEVICE

(75) Inventors: Hiroyuki Yamakita, Osaka (JP); Toshiyasu Oue, Nara (JP); Naohide Wakita, Suita (JP); Mariko Kawaguri, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 790 days.

(21) Appl. No.: 10/695,669

(22) Filed: Oct. 29, 2003

(65) Prior Publication Data

US 2004/0150325 A1    Aug. 5, 2004

(30) Foreign Application Priority Data

| Oct. 29, 2002 | (JP) | ............................. 2002-314005 |
| Oct. 29, 2002 | (JP) | ............................. 2002-314453 |
| Oct. 31, 2002 | (JP) | ............................. 2002-318194 |
| Feb. 7, 2003  | (JP) | ............................. 2003-031218 |

(51) Int. Cl.
*G02B 26/00* (2006.01)

(52) U.S. Cl. ........................ 359/296; 359/290; 359/295

(58) Field of Classification Search ................ 359/290, 359/291, 292, 295, 296, 298
See application file for complete search history.

(56) References Cited

U.S. PATENT DOCUMENTS 4,837,249 A * 6/1989 O'Mara et al. ............... 523/175

(Continued)

FOREIGN PATENT DOCUMENTS

JP    1-114829    5/1989

(Continued)

OTHER PUBLICATIONS

R. Hattori et al., "Electrophoretic Display Capable With High-Reflectivity and High-Contrast", The Institute of Electronics, Information and Communication Engineers, Technical Report of IEICE., EID2000-284 (2001-01), pp. 121-125.

(Continued)

*Primary Examiner*—Ricky Mack
*Assistant Examiner*—Brandi N Thomas
(74) *Attorney, Agent, or Firm*—McDermott Will & Emery LLP

(57) ABSTRACT

A thin display device is provided which is capable of displaying images at a lowered driving voltage in a shortened response time by causing fine particles to travel in a gaseous phase. The display device includes: a display section having upper substrate 1 and lower substrate 2 each having a thickness ranging from about 0.1 mm to about 0.5 mm, which are disposed opposite to each other; colored particles 6 having a particle diameter ranging from about 1 μm to about 10 μm packed in an air layer 7 provided in the gap between the upper substrate 1 and the lower substrate 2; and first electrode 3 and second electrode 4 formed on the underside of the upper substrate 1. The colored particles 6 used in the display device are electrostatically charged either negatively or positively and are caused to travel between the first electrode 3 and the second electrode 4 in accordance with voltage applied to the first and second electrodes 3 and 4.

12 Claims, 32 Drawing Sheets

U.S. PATENT DOCUMENTS

| | | | |
|---|---|---|---|
| 5,965,064 A * | 10/1999 | Yamada et al. | 252/512 |
| 6,266,118 B1 | 7/2001 | Lee et al. | |
| 6,741,387 B2 * | 5/2004 | Shigehiro et al. | 359/296 |
| 6,777,872 B2 * | 8/2004 | Aoki et al. | 313/582 |

FOREIGN PATENT DOCUMENTS

| | | |
|---|---|---|
| JP | 2-24633 | 1/1990 |
| JP | 5-61058 | 3/1993 |
| JP | 6-51301 | 2/1994 |
| JP | 10-154603 * | 9/1998 |
| JP | 11-202804 | 7/1999 |
| JP | 2000-56341 | 2/2000 |
| JP | 2000-227612 | 8/2000 |
| JP | 2001-174853 A | 6/2001 |
| JP | 2001-290178 | 10/2001 |
| JP | P2001-312225 | 11/2001 |
| JP | 2002-72256 A | 3/2002 |
| JP | P2002-72256 | 3/2002 |
| JP | 2002-169191 A | 6/2002 |
| JP | 2002-311461 A | 10/2002 |
| WO | WO 02/073304 A2 | 9/2002 |

OTHER PUBLICATIONS

Chinese Office Action issued in corresponding Chinese Patent Application No. 2003101033451, dated Aug. 11, 2006.

Partial European Search Report issued in corresponding European Patent Application No. EP 03256815.6-1228, dated Jun. 11, 2006.

European Search Report issued in corresponding European Patent Application No. EP 03 25 6815, dated Mar. 28, 2007.

* cited by examiner

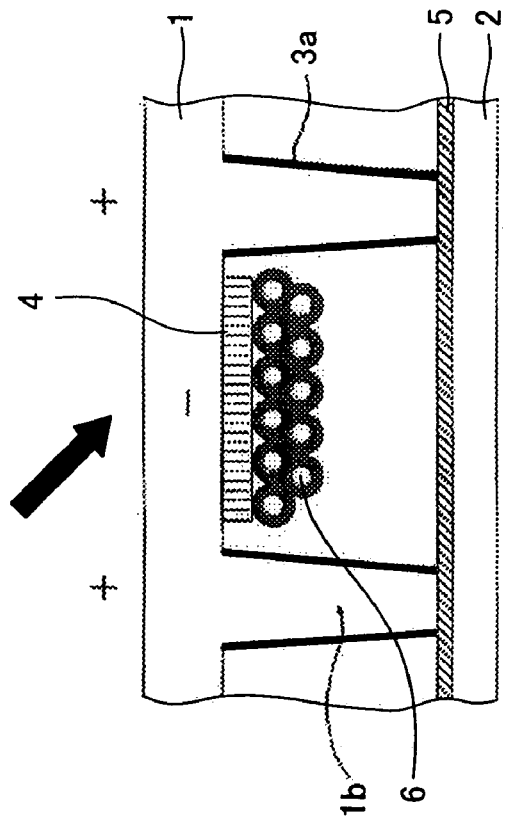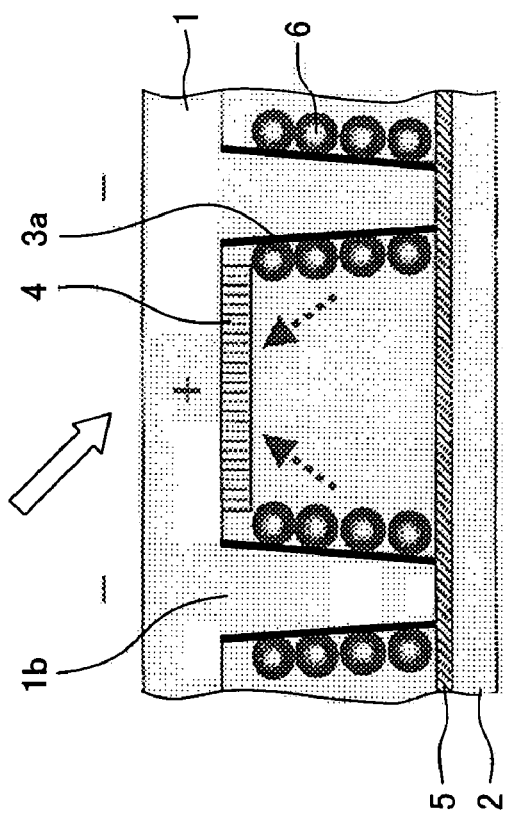
FIG. 11A
FIG. 11B

DISPLAY DEVICE AND METHOD OF PREPARING PARTICLES FOR USE IN IMAGE DISPLAY OF A DISPLAY DEVICE

BACKGROUND OF THE INVENTION

1. Field of the Invention

The present invention relates to display devices for displaying images and, more particularly, to a thin flexible display device adapted to display images utilizing travel of fine particles in a gaseous phase between electrodes.

2. Description of the Related Art

Recently, an electrophoretic display device has been proposed which is designed to display images based on migration of electrophoretically migratory particles between a pair of opposite electrodes in a liquid phase provided between the electrodes (see patent document 1 for example). Since such an electrophoretic display device uses fine particles to display images, the display device can have a thin and flexible structure.

Such an electrophoretic display device, however, involves a problem of low responsiveness due to high resistance of the liquid to migration of migratory particles in the liquid phase. With a view to improving the response speed, there has been proposed a display device designed to display images by causing particles to travel in a gaseous phase provided between a pair of opposite electrodes. Such a display device in which particles travel in a gaseous phase can offer a higher response speed than the electrophoretic display device. Presently, the response speed of particles in the electrophoretic display device is about 100 msec, whereas that of particles in a display device of the type utilizing travel of the particles in a gaseous phase is 1 msec or less.

Examples of display devices of the type utilizing travel of particles in a gaseous phase for displaying images as described above include devices disclosed in patent documents 2 and 3. FIG. 1A is a schematic view illustrating the construction of the prior art display device disclosed in patent document 2 and the black display operation of the prior art display device, while FIG. 1B is a schematic view illustrating the construction of the same prior art display device and the white display operation thereof. As shown in FIGS. 1A and 1B, the prior art display device includes an image display medium having a first substrate allowing light to pass therethrough disposed on the viewer side, and a second substrate 21 disposed opposite to the first substrate 20. The first and second substrates 20 and 21 have their respective inner surfaces each formed with electrode 22 or 23 and charge transport layer 24 or 25 sequentially. Positively charged black particles 26 and negatively charged white particles 27 are encapsulated in the space between the first substrate 20 and the second substrate 21.

In the prior art display device thus constructed, voltage is applied across the electrodes 22 and 23 in accordance with an image to be displayed. Here, a voltage applied in the black display operation and that applied in the white display operation have opposite polarities. Referring first to FIG. 1A, description is made of the black display operation of the prior art display device. First, a voltage is applied across the electrodes 22 and 23 from an electric power source, so that the electrodes 22 and 23 become a negative electrode and a positive electrode, respectively. An electric field resulting between the electrodes 22 and 23 causes black particles 26 and white particles 27 present between the electrodes 22 and 23 to travel in respective directions by Coulomb force. In this case, positively charged black particles 26 travel toward the negative electrode 22, whereas negatively charged white particles 27 travel toward the positive electrode 23. In this way, black particles 26 are collected on the first substrate 20 side, while white particles 27 collected on the second substrate 21 side. In this state, when the viewer views the display device from the first substrate 20 side, black display is observed. In the white display operation, on the other hand, the electrodes 22 and 23 are applied with a voltage having a polarity opposite to the polarity of the voltage applied in the black display operation, as shown in FIG. 1B, whereby the electrode 22 and the electrode 23 become a positive electrode and a negative electrode, respectively. In this case, positively charged black particles 26 travel toward the negative electrode 23, whereas negatively charged white particles 27 travel toward the positive electrode 22. In this way, black particles 26 are collected on the second substrate 21 side, while white particles 27 collected on the first substrate 20 side. In this state, when the viewer views the display device from the first substrate 20 side, white display is observed. The principle described above makes it possible to display a desired image.

Non-patent document 1 discloses a display device as described below. FIG. 2A illustrates the sectional structure of one pixel portion of the electrophoretic display device disclosed in non-patent document 1 in the white display operation, while FIG. 2B illustrate the sectional structure of the same pixel portion in the black display operation. As shown in FIGS. 2A and 2B, a first substrate 28 allowing light to pass therethrough located on the viewer side and a second substrate 29 are disposed opposite to each other. The first substrate 28 has a concave curved surface on the side facing the second substrate 29 and hence functions as a concave lens. An electrode 34 allowing light to pass therethrough is formed on the first substrate 28 conformally to the concave curved surface. On the other hand, the second substrate 29 has a flat surface on the side facing the first substrate 28, the flat surface being formed with a rectangular electrode 31 in a predetermined region thereof. A black-colored wall 30 is formed on the second substrate 29 so as to surround the electrode 31. A transparent solution 33 is encapsulated in the space defined by the concave curved surface of the first substrate 29 and the colored wall 30. In the solution 33 are dispersed white migratory particles (hereinafter referred to as "white particles 32") charged either positively or negatively.

The displaying operation of the electrophoretic display device thus constructed is described below. When a voltage is applied across the electrodes 31 and 34, white particles 32 migrate in the transparent solution 33 by Coulomb force. In the white display operation, white particles 32 migrate toward the electrode 34 to cover the concave curved surface side of the first substrate 28, as shown in FIG. 2A. In the black display operation, on the other hand, white particles 32 migrate toward the second substrate 29 and adhere to the surface of the electrode 31, as shown in FIG. 2B. In the latter case, light becoming incident on the device from the first substrate 28 side is refracted and scattered by the concave curved surface of the first substrate 28 functioning as a concave lens, thereby to illuminate the surface of the colored wall 30 selectively. Thus, the color of a region of the colored wall 30 illuminated with light (black in this case) participates in display, whereas white particles 32 adhering to the electrode 31 not illuminated with light fail to participate in display. In such a construction, since a single kind of particles 32 migrate in the transparent solution 33, particles 32 can migrate without obstruction by other kind of particles, hence, rapidly. Accordingly, the response speed can be improved. Further, since the inner surface of the first substrate 28 serves as a concave lens as described above, the electrode 31 to which white particles 32 are adhering can be shown smaller in the black display state. Therefore, the device can offer improved contrast.

List of Reference Documents

Patent document 1: Japanese Patent Laid-Open Publication No. HEI 11-202804;
Patent document 2: Japanese Patent Laid-Open Publication No. 2001-312225;
Patent document 3: Japanese Patent Laid-Open Publication No. 2002-72256; and
Non-patent document 1: Reiji Hattori and two others, "ELECTROPHORETIC DISPLAY CAPABLE OF HIGH REFLECTANCE AND HIGH CONTRAST DISPLAY", The Institute of Electronics, Information and Communication Engineers, Technical Report of IEICE., EID2000-284 (2001-01), p. 123 (FIG. 3)

In the case of the aforementioned prior art display device disclosed in patent document 2, however, a voltage of about 50 V need be applied across the electrodes 22 and 23 in order to initiate travel of the two kinds of color particles 26 and 27. Further, a voltage of about 200 to about 300 V need be applied to cause almost all color particles 26, 27 to travel for display of a black or white color. In the case of the aforementioned electrophoretic display device, in contrast, a driving voltage of 100 V or lower is sufficient to display a white or black color. Thus, display devices of the type causing particles to travel in a gaseous phase require higher driving voltages and hence have a difficulty in power saving.

Since the aforementioned prior art display device uses the two kinds of colored particles 26 and 27 having different polarities, black particles 26 and white particles 27 are caused to travel in opposite directions toward the respective electrodes 22 and 23 having different polarities by Coulomb force. For this reason, particles of one kind obstruct travel of particles of the other kind. Accordingly, the prior art display device involves another problem that a time period from the application of voltage across the electrodes 22 and 23 until a desired image is displayed, namely, response time is long.

As compared to electrophoretic display devices designed to display images by causing particles to migrate in liquid phase, display devices designed to display images by causing particles to travel in gaseous phase allow particles to contact directly to each other with a high probability and, hence, frictional force between particles and the fluidity of particles greatly influence the display characteristics of the device such as the value of driving voltage, response time, and contrast.

In the case of the electrophoretic display device disclosed in non-patent document 1, particles 32 migrate in the solution 33 and, hence, the mobility of the particles 32 is low. Therefore, the electrophoretic display device suffers a problem of insufficient response speed of display in response to an image signal. Particularly, a motion picture is difficult for the electrophoretic display device to display because of insufficient response speed of particles 32. Further, since particles 32 adhering to the electrode 31 after migration in the solution 33 are likely to migrate in response to a very low voltage (that is, the threshold level of voltage for causing migration of particles 32 is low), there arises a problem that migration of particles 32 occurs even in response to crosstalk voltage or the like. For this reason, the electrophoretic display device is difficult to have a simple-matrix drive configuration.

In the case of the aforementioned prior art display device, behavior of particles used therein is unstable, which results in a problem that the device cannot obtain satisfactory gray scale characteristics.

If toner particles for conventional electrophotography, which have an electrostatic property, are used in the aforementioned prior art display device, such particles are susceptible to ambient conditions such as humidity. When the humidity becomes high, the amount of electrostatic charge carried by the toner particles decreases, which causes a display failure to occur.

Further, in the case where colored particles are used to display a black-and-white image or a color image, the reflectance or chromaticity characteristic of resulting display is insufficient.

The present invention has been made in view of the foregoing circumstances. Accordingly, it is an object of the present invention to provide a display device which can be driven at a lowered driving voltage while realizing a shortened response time.

Another object of the present invention is to provide a display device which is capable of image display of good quality with improved contrast.

Yet another object of the present invention is to provide a display device which is highly reliable and capable of realizing excellent characteristics in reflectance, contrast and chromaticity.

SUMMARY OF THE INVENTION

With a view to solving the foregoing problems, the present invention provides a display device comprising: a pair of substrates disposed opposite to each other, at least one of which is transparent; a plurality of particles electrostatically charged to have a same polarity and contained in a gaseous phase provided between the pair of substrates; first and second electrodes provided for each of pixels arranged in a matrix for driving the particles; and a voltage applying portion for applying voltage to the first and second electrodes in accordance with an image signal, wherein when voltage is applied to the first and second electrodes by the voltage applying portion, the particles are caused to travel between the first and second electrodes in accordance with the voltage applied so as to display an image corresponding to the image signal.

In the display device of the present invention, preferably, the first and second electrodes are formed at one of the substrates.

In the display device of the present invention, preferably, the first and second electrodes are formed at one of the substrates which is transparent, one of the first and second electrodes being transparent.

In the display device of the present invention, preferably, the first and second electrodes are formed at respective of the substrates.

In the display device of the present invention, preferably, at least one of the first and second electrodes is formed as depressed or projecting in a direction perpendicular to the substrates.

In the display device of the present invention, preferably, the first electrode or the second electrode is formed at one of the substrates as projecting in a direction perpendicular to the substrates, the projecting one of the electrodes retaining a gap between the substrates.

In the display device of the present invention, preferably, the first electrode or the second electrode is formed at one of the substrates as projecting in a direction perpendicular to the substrates, the projecting one of the electrodes separating one or plural pixels from other pixels.

In the display device of the present invention, preferably, at least one of the first and second electrodes comprises a transparent electrical conductor.

Preferably, the display device of the present invention further comprises a third electrode provided for each of the pixels arranged in the matrix for driving the particles, the third electrode being configured so as to be applied with voltage in accordance with the image signal by the voltage applying portion, wherein: the first and second electrodes are each a comb-shaped electrode having plural comb tooth portions formed from a transparent electrical conductor, the comb tooth portions of the first electrode and the comb tooth portions of the second electrode being arranged to mesh with each other; and when voltage is applied to the first, second and third electrodes by the voltage applying portion, the particles are caused to travel between the first, second and third electrodes in accordance with the voltage applied so as to display an image corresponding to the image signal.

In the display device of the present invention, preferably, a comb tooth portion of the first electrode and a comb tooth portion of the second electrode which are positioned adjacent to each other define therebetween a spacing not less than 3 µm and not more than 5 µm.

In the display device of the present invention, preferably, the voltage applying portion is configured to alternately apply voltages of different polarities to the first and second electrodes.

In the display device of the present invention, preferably, the particles have a particle diameter not less than 1 µm and not more than 10 µm.

In the display device of the present invention, preferably, each of the pixels is provided with an active element configured to be on/off controlled to apply voltage to the first electrode or the second electrode pixel by pixel.

In the display device of the present invention, preferably, the active element comprises an organic semiconductor layer.

Preferably, the display device of the present invention has a passive-matrix drive configuration.

In the display device of the present invention, preferably, the substrates each comprise a resin film having a thickness not less than 0.1 mm and not more than 0.5 mm.

According to the present invention, there is also provided a display device comprising: a pair of substrates disposed opposite to each other, at least one of which is transparent; a plurality of electrostatically charged particles contained in a gaseous phase provided between the pair of substrates; first and second electrodes provided for each of pixels arranged in a matrix; a colored surface located adjacent the first electrode or the second electrode, the colored surface showing a color different from a color of the particles; a lens formed at on one of the substrates for condensing or scattering light passing through the gaseous phase from outside of the substrates so as to illuminate the colored surface with condensed or scattered light; a voltage applying portion for applying voltage to the first and second electrodes in accordance with an image signal, wherein when voltage is applied to the first and second electrodes by the voltage applying portion, the particles are caused to travel between the first and second electrodes in accordance with the voltage applied so as to display an image corresponding to the image signal.

In the display device of the present invention, it is preferable that: each of the pixel is capable of providing display including at least first and second display states; in the first display state the colored surface is covered with the particles having traveled in accordance with the voltage applied across the first and second electrodes; and in the second display state the colored surface is exposed by the particles having traveled in accordance with the voltage applied across the first and second electrodes.

Such a construction is capable of selectively illuminating the colored surface with incident light by means of the lens. For this reason, in the first display state where the colored surface side is covered with the colored particles, a display of good quality based on the color of the colored particles is realized. In the second display state, on the other hand, since the particles have traveled into a region that can hardly be illuminated with light, hence can hardly influence the display, the colored particles are removed from the colored surface participating in display, thereby realizing a display of good quality based on the color of the colored surface. Thus, good display quality is ensured in both of the first and second display states, which results in improved contrast.

In this construction a single kind of colored particles travel in the gaseous phase and, hence, there is no possibility that one kind of colored particles obstruct the travel of the other kind of colored particles as in the prior art device employing plural kinds of particles. It is therefore possible to cause the colored particles to travel rapidly and efficiently. Accordingly, in the first display state the colored surface can be covered with the particles tightly without void by causing the particles to travel efficiently, while in the second display state, on the other hand, the colored particles can be removed from the colored surface by causing the particles to travel efficiently. Since this construction causes the colored particles to travel in the gaseous phase, the colored particles can travel more rapidly than particles traveling in a liquid phase. This means that this construction offers improved response speed in relation to display and requires lower driving voltage.

Further, the above-described construction causing the colored particles to travel in the gaseous phase space is higher in threshold voltage at which the colored particles are allowed to travel than the case where particles are caused to travel in a liquid phase space. For this reason, it is possible to inhibit travel of the colored particles in response to crosstalk voltage or the like.

In the display device of the present invention, preferably, the lens is formed at a first one of the substrates which is transparent, while the first and second electrodes formed at a second one of the substrates which is opposite to the second substrate.

With such a feature, light incident on the device through the first substrate is condensed or scattered by the lens to illuminate the colored surface selectively.

The display device of the present invention may have an active-matrix drive configuration.

In such a configuration, an active-matrix element (for example, TFT as a switching element) is provided for each of the pixels and, hence, on/off control can be performed over each pixel individually. This configuration is suitable for display requiring high-speed response such as motion picture display.

Alternatively, the display device of the present invention may have a passive-matrix drive configuration.

The display device having such a configuration also has a high threshold voltage at which the colored particles are allowed to travel. For this reason, it is possible to inhibit travel of the colored particles in response to crosstalk voltage or the like, thereby to realize display of good quality. This configuration is particularly suitable for applications not requiring such high-speed response as required by motion picture display, for example, an application where a newspaper is displayed by means of a paper display.

In the display device of the present invention, preferably, the second substrate has an uneven surface on a gaseous phase side, the second electrode being located at a depressed portion of the uneven surface of the second substrate, the first electrode and the colored surface being located at a projecting portion of the uneven surface of the second substrate.

With such a feature, in the second display state the colored particles travel toward the second electrode located at the depressed portion of the second substrate and become accommodated in the depressed portion. Therefore, the colored particles adhering to the colored surface in the first display state can be removed from the colored surface by being collected into the depressed portion quickly and efficiently. As a result, the influence of the colored particles in the second display state can be further reduced, which makes it possible to realize much better contrast. Further, the first and second electrodes located at the uneven surface of the second substrate are capable of causing the colored particles to travel therebetween more rapidly and efficiently than in the case where all the colored particles dispersed on a flat surface are caused to travel between electrodes. For this reason, the driving voltage can be lowered.

In the display device of the present invention, it is preferable that: the projecting portion of the uneven surface of the second substrate is formed into a matrix pattern, while the depressed portion of the uneven surface is formed into a lattice pattern circumscribing the projecting portion; and the second electrode is comb-shaped and located at the depressed portion.

With such an arrangement, the area of the second electrode to which the colored particles adhere in the second display state is enlarged, while at the same time the space defined by the depressed portion for accommodating the colored particles is also enlarged. Thus, the colored particles can be removed from the colored surface more completely and caused to take refuge efficiently into a region that fails to participate in display. Therefore, a further improvement in contrast can be made.

In the display device of the present invention, it is preferable that the projecting portion of the uneven surface of the second substrate has a top portion reaching the first substrate; and the first electrode and the colored surface are located at a surface of the projecting portion excluding the top portion.

In such an arrangement, the projecting portion supports the first and second substrates disposed opposite to each other with the gaseous phase space intervening therebetween and, hence, the gaseous phase space can be retained without the need to provide a separate support member. Further, the gaseous phase space is partitioned into gaseous phase space sections with the projecting portion, thereby preventing the colored particles from traveling from one gaseous phase space section into an adjacent one or the like. Therefore, it is possible to prevent colored particles from aggregating in a specific region as well as to keep constant the amount of colored particles encapsulated in each of the individual gaseous phase space sections which are independent of each other. Accordingly, the occurrence of display irregularities can be obviated.

In the display device of the present invention, preferably, the lens formed at the first substrate has a concave curved surface.

This feature allows light incident from the first substrate side to be refracted and scattered by the lens, thereby illuminating the colored surface with light selectively. The colored surface thus illuminated with light becomes a region participating in display and the display state is changed based on whether or not that region is covered with colored particles. Colored particles collected on the second electrode side which is not illuminated with light in the second display state can hardly influence the display. For this reason, colored particles having traveled toward the second electrode located at the depressed portion of the second substrate are not observed in the second display state.

In the display device of the present invention, preferably, the colored surface is located at a surface of the projecting portion, while the first electrode comprises a transparent electrical conductor and is located on the colored surface.

With such an arrangement, the colored particles adhere to the surface of the first electrode in the first display state and, accordingly, the colored surface located under the first electrode is covered up. In the second display state, on the other hand, the colored particles adhering to the first electrode are removed away and, hence, the color of the colored surface under the first electrode can be observed through the first electrode which is transparent. Since this arrangement allows the viewer to observe the colored surface through the first electrode in the second display state, the first electrode needs to be transparent.

In the display device of the present invention, preferably, the first electrode comprises a transparent or opaque electrical conductor and is located at a surface of the projecting portion, while the colored surface is located at a surface of the first electrode.

With such an arrangement, colored particles travel toward the first electrode and then adhere to the colored surface located on the upper side of the first electrode to cover up the colored surface in the first display state. In the second display state, on the other hand, the colored particles adhering to the colored surface are removed away and, hence, the color of the colored surface can be observed. In this way, the colored surface located on the upper side of the first electrode can be observed directly in the second display state and, therefore, no inconvenience occurs if the first electrode is opaque.

In the display device of the present invention, preferably, the colored particles have a particle diameter not less than 1 µm and not more than 10 µm.

With such a feature, the colored particles can travel between the first and second substrate rapidly and efficiently. Further, the colored particles can cover up the colored surface tightly without void in the first display state and can take refuge toward the second electrode so as not influence the display in the second display state. In addition, the particles are prevented from aggregating during their travel.

In the display device of the present invention, preferably, the first and second substrates each comprise a resin substrate having a thickness not more than 0.5 mm.

With such a feature, the display device can be made thin, light and flexible. Such a display device is particularly suitable as electronic paper which can be used as a substitute for paper, or the like.

In the display device of the present invention, preferably, the first electrode or the second electrode is connected to an active element used in the active-matrix drive configuration for active matrix drive, the active element comprising an organic semiconductor layer.

With such an arrangement, on/off control can be performed on a pixel-by-pixel basis, thereby realizing active-matrix drive. Here, since the semiconductor layer of the active element is formed of an organic semiconductor, the flexibility of the display device is not impaired by the provision of the active element.

According to the present invention, there is also provided a display device comprising: a pair of substrates disposed opposite to each other, at least one of which is transparent; a plurality of particles having an electrostatic property contained in a gaseous phase provided between the pair of substrates; first, second and third electrodes provided for each of pixels arranged in a matrix for driving the particles; and a voltage applying portion for applying voltage to the first, second and third electrodes in accordance with an image signal, wherein: the first electrode and the second electrode are disposed at one of the substrates, while the third electrode disposed at the other substrate; and when voltage is applied to the first, second and third electrodes by the voltage applying portion, the particles are caused to travel between the first, second and third electrodes in accordance with the voltage applied so as to display an image corresponding to the image signal.

According to the present invention, there is also provided a display device comprising: a pair of substrates disposed opposite to each other, at least one of which is transparent; a plurality of particles having an electrostatic property contained in a gaseous phase provided between the pair of substrates; first and second electrodes provided for each of pixels arranged in a matrix for driving the particles; and a voltage applying portion for applying voltage to the first and second electrodes in accordance with an image signal, wherein: the first electrode and the second electrode are disposed to have a spacing therebetween which varies for every three or more adjacent pixels; and when voltage is applied to the first and second electrodes by the voltage applying portion, the particles are caused to travel between the first and second electrodes in accordance with the voltage applied so as to display an image corresponding to the image signal in display units each consisting of three or more adjacent pixels.

According to the present invention, there is also provided a display device comprising: a pair of substrates disposed opposite to each other, at least one of which is transparent; a plurality of particles having an electrostatic property contained in a gaseous phase provided between the pair of substrates; first and second electrodes provided for each of pixels arranged in a matrix for driving the particles; and a voltage applying portion for applying voltage to the first and second electrodes in accordance with an image signal, wherein: the first electrode and the second electrode have respective widths which vary for every three or more adjacent pixels; and when voltage is applied to the first and second electrodes by the voltage applying portion, the particles are caused to travel between the first and second electrodes in accordance with the voltage applied so as to display an image corresponding to the image signal in display units each consisting of three or more adjacent pixels.

According to the present invention, there is also provided a display device comprising: a pair of substrates disposed opposite to each other, at least one of which is transparent; a plurality of particles having an electrostatic property contained in a gaseous phase provided between the pair of substrates; first and second electrodes provided for each of pixels arranged in a matrix for driving the particles; and a voltage applying portion for applying voltage to the first and second electrodes in accordance with an image signal, wherein: the particles have an average particle diameter which varies for every three or more adjacent pixels; and when voltage is applied to the first and second electrodes by the voltage applying portion, the particles are caused to travel between the first and second electrodes in accordance with the voltage applied so as to display an image corresponding to the image signal in display units each consisting of three or more adjacent pixels.

In the display device of the present invention, preferably, the plurality of particles have an average particle diameter not less than 1 μm and not more than 10 μm.

In the display device of the present invention, preferably, the plurality of particles comprise three groups of particles colored in red, green and blue, respectively, the three groups of particles being encapsulated in respective spaces that are separated from one another with partition wall pixel by pixel.

In the display device of the present invention, preferably, the plurality of particles comprise three groups of particles colored cyan, magenta and yellow, respectively, the three groups of particles being encapsulated in respective spaces that are separated from one another with partition wall pixel by pixel.

Preferably, the display device of the present invention has an active-matrix drive configuration.

In the display device of the present invention, preferably, the second electrode is connected to an active element used in the active-matrix drive configuration for active-matrix drive, the active element comprising an organic semiconductor layer.

Preferably, the display device of the present invention has a passive-matrix drive configuration.

In the display device of the present invention, preferably, the substrates each comprise a resin substrate having a thickness of 0.5 mm or less.

According to the present invention, there is also provided a display device comprising: a pair of substrates disposed opposite to each other, at least one of which is transparent; a plurality of particles having an electrostatic property contained in a gaseous phase provided between the pair of substrates; first and second electrodes provided for each of pixels arranged in a matrix for driving the particles; and a voltage applying portion for applying voltage to the first and second electrodes in accordance with an image signal, wherein: the particles each comprise a parent particle as a core, and plural child particles fixed to the parent particle in a manner to cover a substantially entire surface of the parent particle; and when voltage is applied to the first and second electrodes by the voltage applying portion, the particles are caused to travel between the first and second electrodes in accordance with the voltage applied so as to display an image corresponding to the image signal.

In the display device of the present invention, preferably, the plurality of particles comprise two kinds of particles which are electrostatically charged to have different polarities, at least one of the two kinds of particles comprising a parent particle as a core, and plural child particles fixed to the parent particle in a manner to cover a substantially entire surface of the parent particle.

According to the present invention, there is also provided a display device comprising: a pair of substrates disposed opposite to each other, at least one of which is transparent; a plurality of particles having an electrostatic property contained in a gaseous phase provided between the pair of substrates; first and second electrodes provided for each of pixels arranged in a matrix for driving the particles; and a voltage applying portion for applying voltage to the first and second electrodes in accordance with an image signal, wherein: the particles each comprise a parent particle as a core, a first coating layer coating an entire surface of the parent particle and comprising a material having a higher softening point than that of the parent particle, a second coating layer coating an entire surface of the first coating layer and comprising the same material as that of the parent particle or a material having a lower softening point than that of the parent particle, and plural child particles fixed to the second coating layer in a manner to cover a substantially entire surface of the second coating layer; and when voltage is applied to the first and second electrodes by the voltage applying portion, the particles are caused to travel between the first and second electrodes in accordance with the voltage applied so as to display an image corresponding to the image signal.

In the display device of the present invention, preferably, the parent particle has a smaller specific gravity and a lower softening point than the child particles.

In the display device of the present invention, preferably, the parent particle is porous.

In the display device of the present invention, preferably, the parent particle has a hollow structure.

In the display device of the present invention, preferably, either or both of the parent particle and the child particles are spherical.

In the display device of the present invention, preferably, the child particles each comprise a fine particle of silica surface-treated to have an electrostatic property.

In the display device of the present invention, preferably, the child particles are colored particles.

In the display device of the present invention, preferably, the plurality of particles each have a surface formed with a water-repellent film or a hydrophobic film.

In the display device of the present invention, preferably, the child particles are wet-milled by a mill using a milling medium to be stirred, the mill being loaded with a surface-treating agent and beads as the milling medium.

In the display device of the present invention, preferably, the child particles are titanium oxide particles having an average particle diameter not less than 200 nm and not more than 400 nm.

In the display device of the present invention, preferably, one of the two kinds of particles comprises black particles and negatively charged child particles are adhering to the black particles exclusively.

In the display device of the present invention, preferably, the child particles are silica particles having an average particle diameter not less than 10 nm and not more than 20 nm.

In the display device of the present invention, preferably, the weight ratio of parent particles:child particles blended for the child particles to cover the substantially entire surface of the parent particle ranges from 100:3 to 100:5.

According to the present invention, there is also provided a display device comprising: a pair of substrates disposed opposite to each other, at least one of which is transparent; a plurality of particles having an electrostatic property contained in a gaseous phase provided between the pair of substrates; first and second electrodes provided for each of pixels arranged in a matrix for driving the particles; and a voltage applying portion for applying voltage to the first and second electrodes in accordance with an image signal, wherein: the particles each comprise a parent particle as a core, a first coating layer coating an entire surface of the parent particle and comprising an opaque material which does not allow light to pass therethrough, and a second coating layer coating an entire surface of the first coating layer and comprising an insulating material; and when voltage is applied to the first and second electrodes by the voltage applying portion, the particles are caused to travel between the first and second electrodes in accordance with the voltage applied so as to display an image corresponding to the image signal.

According to the present invention, there is also provided a method of preparing particles for use in image display of a display device, the display device including: a pair of substrates disposed opposite to each other, at least one of which is transparent; first and second electrodes provided for each of pixels arranged in a matrix; and a voltage applying portion for applying voltage to the first and second electrodes in accordance with an image signal, wherein: the particles each comprise a parent particle as a core, and plural child particles fixed to the parent particle in a manner to cover a substantially entire surface of the parent particle; and when voltage is applied to the first and second electrodes by the voltage applying portion, the particles are caused to travel in a gaseous phase provided between the first and second electrodes in accordance with the voltage applied, the method comprising the steps of: allowing polymer particles dispersed in an aqueous medium not containing a swelling agent to absorb a monomer and an oil-soluble dye; and polymerizing the monomer absorbed by the polymer particles to obtain monodisperse particles each serving as the parent particle.

The display devices according to the present invention are each capable of lowering the driving voltage required to drive particles traveling in a gaseous phase.

The display devices are each capable of causing particles to travel smoothly in a gaseous phase, which leads to shortened response time.

The present invention has further advantages including realization of image display of good quality with improved contrast.

The foregoing and other objects, features and attendant advantages of the present invention will become apparent from the reading of the following detailed description in conjunction with the accompanying drawings.

BRIEF DESCRIPTION OF THE DRAWINGS

FIG. 11A is a sectional view schematically illustrating an essential arrangement of a display section included in a display device according to embodiment 1-5 of the present invention in a white display operation;

FIG. 11B is a sectional view schematically illustrating an essential arrangement of the display section included in the display device according to embodiment 1-5 of the present invention in a black display operation;

DETAILED DESCRIPTION OF THE PREFERRED EMBODIMENTS

The present invention will now be described in detail by way of preferred embodiments thereof with reference to the drawings.

Embodiment Group 1

Here, description will be made of group 1 of preferred embodiments of display devices according to the present invention.

Embodiment 1-1

Figure 3:
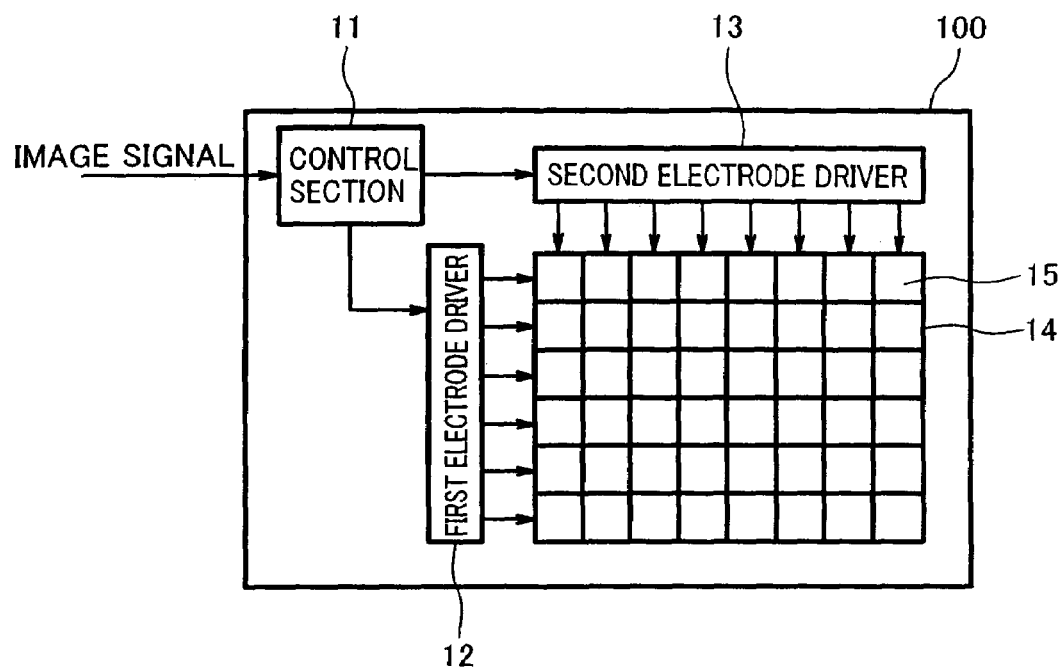
FIG. 3 is a block diagram illustrating the configuration of a display device according to embodiment 1-1 of the present invention.

A display device according to embodiment 1-1 of the present invention is of the so-called passive matrix type. FIG. 3 is a block diagram illustrating the configuration of the display device according to embodiment 1-1 of the present invention. As shown in FIG. 3, display device 100 according to this embodiment includes a display section 14 having pixels 15 arranged in a matrix. Each of the pixels 15 is provided with a first electrode and a second electrode, which are adapted to be driven by a first electrode driver 12 and a second electrode driver 13, respectively. The respective operations of the first and second electrode drivers 12 and 13 are controlled by a control section 11. Though not illustrated in FIG. 3, the display section 14 includes a plurality of such first electrodes arranged in row and a plurality of such second electrodes arranged in column.

Figure 4A:
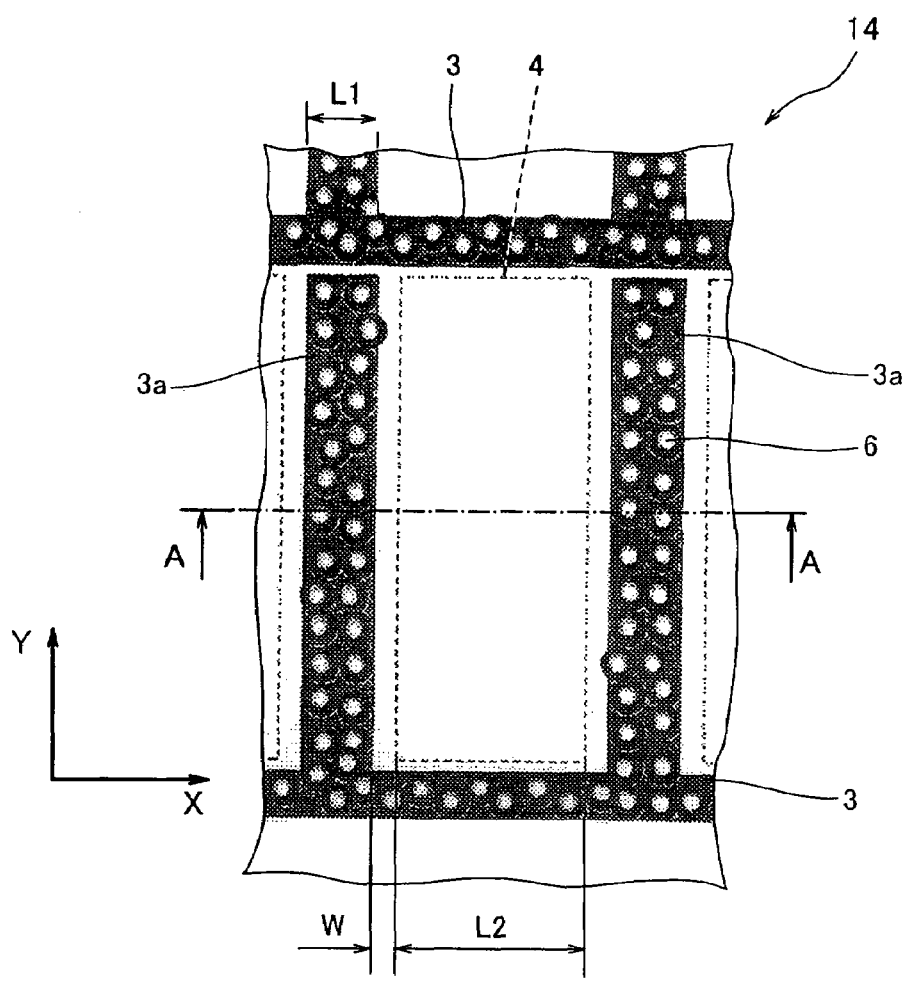
FIG. 4A is a see-through plan view illustrating an essential arrangement of a display section included in the display device according to embodiment 1-1 of the present invention in a white display operation.
Figure 4B:
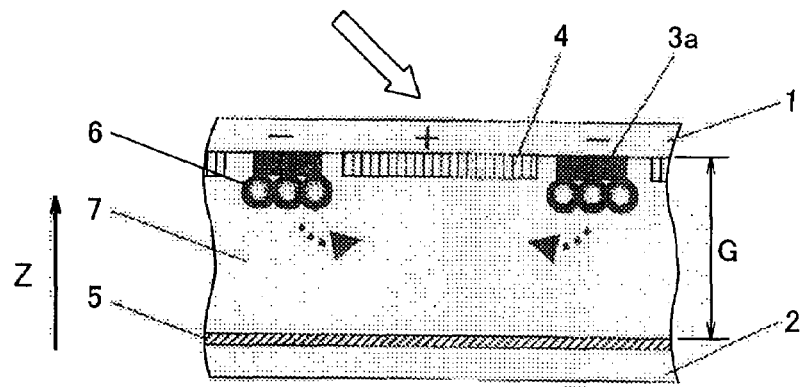
FIG. 4B is a sectional view taken on line A-A of FIG. 4A.
Figure 5A:
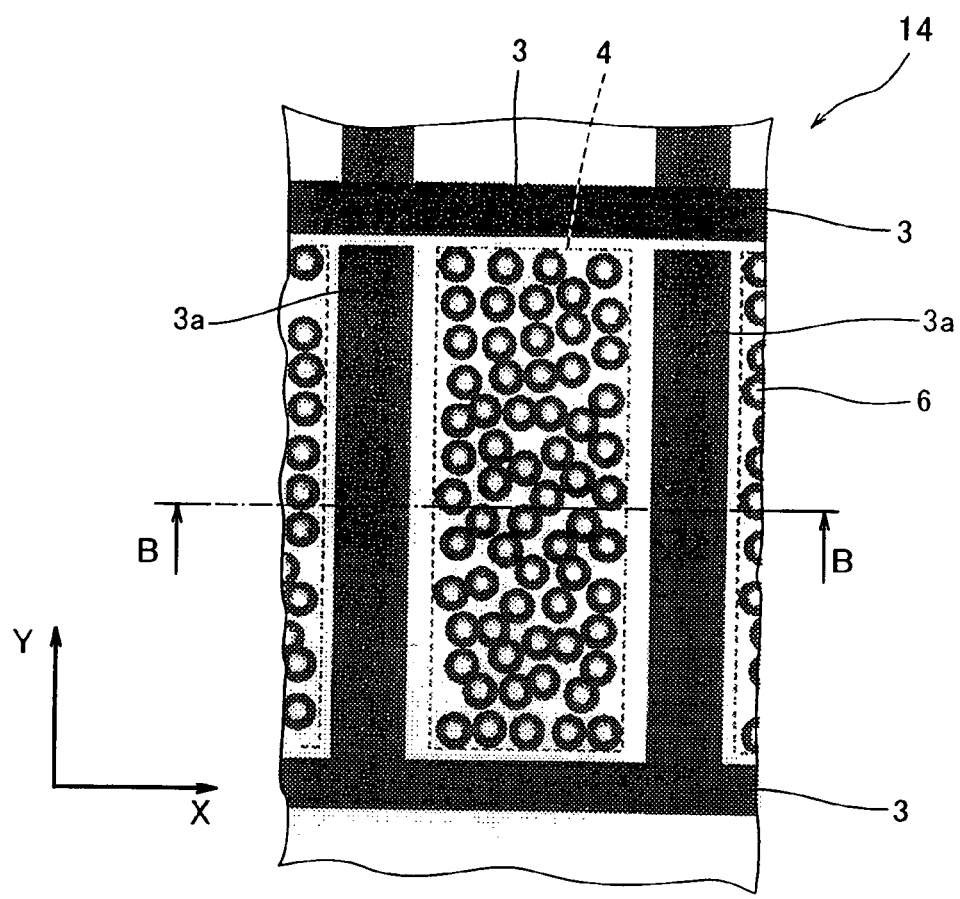
FIG. 5A is a see-through plan view illustrating an essential arrangement of the display section included in the display device according to embodiment 1-1 of the present invention in a black display operation.
Figure 5B:
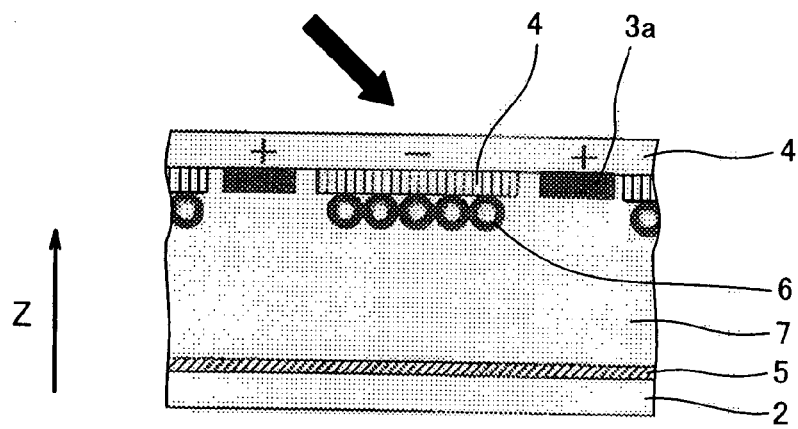
FIG. 5B is a sectional view taken on line B-B of FIG. 5A.

FIG. 4A is a see-through plan view illustrating an essential arrangement of the display section 14 included in the display device according to embodiment 1-1 of the present invention in a white display operation; FIG. 4B is a sectional view taken on line A-A of FIG. 4A; FIG. 5A is a see-through plan view illustrating an essential arrangement of the display section 14 included in the display device according to embodiment 1-1 of the present invention in a black display operation; and FIG. 5B is a sectional view taken on line B-B of FIG. 5A. For ease of description, X-direction, Y-direction and Z-direction in these figures will be referred to as the lateral direction, longitudinal direction and vertical direction, respectively, of the display section 14.

As shown in FIGS. 4A to 5B, the display section 14 includes two substrates: upper substrate 1 and lower substrate 2. The upper substrate 1 and lower substrate 2 each comprise a transparent resin film having a thickness ranging from about 0.1 mm to about 0.5 mm. It should be noted that each of the upper and lower substrates 1 and 2 preferably has a thickness ranging from about 0.1 mm to about 0.2 mm in order to realize a flexible display device so-called "electronic paper".

The upper substrate 1 and the lower substrate 2 are disposed opposite to each other with spacers (not shown) intervening therebetween. An air layer 7 formed between the upper and lower substrates 1 and 2 contains a plurality of positively charged colored particles 6. The colored particles 6 are spherical black particles synthesized from acrylic particles, black carbon or the like and have a particle diameter ranging from about 1 µm to about 10 µm. The colored particles 6 preferably have a uniform particle diameter to prevent aggregation thereof.

Further, the colored particles 6 preferably have a small specific gravity and excellent fluidity. A specific structure for realizing such particles is constructed by fixing spherical fine particles of silica each having a diameter of 30 nm onto a spherical acrylic particle having a diameter of 5 µm in a manner to cover the entire surface thereof by a mechanochemical process or a like process. The fine silica particles used here are those electrostatically charged and, hence, the colored particles 6, as a whole, have an electrostatic property. For the colored particles 6 to have a smaller specific gravity, it is desirable that the acrylic particles to be used be hollow or porous. The colored particles 6 each having such a structure exhibit improved fluidity and, accordingly, the frictional resistance which will result during travel of the particles is decreased and the kinetic energy required for travel of the particles is also decreased. Thus, the device can operate at a higher response speed and can be driven at a lower voltage.

The spacers maintain a gap G of about 100 µm in which the air layer 7 is formed. The packing of the colored particles 6 in the air layer 7 ranges from about 10% to about 30% by volume relative to the volume of the air layer 7. After packing of the colored particles 6 in the air layer 7, the peripheral edge portions of the upper and lower substrates 1 and 2 are hermetically sealed with an epoxy adhesive or the like.

The underside of the upper substrate 1 is formed with a comb-shaped first electrode 3 having plural comb tooth portions 3a, and a rectangular second electrode 4 provided for each pixel and interposed between adjacent comb tooth portions 3a, 3a of the first electrode 3. The second electrode 4 is a transparent electrical conductor comprising ITO (Indium Tin Oxide) or a like material. In this embodiment, the width L1 of each comb tooth portion 3a of the first electrode 3 is 10 µm while the width L2 of the second electrode 4 is 50 µm. The spacing W1 between one comb tooth portion 3a of the first electrode 3 and a second electrode 4 situated adjacent thereto is 5 µm. Such first electrodes 3 are joined with each other in the lateral direction of the display section 14, while such second electrodes 4 are electrically connected to each other in the longitudinal direction of the display section 14 via wiring not shown.

The upper side of the lower substrate 2 is formed with a reflecting layer 5 for reflecting light becoming incident from above. The reflecting layer 5 is a white layer formed from $TiO_2$ (titania), $Al_2O_3$ (alumina), or the like.

The operation of the display device thus constructed according to this embodiment will be described below with reference to FIGS. 3 to 5B. In the display device 100 the control section 11 outputs control signals to the first electrode driver 12 and the second electrode driver 13, respectively, in accordance with an image signal inputted from an external device. As a result, the first electrode driver 12 applies a predetermined voltage to the first electrode 3, while, on the other hand, the second electrode driver 13 applies a voltage corresponding to the image signal to the second electrode 4 formed at each pixel in a manner timed to the application by the first electrode driver 12. This causes colored particles 6 of each pixel 15 to travel in the manner to be described later, thereby varying the light transmittance of each pixel 15 with respect to light to be reflected by the reflecting layer 5. As a result, the viewer observes an image corresponding to the image signal.

White display at each pixel 15 is realized as follows. In accordance with control signals outputted from the control section 11, the first electrode driver 12 and the second electrode driver 13 apply a negative voltage and a positive voltage to the first electrode 3 and the second electrode 4, respectively. In this case, the colored particles 6, which are positively charged as described above, are attracted by and adhere onto the first electrode 3 as shown in FIGS. 4A and 4B. Since the second electrode 4 comprises a transparent electrical conductor as described above, the white color of the reflecting layer 5 formed over the upper side of the lower substrate 2 is observed.

On the other hand, black display at each pixel 15 is realized as follows. In accordance with control signals outputted from the control section 11, the first electrode driver 12 and the second electrode driver 13 apply a positive voltage and a negative voltage to the first electrode 3 and the second electrode 4, respectively. In this case, the positively charged colored particles 6 are attracted by and adhere onto the second electrode 4 as shown in FIGS. 5A and 5B. As a result, the colored particles 6 which are colored black are observed.

As described above, since the particles to be utilized for display consist only of those which are electrostatically charged to have the same polarity, barriers against travel of the particles are reduced as compared with the prior art employing two different kinds of particles that are electrostatically charged to have different polarities. For this reason, the voltage for causing the particles to travel, namely, the driving voltage can be lowered. Further, the time required for switching from white display to black display and vice versa can be shortened.

In the case of a display device of the so-called vertical electric field type in which first and second electrodes are formed at different substrates, like the prior art display device, a voltage of 300 V or higher is needed to realize satisfactory black display. In contrast, satisfactory black display can be realized at a driving voltage from 80 V to 120 V when the spacing W1 between one comb tooth portion 3a of the first electrode 3 and a second electrode 4 situated adjacent thereto ranges from 20 µm to 50 µm in the construction according to this embodiment.

Embodiment 1-2

A display device according to embodiment 1-2 is constructed by forming a first electrode and a second electrode on different substrates.

Figure 6A:
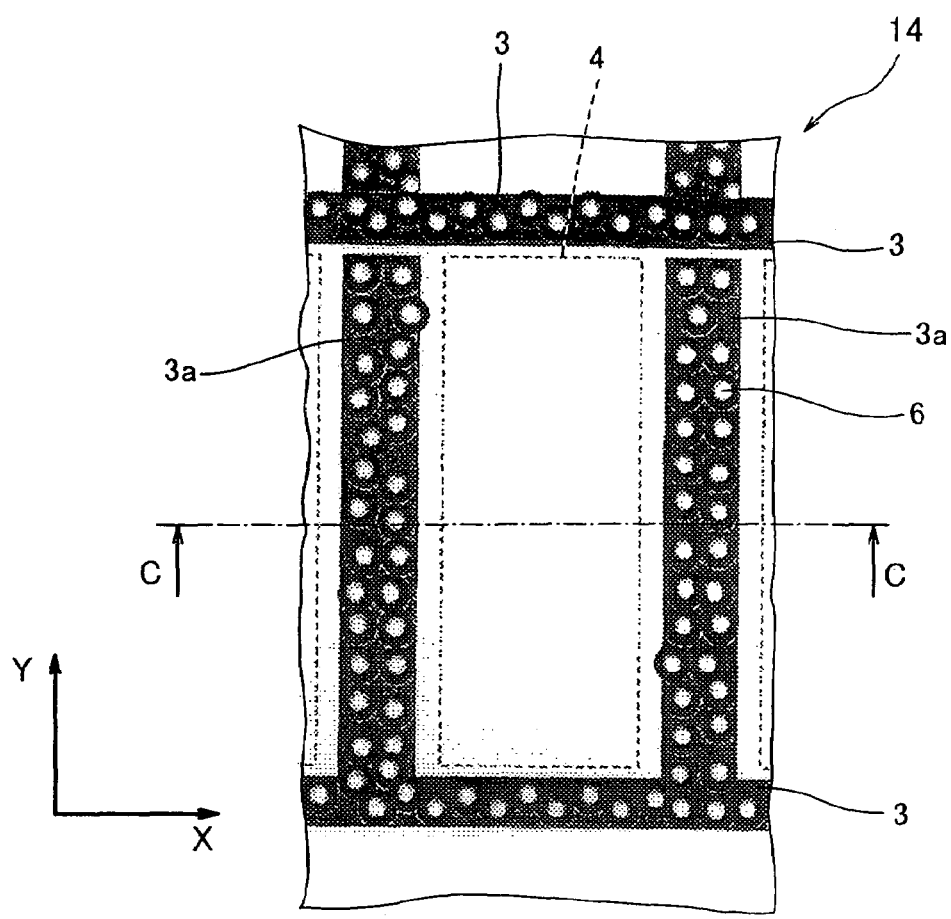
FIG. 6A is a see-through plan view illustrating an essential arrangement of a display section included in a display device according to embodiment 1-2 of the present invention in a white display operation.
Figure 6B:
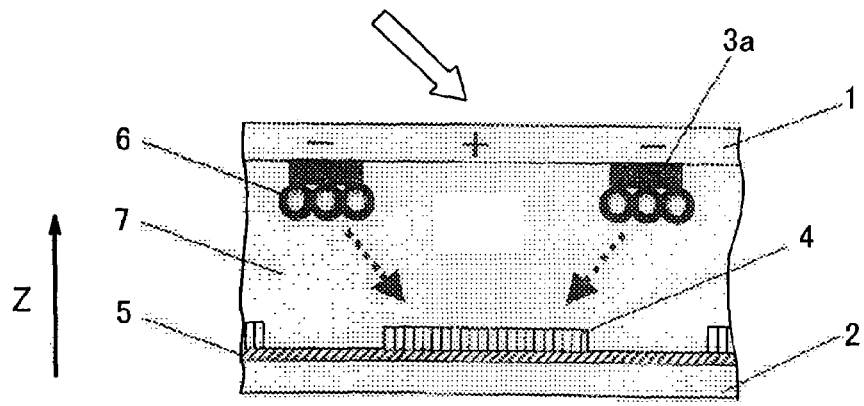
FIG. 6B is a sectional view taken on line C-C of FIG. 6A.
Figure 7A:
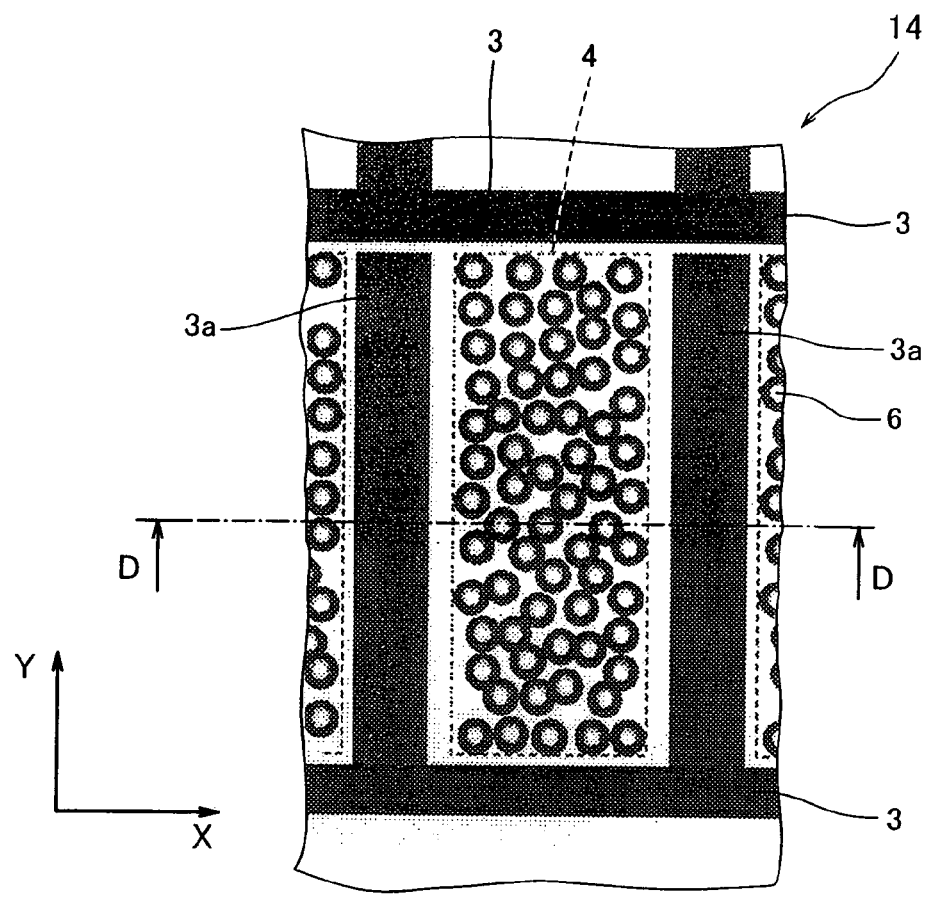
FIG. 7A is a see-through plan view illustrating an essential arrangement of the display section included in the display device according to embodiment 1-2 of the present invention in a black display operation.
Figure 7B:
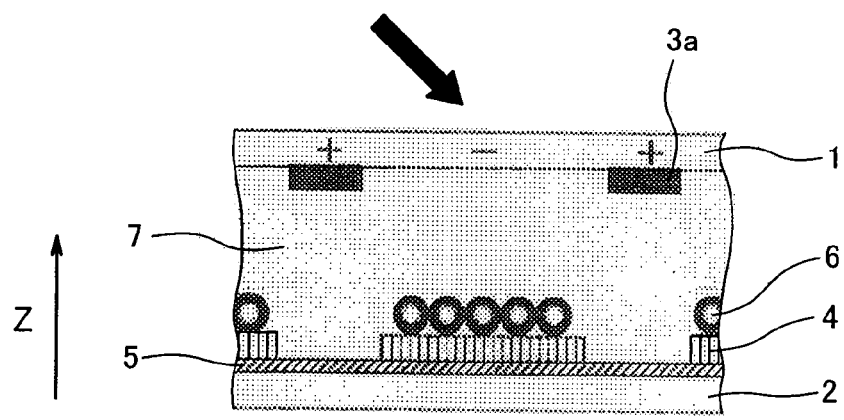
FIG. 7B is a sectional view taken on line D-D of FIG. 7A.

FIG. 6A is a see-through plan view illustrating an essential arrangement of display section 14 included in a display device according to embodiment 1-2 of the present invention in a white display operation; FIG. 6B is a sectional view taken on line C-C of FIG. 6A; FIG. 7A is a see-through plan view illustrating an essential arrangement of the display section 14 included in the display device according to embodiment 1-2 of the present invention in a black display operation; and FIG. 7B is a sectional view taken on line D-D of FIG. 7A.

As shown in FIGS. 6A to 7B, the display section 14 included in the display device according to this embodiment includes an upper substrate 1, the underside of which is formed with a comb-shaped first electrode 3 having plural comb tooth portions 3a, as in embodiment 1-1. On the other hand, a lower substrate 2 has an upper side formed with a reflecting layer 5 on which a rectangular second electrode 4 provided for each pixel is formed. In plan view, the second electrode 4 is interposed between adjacent comb tooth portions 3a, 3a of the first electrode 3. Since other features of the display device according to this embodiment are similar to the corresponding features of the embodiment 1-1, description thereof is omitted here.

As in embodiment 1-1, the display device thus constructed according to this embodiment applies a negative voltage and a positive voltage to the first electrode 3 and the second electrode 4, respectively, to cause colored particles 6 to be attracted by and adhere onto the first electrode 3, thereby realizing white display (see FIGS. 6A and 6B). On the other hand, the display device applies a positive voltage and a negative voltage to the first electrode 3 and the second electrode 4, respectively, to cause the colored particles 6 to be attracted by and adhere onto the second electrode 4, thereby realizing black display (see FIGS. 7A and 7B).

This embodiment differs from embodiment 1-1 in that colored particles 6 travel between the upper substrate 1 and the lower substrate 2 when they travel between the first electrode 3 and the second electrode 4. Stated otherwise, colored particles 6 have to travel in the air layer 7 by the distance of gap G. In embodiment 1-1, by contrast, colored particles 6 travel between the first electrode 3 and the second electrode 4, both of which are formed at the upper substrate 1. In this embodiment, the gap G in which the air layer 7 is formed is 100 µm and the spacing between one comb tooth portion 3a of the first electrode 3 and second electrode 4 situated adjacent thereto is 5 µm. The strength of an electric field produced in this embodiment is 20 times as high as the strength of an electric field produced in embodiment 1-1 when an equal electric potential is provided across the first electrode 3 and the second electrode 4.

The driving voltage required to cause colored particles 6 to travel depends on the strength of an electric field produced between the first electrode 3 and the second electrode 4. For this reason, embodiment 1-1 is more desirable than this embodiment from the viewpoint of lowering the driving voltage. However, embodiment 1-1 involves a problem of easy occurrence of electrical short circuit between the electrodes because the spacing between the first electrode 3 and the second electrode 4 is small. In contrast, this embodiment in which the spacing between the first electrode 3 and the second electrode 4 is large enough has an advantage that the probability of occurrence of such electrical short circuit can be lowered.

Embodiment 1-3

A display device according to embodiment 1-3 is constructed by forming a first electrode on a substrate so as to be depressed in a direction perpendicular to the substrate.

Figure 8A:
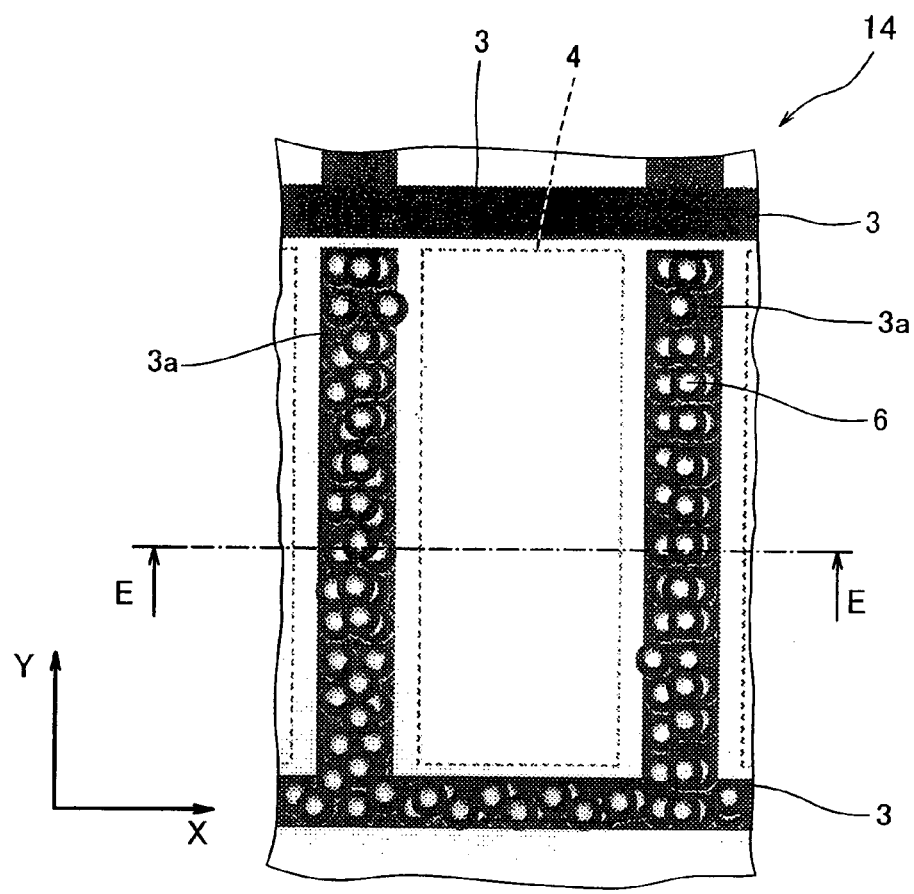
FIG. 8A is a see-through plan view illustrating an essential arrangement of a display section included in a display device according to embodiment 1-3 of the present invention in a white display operation.
Figure 8B:
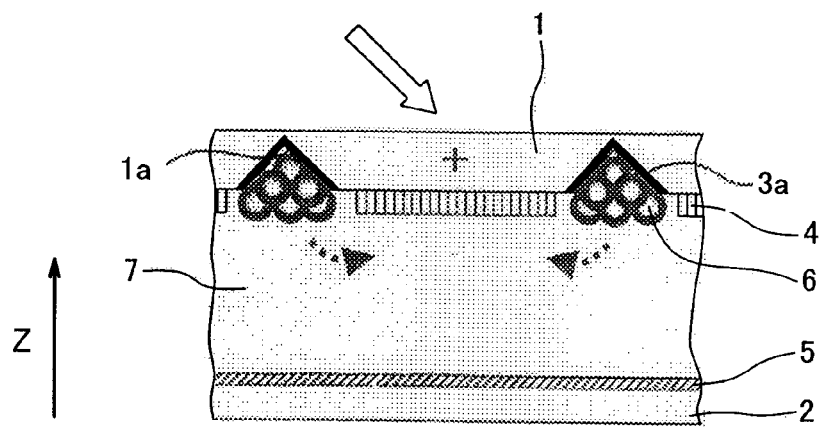
FIG. 8B is a sectional view taken on line E-E of FIG. 8A.
Figure 9A:
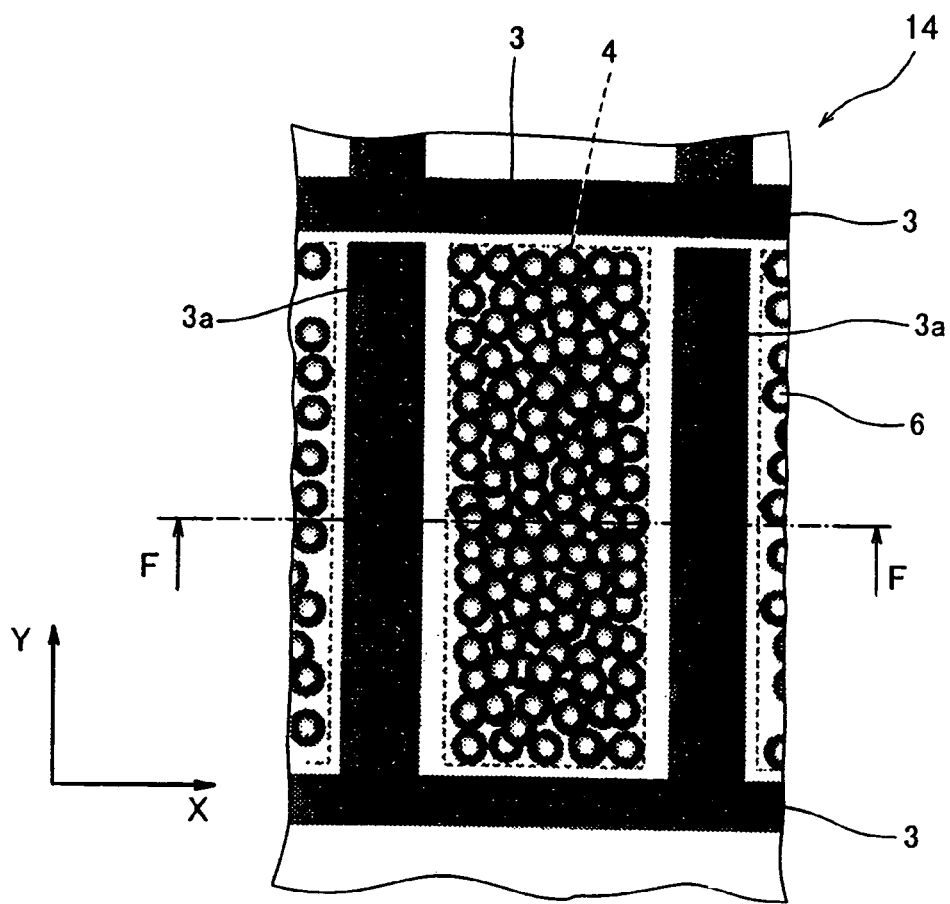
FIG. 9A is a see-through plan view illustrating an essential arrangement of the display section included in the display device according to embodiment 1-3 of the present invention in a black display operation.
Figure 9B:
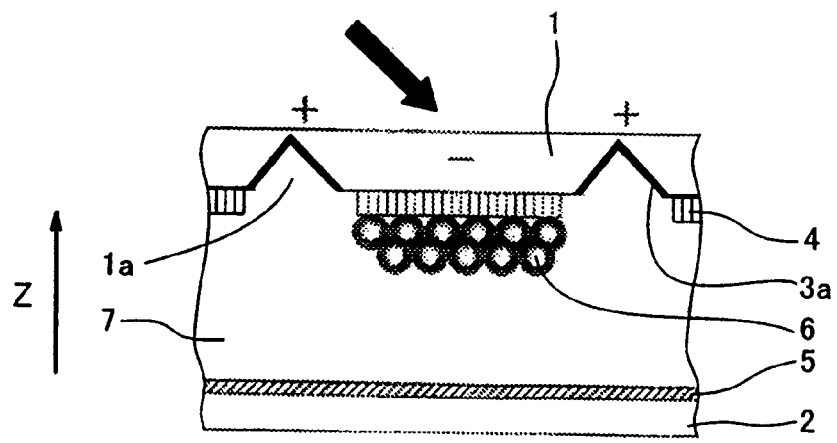
FIG. 9B is a sectional view taken on line F-F of FIG. 9A.

FIG. 8A is a see-through plan view illustrating an essential arrangement of display section 14 included in the display device according to embodiment 1-3 of the present invention in a white display operation; FIG. 8B is a sectional view taken on line E-E of FIG. 8A; FIG. 9A is a see-through plan view illustrating an essential arrangement of the display section 14 included in the display device according to embodiment 1-3 of the present invention in a black display operation; and FIG. 9B is a sectional view taken on line F-F of FIG. 9A.

As shown in FIGS. 8A to 9B, the display section 14 included in the display device according to this embodiment includes an upper substrate 1, the underside of which is formed with a comb-shaped first electrode 3 having plural comb tooth portions 3a, and a rectangular second electrode 4 provided for each pixel, the second electrode 4 being interposed between adjacent comb tooth portions 3a, 3a of the first electrode 3, as in embodiment 1-1. In this embodiment, regions of the upper substrate 1 on which the comb tooth portions 3a of the first electrode 3 are to be formed are formed with respective grooves 1a extending in the longitudinal direction of the display section 14 by a known process such as embossing or pressing. The comb tooth portions 3a of the first electrode 3 are formed along the respective grooves 1a thus formed. Accordingly, each comb tooth portion 3a of the first electrode 3 is formed into a groove shape depressed in a direction perpendicular to the upper substrate 1.

Since other features of the display device according to this embodiment are similar to the corresponding features of the embodiment 1-1, description thereof is omitted here.

As in embodiment 1-1, the display device thus constructed according to this embodiment applies a negative voltage and a positive voltage to the first electrode 3 and the second electrode 4, respectively, to cause colored particles 6 to be attracted by and adhere onto the first electrode 3, thereby realizing white display (see FIGS. 8A and 8B). On the other hand, the display device applies a positive voltage and a negative voltage to the first electrode 3 and the second electrode 4, respectively, to cause colored particles 6 to be attracted by and adhere onto the second electrode 4, thereby realizing black display (see FIGS. 9A and 9B).

In this embodiment, each comb tooth portion 3a of the first electrode 3 is formed into a groove shape depressed in a direction perpendicular to the upper substrate 1. For this reason, the first electrode 3 has a larger surface area than in embodiment 1-1, which enables an increased number of colored particles 6 to adhere thereto. Thus, it is possible to maintain the display area for white display even if a larger number of colored particles 6 are used than in embodiment 1-1. When the number of colored particles 6 is thus increased, the number of colored particles 6 that will adhere to the second electrode 4 in the white display operation increases, thus realizing display of good quality.

As described above, the display device according to this embodiment is capable of improving the quality of black display while keeping the white display quality satisfactory and hence offers improved contrast as compared to embodiment 1-1.

In this embodiment the grooves are formed directly in the upper substrate 1. However, such grooves may be formed in a manner that a photosensitive resin layer is formed on the underside of the upper substrate 1 and then a groove pattern is formed in the photosensitive resin layer. Since such a photosensitive resin can be processed more easily than the substrate, it allows a more complicate form of grooves to be obtained.

Embodiment 1-4

In the display device according to embodiment 1-3, the first electrode is formed as depressed in a direction perpendicular to the substrate. In contrast, a display device according to embodiment 1-4 is constructed by forming a first electrode as projecting in a direction perpendicular to the substrate.

Figure 10B:
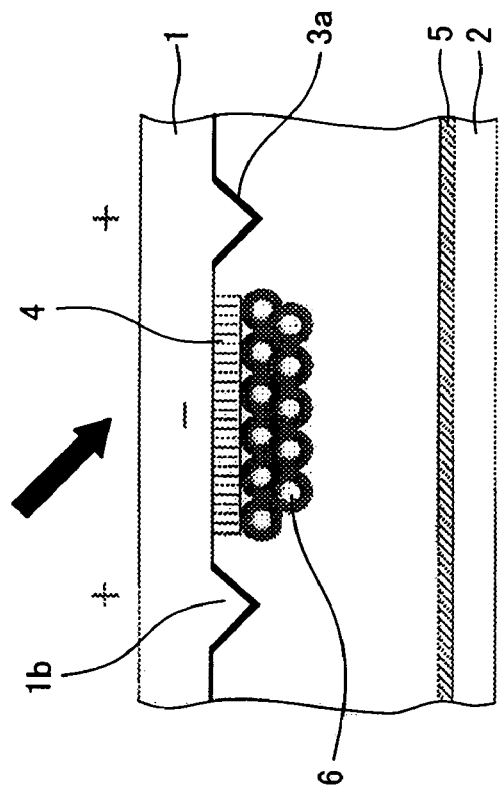
FIG. 10B is a sectional view schematically illustrating an essential arrangement of the display section included in the display device according to embodiment 1-4 of the present invention in a black display operation.
Figure 10A:
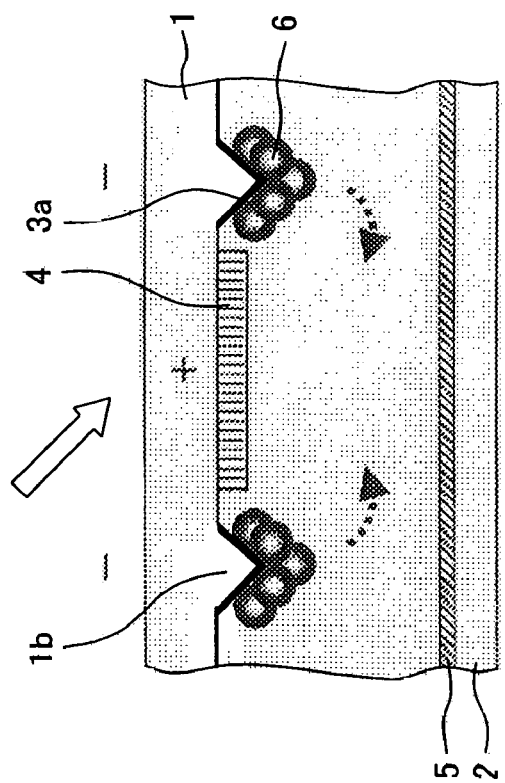
FIG. 10A is a sectional view schematically illustrating an essential arrangement of a display section included in a display device according to embodiment 1-4 of the present invention in a white display operation.

FIG. 10A is a sectional view schematically illustrating an essential arrangement of display section 14 included in the display device according to embodiment 1-4 of the present invention in a white display operation; and FIG. 10B is a sectional view schematically illustrating an essential arrangement of the display section 14 included in the display device according to embodiment 1-4 of the present invention in a black display operation.

As shown in FIGS. 10A and 10B, the display section 14 included in the display device according to this embodiment includes an upper substrate 1, the underside of which is formed with a comb-shaped first electrode 3 having plural comb tooth portions 3a, and a rectangular second electrode 4 provided for each pixel, the second electrode 4 being interposed between adjacent comb tooth portions 3a, 3a of the first electrode 3, as in embodiment 1-1. In this embodiment, regions of the upper substrate 1 on which the comb tooth portions 3a of the first electrode 3 are to be formed are formed with respective ridge portions 1b projecting in a direction perpendicular to the upper substrate 1 and extending in the longitudinal direction of the display section 14 by a known process such as embossing or pressing. The comb tooth portions 3a of the first electrode 3 are formed along the respective ridge portions 1b thus formed. Accordingly, each comb tooth portion 3a of the first electrode 3 is formed into a ridge shape projecting in a direction perpendicular to the upper substrate 1.

Since other features of the display device according to this embodiment are similar to the corresponding features of the embodiment 1-1, description thereof is omitted here.

As in embodiment 1-1, the display device thus constructed according to this embodiment applies a negative voltage and a positive voltage to the first electrode 3 and the second electrode 4, respectively, to cause colored particles 6 to be attracted by and adhere onto the first electrode 3, thereby realizing white display (see FIG. 10A). On the other hand, the display device applies a positive voltage and a negative voltage to the first electrode 3 and the second electrode 4, respectively, to cause colored particles 6 to be attracted by and adhere onto the second electrode 4, thereby realizing black display (see FIGS. 10B).

In this embodiment, each comb tooth portion 3a of the first electrode 3 is formed into a ridge shape projecting in a direction perpendicular to the upper substrate 1. For this reason, the first electrode 3 has a larger surface area than in embodiment 1-1. Thus, the display device according to this embodiment can offer improved contrast as in embodiment 1-3.

Further, in the case where each comb tooth portion 3a of the first electrode 3 is formed into a ridge shape projecting perpendicularly to the upper substrate 1, the strength of an electric field produced when the first and second electrodes 3 and 4 are applied with voltage is enhanced as compared with the case where each comb tooth portion 3a of the first electrode 3 is shaped flat as in embodiment 1-1. Therefore, when the first and second electrodes 3 and 4 are applied with voltage equal to that applied in embodiment 1-1, this embodiment can cause colored particles 6 to adhere to either electrode more reliably than embodiment 1-1 and, hence, the construction of this embodiment is more suitable for improvement in contrast. Stated otherwise, in this embodiment a lower driving voltage is sufficient to obtain the same level of contrast as in embodiment 1-1 and, therefore, this embodiment can lower the driving voltage.

In this embodiment the ridges are formed directly on the upper substrate 1. However, such ridges may be formed in a manner that a photosensitive resin layer is formed on the underside of the upper substrate 1 and then a ridge pattern is formed in the photosensitive resin layer, as described in embodiment 1-3. Since such a photosensitive resin can be processed more easily than the substrate, it allows a more complicate form of ridges to be obtained.

Embodiment 1-5

A display device according to embodiment 1-5 has a construction in which a first electrode is formed into a ridge shape projecting in a direction perpendicular to the substrate so that the first electrode functions as a spacer for maintaining the gap between the substrates as well as a barrier for restricting travel of particles.

FIG. 11A is a sectional view schematically illustrating an essential arrangement of display section 14 included in the display device according to embodiment 1-5 of the present invention in a white display operation; and FIG. 11B is a sectional view schematically illustrating an essential arrangement of the display section 14 included in the display device according to embodiment 1-5 of the present invention in a black display operation.

As shown in FIGS. 11A and 11B, the display section 14 included in the display device according to this embodiment includes an upper substrate 1, the underside of which is formed with a comb-shaped first electrode 3 having plural comb tooth portions 3a, and a rectangular second electrode 4 provided for each pixel, the second electrode 4 being interposed between adjacent comb tooth portions 3a, 3a of the first electrode 3, as in embodiment 1-1. In this embodiment, regions of the upper substrate 1 in which the comb tooth portions 3a of the first electrode 3 are to be formed are formed with respective ridge portions 1b projecting in a direction perpendicular to the upper substrate 1 and extending in the longitudinal direction of the display section 14 by a known process such as embossing or pressing. Each of the ridge portions 1b is tapered as it extends downwardly in the display section 14.

The ridge portions 1b formed on the upper substrate 1 serve as spacers between the upper and lower substrates 1 and 2 disposed opposite to each other. That is, the ridge portions 1b are configured to retain the gap in which air layer 7 is formed. Also, the ridge portions 1b function as barriers for restricting free travel of colored particles 6 in the air layer 7.

The comb tooth portions 3a of the first electrode 3 are formed along the respective ridge portions 1b of the upper substrate 1 thus formed. Accordingly, each comb tooth portion 3a of the first electrode 3 is formed into a ridge shape projecting in a direction perpendicular to the upper substrate 1. It is to be noted that a tip portion of each ridge portion 1b, which is in contact with reflecting layer 5 formed over the lower substrate 2, need not be formed with electrode (see FIGS. 11A and 11B). This specification uses the expression "each comb tooth portion 3a of the first electrode 3 is formed into a ridge shape projecting in a direction perpendicular to the upper substrate 1" regardless of whether or not the tip portion thereof is formed with electrode.

Since other features of the display device according to this embodiment are similar to the corresponding features of the embodiment 1-1, description thereof is omitted here.

As in embodiment 1-1, the display device thus constructed according to this embodiment applies a negative voltage and a positive voltage to the first electrode 3 and the second electrode 4, respectively, to cause colored particles 6 to be attracted by and adhere onto the first electrode 3, thereby realizing white display (see FIG. 11A). On the other hand, the display device applies a positive voltage and a negative voltage to the first electrode 3 and the second electrode 4, respectively, to cause colored particles 6 to be attracted by and adhere onto the second electrode 4, thereby realizing black display (see FIGS. 10B).

Colored particles 6 travel between the first electrode 3 and the second electrode 4 as described above. However, their travel is restricted by the comb tooth portions 3a of the first electrode 3 and the ridge portions 1b of the upper substrate 1. Therefore, the amount of colored particles 6 contained in each pixel can be kept constant. Further, it is possible to prevent colored particles 6 from aggregating at a specific region when the display section 14 is tilted in a certain direction. Thus, the display device can obviate the occurrence of display irregularities thereby realizing image display of good quality.

This embodiment need not be provided with spacers separately because the comb tooth portions 3a of the first electrode 3 and the ridge portions 1b of the upper substrate 1 serve as spacers. The comb tooth portions 3a and the ridge portions 1b also serve as barriers for restricting travel of colored particles 6. Therefore, there is no need to provide such barriers separately, which leads to a reduction in manufacturing cost.

In this embodiment, each ridge portion 1b of the upper substrate 1 is tapered as described above. This feature enables the comb tooth portions 3a of the first electrode 3 to have an increased surface area as compared with the case of the comb tooth portions 3a not tapered. Therefore, the display device according to this embodiment can offer improved contrast as in embodiment 1-3.

Embodiment 1-6

A display device according to embodiment 1-6 has a construction in which plural comb tooth portions of a first electrode are provided in each pixel.

Figure 12A:
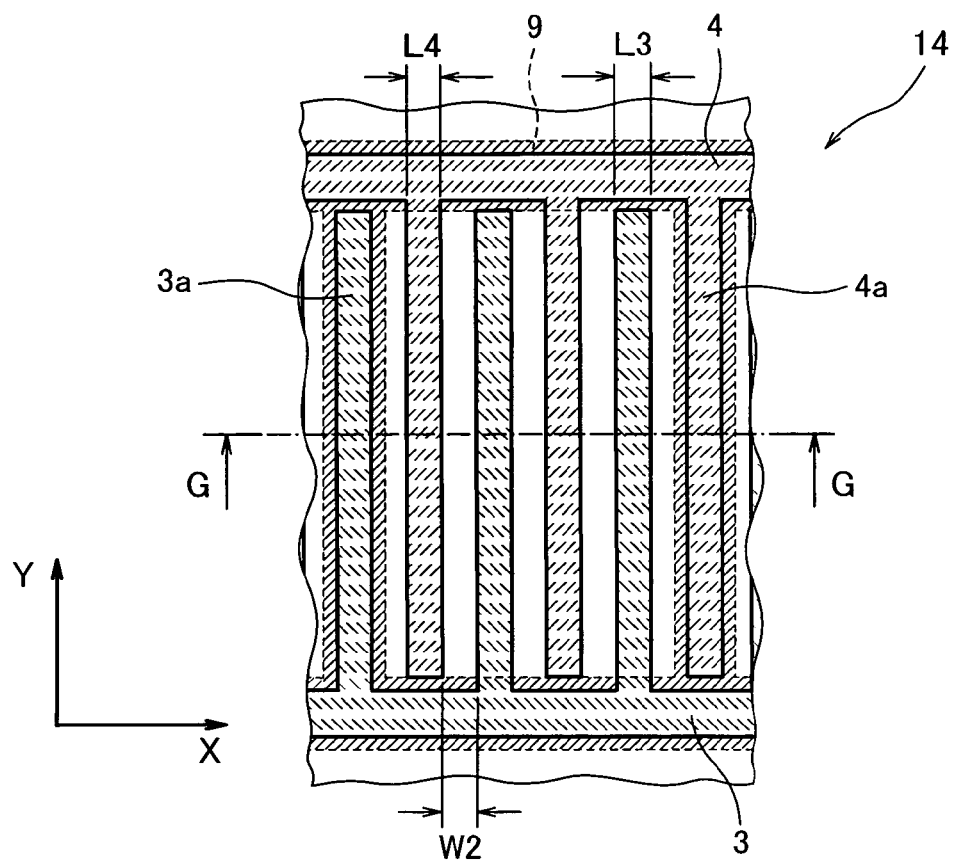
FIG. 12A is a see-through plan view illustrating an essential arrangement of a display section included in a display device according to embodiment 1-6 of the present invention.
Figure 12B:
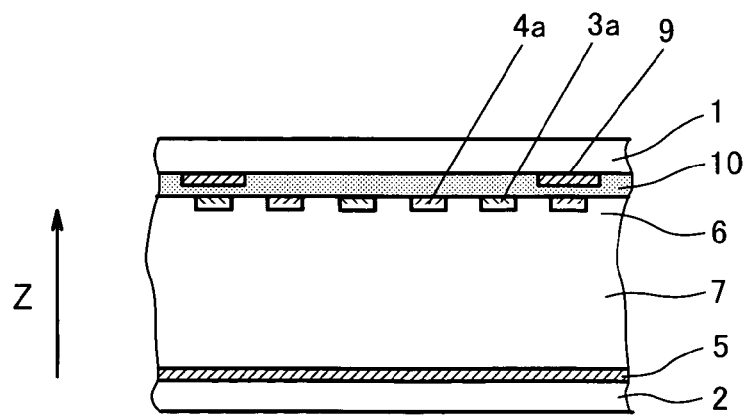
FIG. 12B is a sectional view taken on line G-G of FIG. 12A.

FIG. 12A is a see-through plan view illustrating an essential arrangement of display section 14 included in the display device according to embodiment 1-6 of the present invention; and FIG. 12B is a sectional view taken on line G-G of FIG. 12A. For convenience, colored particles are not illustrated in FIGS. 12A and 12B.

As shown in FIGS. 12A and 12B, the display section 14 included in the display device according to this embodiment includes an upper substrate 1, the underside of which is formed with a black matrix layer 10 having a black matrix 9 formed into a lattice pattern extending along rows and columns of pixels arranged in a matrix. Here, the black matrix 9 is formed from a black or transparent electrical conductor such as Cr (chrome). The black matrix 9 is connected to non-illustrated voltage applying means so as to be applied with voltage thereto independently of first and second electrodes 3 and 4 to be described later.

The black matrix layer 10 has a lower surface formed with comb-shaped first electrode 3 having plural comb tooth portion 3a in each pixel, and comb-shaped second electrode 4 having plural comb tooth portions 4a in each pixel. The first and second electrodes 3 and 4 are each a transparent electrode comprising ITO or a like material. The first electrode 3 and the second electrode 4 are disposed opposite to each other in a manner that the comb tooth portions 3a and the comb tooth portions 4a mesh with each other.

Preferably, width L3 of each comb tooth portion 3a of the first electrode 3 and width L4 of each comb tooth portion 4a of the second electrode 4 each range from about 3 µm to about 5 µm and spacing W2 between one comb tooth portion 3a and an adjacent comb tooth portion 4a ranges from about 3 µm to about 5 µm. This is because such an arrangement makes it possible to obtain a relatively uniform and high electric field strength distribution irrespective of the locations of the electrodes by virtue of peripheral field effect. In this embodiment, any one of the width L3 of each comb tooth portion 3a of the first electrode 3, the width L4 of each comb tooth portion 4a of the second electrode 4 and the spacing W2 between one comb tooth portion 3a and an adjacent comb tooth portion 4a is set to about 4 µm.

Since other features of the display device according to this embodiment are similar to the corresponding features of the embodiment 1-1, description thereof is omitted here.

Figure 13A:
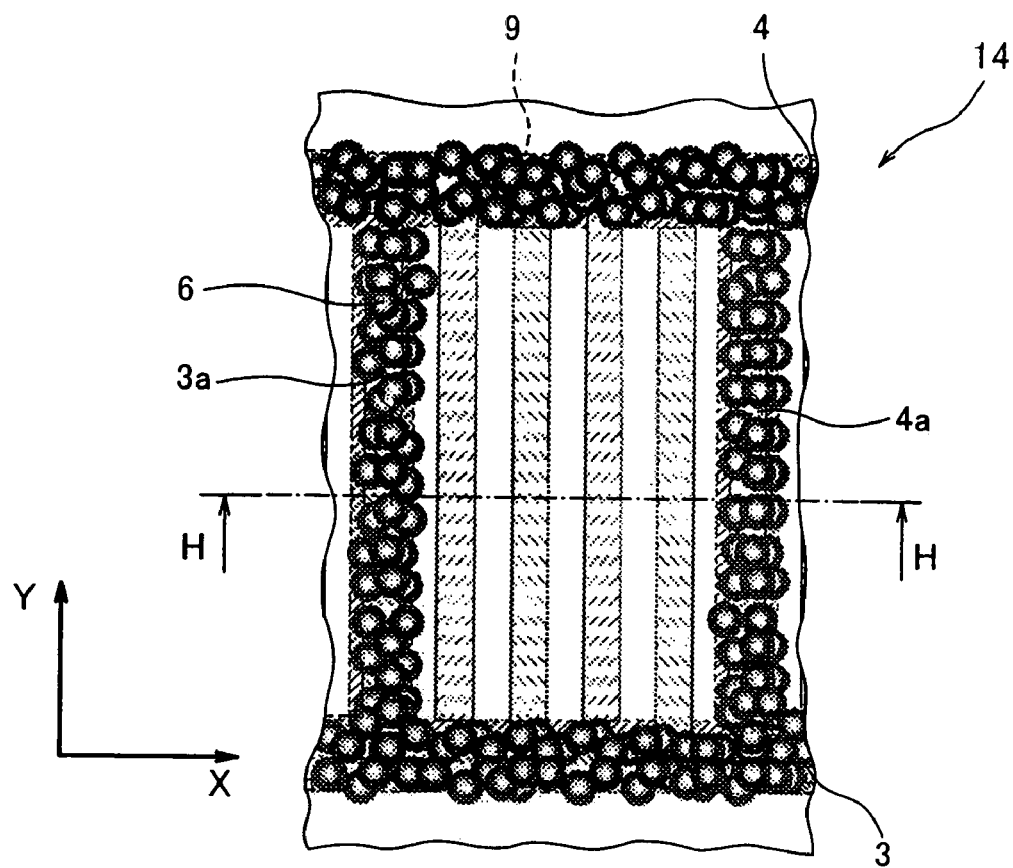
FIG. 13A is a see-through plan view illustrating an essential arrangement of the display section included in the display device according to embodiment 1-6 of the present invention in a white display operation.
Figure 13B:
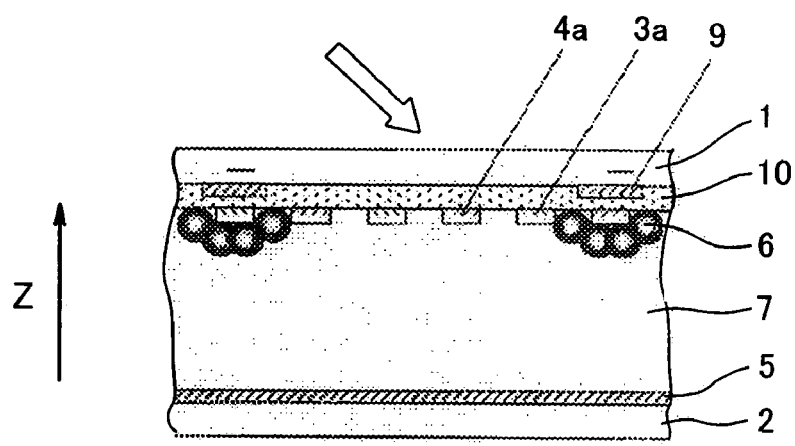
FIG. 13B is a sectional view taken on line H-H of FIG. 13A.
Figure 14A:
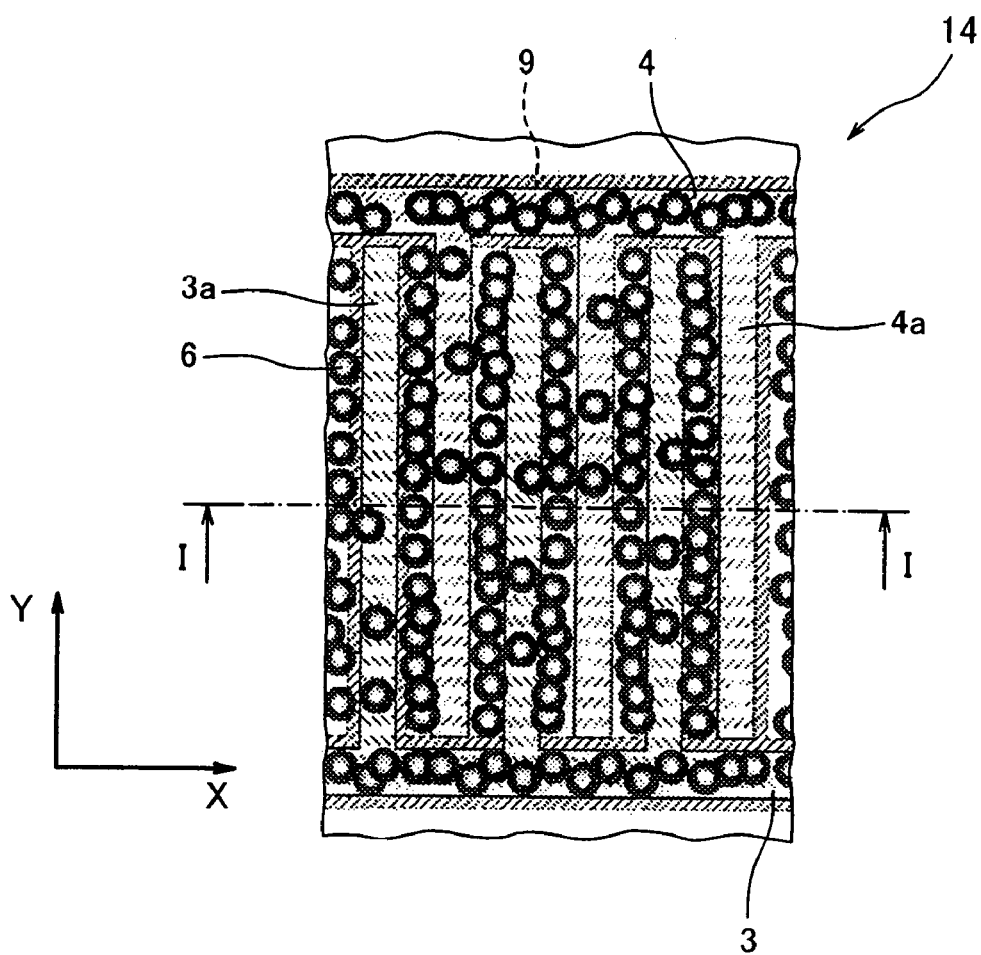
FIG. 14A is a see-through plan view illustrating an essential arrangement of the display section included in the display device according to embodiment 1-6 of the present invention in a medium gray-level display operation.
Figure 14B:
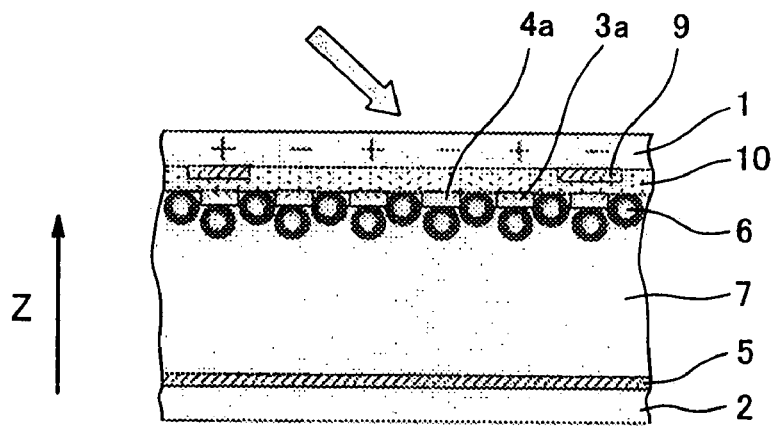
FIG. 14B is a sectional view taken on line I-I of FIG. 14A.
Figure 15A:
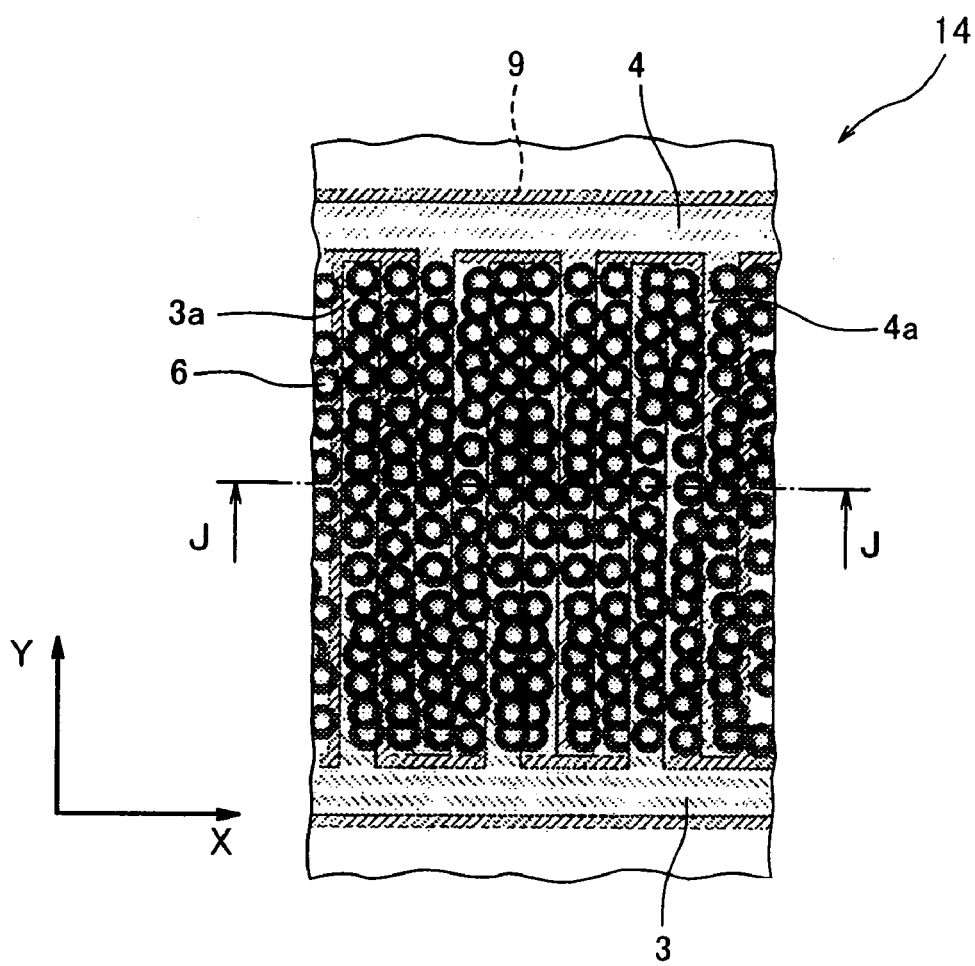
FIG. 15A is a see-through plan view illustrating an essential arrangement of the display section included in the display device according to embodiment 1-6 of the present invention in a black display operation.
Figure 15B:
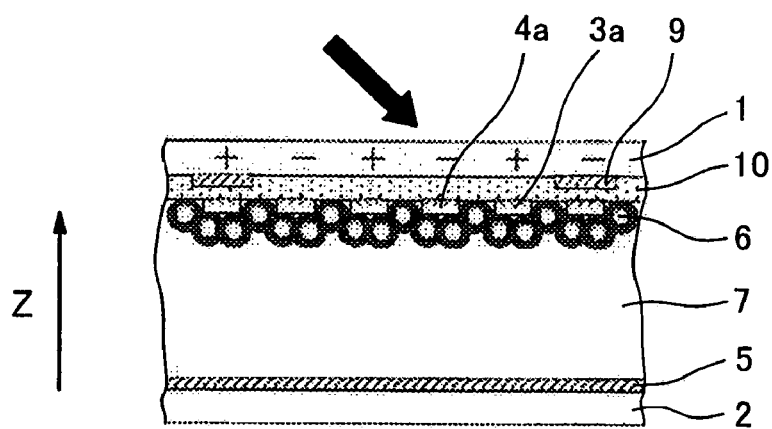
FIG. 15B is a sectional view taken on line J-J of FIG. 15A.

The display device thus constructed according to this embodiment operates as follows. FIG. 13A is a see-through plan view illustrating an essential arrangement of the display section 14 included in the display device according to embodiment 1-6 of the present invention in a white display operation; FIG. 13B is a sectional view taken on line H-H of FIG. 13A; FIG. 14A is a see-through plan view illustrating an essential arrangement of the display section 14 included in the display device according to embodiment 1-6 of the present invention in a medium gray-level display operation; FIG. 14B is a sectional view taken on line I-I of FIG. 14A; FIG. 15A is a see-through plan view illustrating an essential arrangement of the display section 14 included in the display device according to embodiment 1-6 of the present invention in a black display operation; and FIG. 15B is a sectional view taken on line J-J of FIG. 15A.

The display device according to this embodiment applies positive voltage to the first and second electrodes 3 and negative voltage to the black matrix 9 to realize white display. By so doing, colored particles 6 are attracted by and adhere onto the black matrix 9 (see FIGS. 13A and 13B). Since the first and second electrodes 3 and 4 are each formed from a transparent electrical conductor as described above, the white color of reflecting layer 5 formed over the upper side of the lower substrate 2 is observed.

In the case of medium gray-level display, the first electrode 3 and the black matrix 9 are applied with positive voltage while the second electrode 4 applied with negative voltage. By so doing, colored particles 6 are attracted by and adhere onto the first electrode 3 and the black matrix 9 (see FIGS. 14A and 14B). In this case colored particles 6 are dispersed appropriately in a pixel of interest and then become stationary. Thus, a halftone color is observed.

In the case of black display, the first and second electrodes 3 and 4 are applied with negative voltage while the black matrix 9 applied with positive voltage. By so doing, colored particles 6 are attracted by and adhere onto the first and second electrodes 3 and 4 (see FIGS. 15A and 15B). As a result, a larger number of black-colored particles 6 are observed, thus realizing black display.

In applying predetermined voltage to the first and second electrodes 3 and 4 in the manner described above, negative voltage and positive voltage are alternately applied to the first and second electrodes 3 and 4 in the initial stage of voltage application. This causes colored particles 6 to be dispersed uniformly in a central region of the pixel of interest thereby preventing colored particles 6 from aggregating at location adjacent the black matrix 9. As a result, good-quality display, which is uniform and free from irregularities, can be realized.

Other Embodiments Included in Embodiment Group 1

Embodiments 1-1 to 1-6 described above are display devices each having a passive-matrix drive configuration. The passive-matrix drive configuration, which allows crosstalk to occur easily, cannot be applied to display devices of the type causing particles to travel in a liquid phase such as an electrophoretic display device because such display devices do not have threshold voltage required in driving particles. In contrast, display devices of the type causing particles to travel in a gaseous phase, such as the display devices according to embodiments 1-1 to 1-6, have threshold voltage required in driving particles and hence are capable of image display based on passive-matrix drive.

However, for a relatively large display panel requiring several hundred or more scanning electrodes to perform image display of high quality, such a display panel preferably has an active-matrix drive configuration which includes an active element provided for each pixel for applying voltage to the electrodes on a pixel-by-pixel basis by on/off control over the active element. When such an active-matrix drive display device employs an organic TFT (Thin Film Transistor), which is formed using an organic material by a printing process or the like, as an active element as well as a resin substrate to be formed with such organic TFTs thereon, the flexibility of the display device will not be impaired.

The foregoing display devices according to embodiments 1-1 to 1-6 are incapable of color display. However, it is needless to say that if these devices are provided with color filters for the three primary colors (red, green and blue) of light and the like, they can realize color display.

Embodiment Group 2

Next, description will be made of group 2 of preferred embodiments of display devices according to the present invention.

Embodiment 2-1

Figure 16:
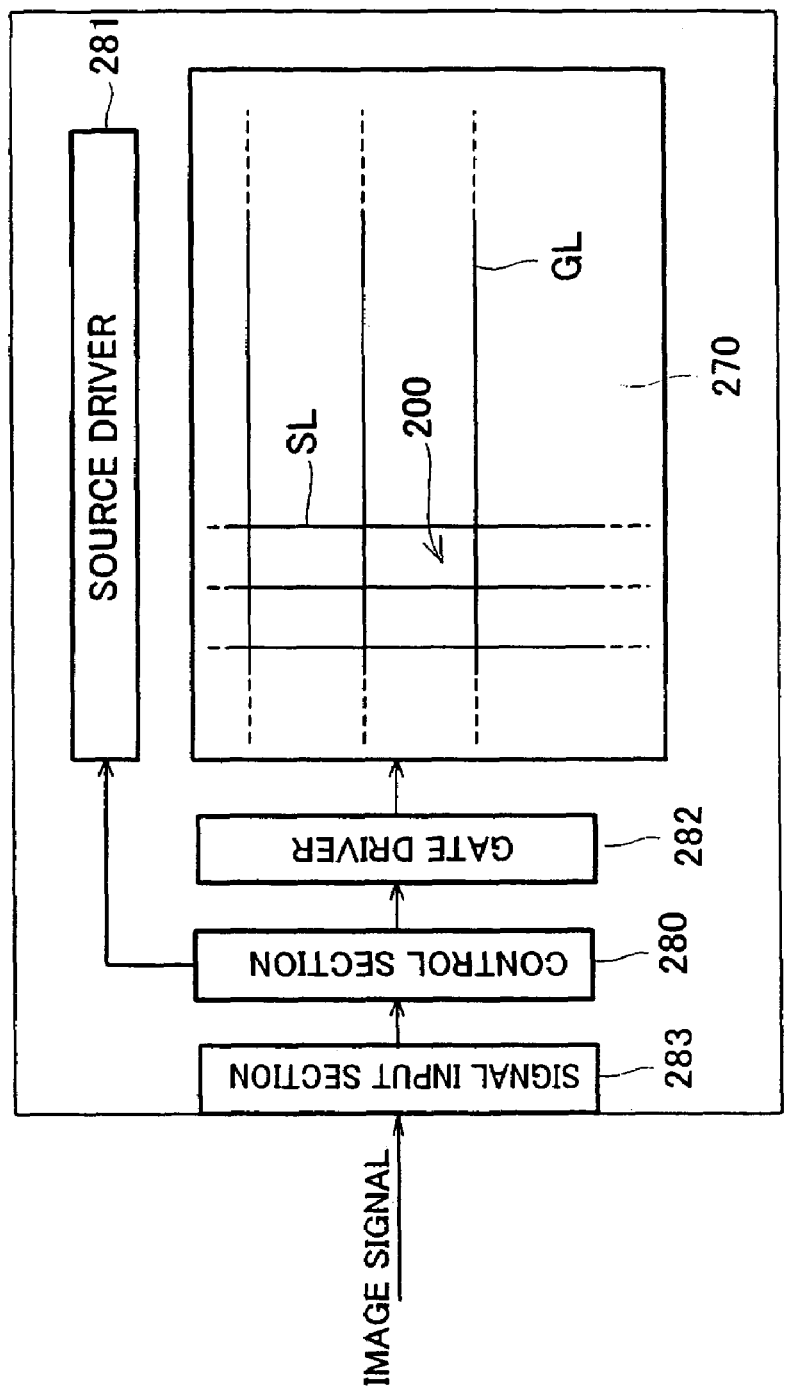
FIG. 16 is a schematic view illustrating the configuration of a display device according to embodiment 2-1 of the present invention.
Figure 17A:
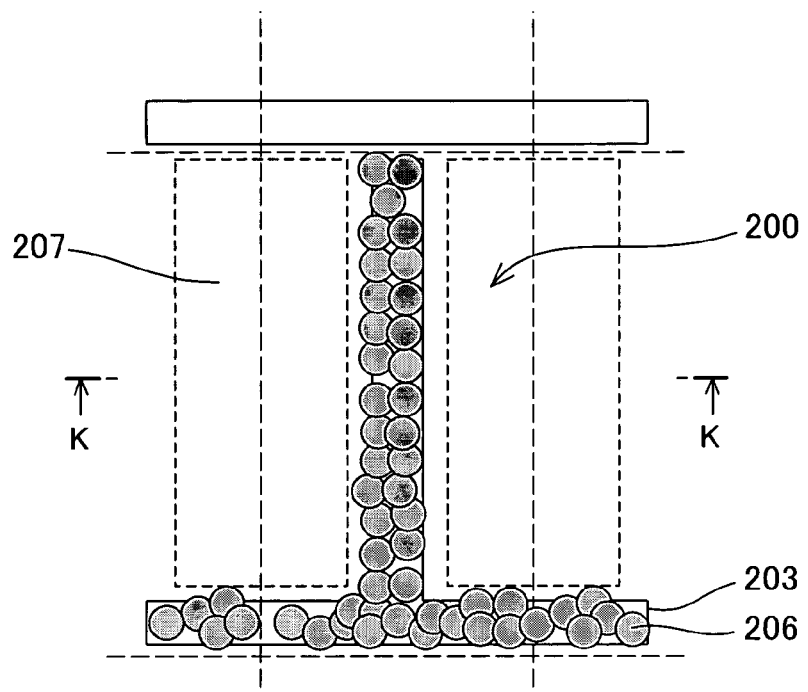
FIG. 17A is a see-through plan view illustrating an arrangement of a pixel forming part of an image display medium included in the display device according to embodiment 2-1 of the present invention and a white display operation of the pixel.

FIG. 16 is a schematic view illustrating the configuration of a display device according to embodiment 2-1 of the present invention; FIG. 17A is a see-through plan view illustrating the structure of a pixel 200 forming part of an image display medium 270 included in the display device according to embodiment 2-1; and FIG. 17B is a sectional view taken on line K-K of FIG. 17A.

As shown in FIG. 16, the display device includes a display section comprising image display medium 270. The image display medium 270 includes an active-matrix substrate (hereinafter referred to as "TFT array substrate") 211, an opposite substrate 210 disposed opposite to the TFT array substrate 211, and positively charged black particles 206 encapsulated in a space 209 defined between the TFT array substrate 211 and the opposite substrate 210, as shown in FIGS. 17A and 17B. The TFT array substrate 211 has a surface on which first electrodes 203 and second electrodes 204 are arranged.

Figure 17B:
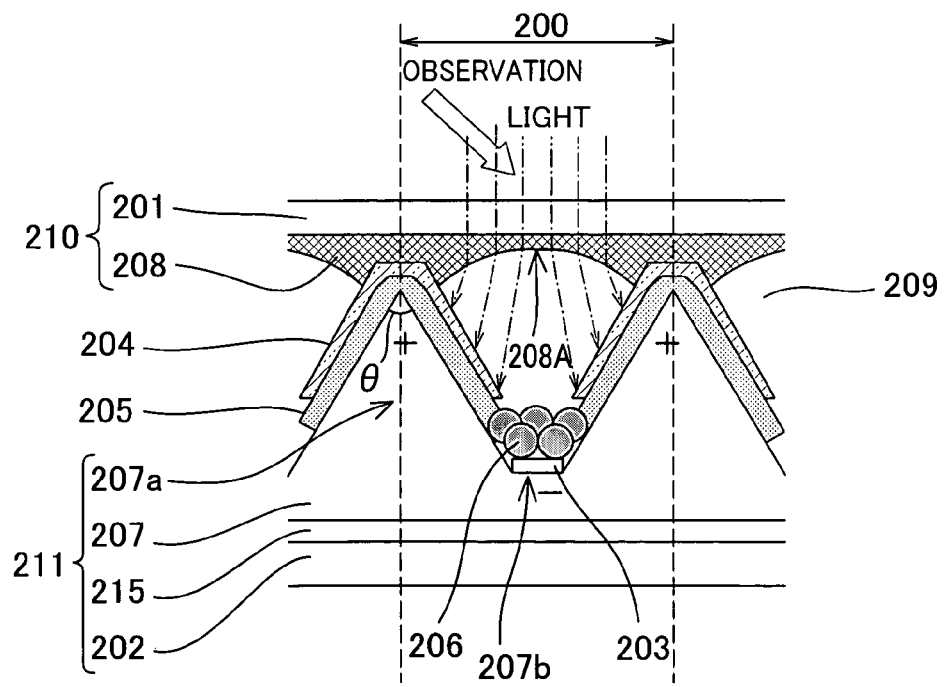
FIG. 17B is a schematic sectional view taken on line K-K of FIG. 17A.

Referring to FIGS. 16 to 17B, plural source lines SL and plural gate lines GL are arranged to intersect each other perpendicularly on the TFT array substrate 211 in plan view. Each of the regions delimited by the gate lines GL and the source lines SL constitutes one pixel 200. A plurality of such pixels 200 are arranged in a matrix to form the image display medium 270. Since the display device according to this embodiment is, for example, a mobile display device calling for high definition, the display device has a definition of 230 dpi and a pixel pitch of 110 μm. Though not shown, the TFT array substrate 211 is provided with a well-known thin film transistor (TFT) as a switching element for each pixel 200. The drain region of such a TFT is connected to first electrode 203 located on the TFT array substrate 211 side. Thus, the display device according to this embodiment is of the active drive type formed with such TFTs for respective pixels 200.

In the periphery of the image display medium 270 are disposed a source driver 281 for driving the source lines SL and a gate driver 282 for driving the gate lines GL. Further, a control section 280 is disposed in the periphery for controlling the source driver 281 and the gate driver 282 in accordance with an image signal to be inputted from outside. In the display device thus constructed, the control section 280 outputs control signals to the gate driver 282 and the source driver 281, respectively, in accordance with an image signal inputted to a signal input section 283 from outside. In response, the gate driver 282 outputs a gate signal to the gate lines GL to turn on the switching elements (TFTs) of respective pixels 200 sequentially, while on the other hand, the source driver 281 inputs a video signal to the pixels 200 through the source lines SL sequentially in a manner timed to the operation of the gate driver 282. Thus, black particles 206 are caused to travel in the space 209 of each pixel 200 between the TFT array substrate 211 and the opposite substrate 210. As a result, the viewer observes an image corresponding to the video signal displayed on the display device.

Next, the arrangement of the image display medium 270 shown in FIG. 16 will be described with reference to FIGS. 17A and 17B.

As shown in FIG. 17B, each pixel 200 has black particles 206 encapsulated in the space 209 between the TFT array substrate 211 and the opposite substrate 210.

The TFT substrate 211 includes a flexible first substrate 202 of resin having a thickness not more than 0.5 mm, for example 0.1 mm to 0.2 mm. The first substrate 202, which may be either transparent or opaque, is formed from a transparent resin in this embodiment. Though not shown, the gate lines and the source lines are arranged to intersect each other perpendicularly on the first substrate 202 in plan view. Each gate line and each source line are insulated from each other with an insulating layer. Each of the regions defined by the gate lines and the source lines is one pixel region. A TFT is formed as a switching element at each of the points of intersection of the gate lines and the source lines. The TFT comprises a gate electrode formed on the first substrate 202, a gate insulator formed on the gate electrode, source electrode and drain electrode, which are formed on the gate insulator and the first substrate 202, and an organic semiconductor layer for forming a channel. The TFT is formed using an organic material by a printing process or the like. The formation of such TFTs on the TFT array substrate will not impair the flexibility of the TFT array substrate. The gate electrode and source electrode of each TFT are connected to a relevant one of the gate lines and a relevant one of the source lines, respectively. Here, the source lines, gate lines, TFTs and insulating layers insulating these components are generally illustrated as an interconnection layer 215.

The TFT array substrate 211 has an uneven layer 207 comprising resin on the interconnection layer 215. The uneven layer 207 has projecting portions 207a arranged in both the longitudinal direction and the lateral direction at predetermined intervals repeatedly, each of the projecting portions 207 having a triangular shape in section and extending longitudinally of each pixel. The vertical angle θ of each projecting portion 207a is determined from the pixel pitch and the cell gap. A display device of higher definition requires a more acute vertical angle θ, provided the cell gap is constant. For example, when the definition is 230 dpi and the cell gap is 110 μm as in this embodiment, each projecting portion 207a has a sectional shape of an isosceles triangle having a vertical angle θ of about 90°. A depressed portion 207 having a flat bottom is formed between each pair of adjacent ones of the plural projecting portions 207a, which are arranged in both the longitudinal direction and the lateral directions as described above. Accordingly, such depressed portions 207b form a lattice pattern in plan view. The uneven layer 207 having such projecting portions 207a and depressed portions 207b can be formed by patterning a photosensitive resin layer or working a thermoplastic resin by embossing or a like forming process.

On the bottom of the depressed portions 207b of the uneven layer 207 is disposed rectangular first electrode 203. The first electrode 203 is comb-shaped in plan view. Such a comb-shaped first electrode 203 is so arranged as to be shared by plural pixels 200 arranged in the lateral direction. However, segments of the first electrode 203 corresponding to respective pixels are insulated from each other. Each segment of the first electrode 203 corresponding to each pixel is connected to the drain electrode of each TFT included in the interconnection layer 215 through the uneven layer 207. The first electrode 203 may comprise a transparent electrical conductor such as ITO or an opaque metal film. In this embodiment the first electrode 203 comprises ITO.

A white layer 205 is formed to cover the surface of each projecting portion 207a of the uneven layer 207. The white layer 205 comprises resin and a substance that has a high refractive index and scatters light well, for example $TiO_2$ (titania) or $Al_2O_3$ (alumina), the substance being dispersed in the resin. The white layer 205 has a thickness of 20 μm or more and functions as a reflecting layer. Further, second electrode 204 comprising a transparent electrical conductor such as ITO is formed to cover the white layer 205. Such second electrodes 204 are respectively disposed on side surfaces (slopes) of each projecting portion 207a which are situated across the top of the projecting portion 207a. All the second electrodes 204 are connected to each other via common interconnection not shown. The common interconnection is grounded thereby being connected to the grounded side of the source driver.

The opposite substrate 210 comprises a second substrate 201 and a microlens 8. The second substrate 201 comprises a flexible transparent resin and having a thickness of 0.5 mm or less, for example, 0.1 mm to 0.2 mm. The second substrate 201 has an inner side on which the microlens 208 is located. The microlens 208 comprises a plurality of lens portions 208A arranged at a predetermined pitch on the side facing the TFT substrate 211, the lens portions 208A each having a concave curved surface. Such a microlens 208 is formed, for example, by patterning a transparent photosensitive resin layer or working a transparent thermoplastic resin by embossing or a like forming process. The opposite substrate 210 is mounted on the TFT array substrate 211 in such a manner that an intermediate portion between adjacent lens portions 208A is fitted over the top portion of corresponding projecting portion 207a. Thus, a plurality of spaces 209 separated from each other by adjacent projecting portions 207a are defined between the uneven layer 207 and the microlens 208. Here, each space 209 is filled with air and accommodates first electrode 203 on the bottom thereof. As will be described later, the lens portion 208A located above each space 209 is configured to allow light incident from the opposite substrate 201 side to illuminate white layer 205 facing the space 209 selectively. Black particles 206 are encapsulated in each space 209. In this embodiment, the thickness of such a cell (cell gap) thus encapsulating black particles 206 between the two substrates 210 and 211 is 110 μm. Black particles 206 are spherical black particles synthesized from acrylic particles, black carbon or the like, which have a particle diameter ranging from about 1 μm to about 10 μm and a true specific gravity of 1.2 g/cm$^2$. The packing of black particles 206 encapsulated in each space 209 separated from another one with projecting portions 207a of the uneven layer 207 is 10% to 30% by volume.

As described above, in this embodiment one pixel region delimited by source lines and gate lines includes one space 209. That is, the spacing between the top portions of each pair of adjacent projecting portions 207a of the uneven layer 207 defines one pixel 200. A plurality of such pixels 200 forming the image display medium 270 include their respective spaces 209 which are independent of each other pixel by pixel. Accordingly, black particles 206 do not travel between adjacent pixels and the packing of particles 206 in each space 209 by volume is constant.

Next, the display operation of the image display medium 270 having the aforementioned construction will be described by focusing pixel 200, which is a constitutional unit of the image display medium 270. FIGS. 17A and 17B illustrate a white display operation of pixel 200, while FIGS. 18A and 18B illustrate a black display operation of pixel 200.

In the white display operation as illustrated in FIGS. 17A and 17B, a signal voltage corresponding to an image is applied across the first and second electrodes 203 and 204. By so doing, the first electrode 203 becomes negative electrode and the second electrode 204 becomes positive electrode. Then, positively charged black particles 206 present in space 209 are attracted toward and adhere to the first electrode 203 which is negative electrode by Coulomb force. Here, black particles 206 start traveling at a voltage of 80 V and complete their travel at a voltage of 250V. On the other hand, the surface of the second electrode 204 which is positive electrode is free from black particles 206, since black particles 206 are gathered on the first electrode 203 side. Accordingly, the white layer 205 underlying the transparent second electrode 204 is observed through the second electrode 204. Particularly, since the first electrode 203 is comb-shaped extending not only in the longitudinal direction but also in the lateral direction of pixel 200, the first electrode 203 has an increased area to which black particles 206 can adhere. For this reason, black particles 206 can be removed from around the second electrode 204 efficiently. Though black particles 206 are larger in size than those for use in electrophoretic display, such an increased area (increased accommodation space) allows even such larger particles to adhere thereto sufficiently. Further, since the first electrode 203 is disposed on the bottom of depressed portion 207b of the uneven layer 207, black particles 206 are allowed to travel toward and gather around the first electrode 203.

With such black particles 206 in a dispersed state, light incident from the opposite substrate 210 side is refracted by lens portion 208A of the microlens 255 as indicated by arrows in the figure. Thus, light illuminates white layer 205 selectively and is reflected by selected regions of white layer 205, whereas depressed portion 207 of the uneven layer 207 at which black particles 206 are gathered can hardly be illuminated with light. Therefore, black particles 206 can hardly be observed from the opposite substrate 210 side, thus realizing white display of good quality based on white layer 205.

Figure 18A:
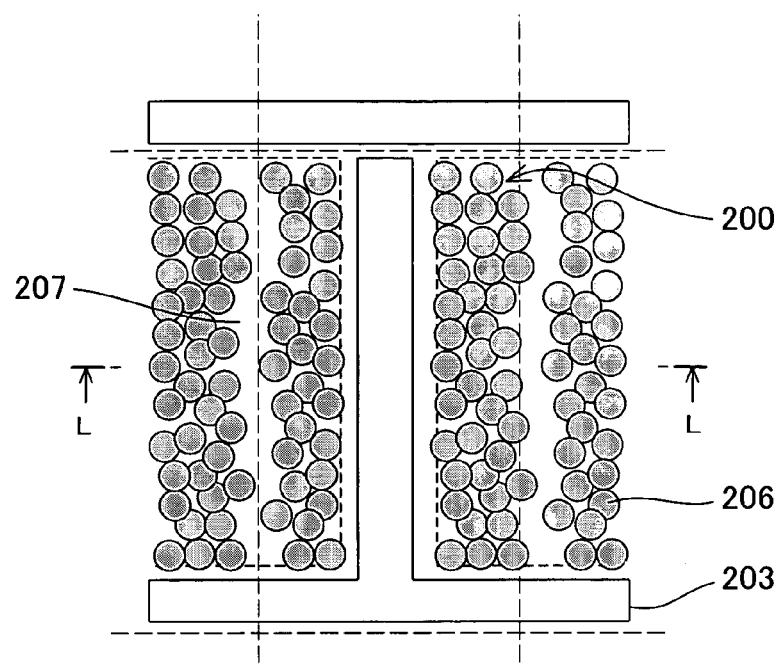
FIG. 18A is a see-through plan view illustrating an arrangement of the pixel forming part of the image display medium included in the display device according to embodiment 2-1 of the present invention and a black display operation of the pixel.
Figure 18B:
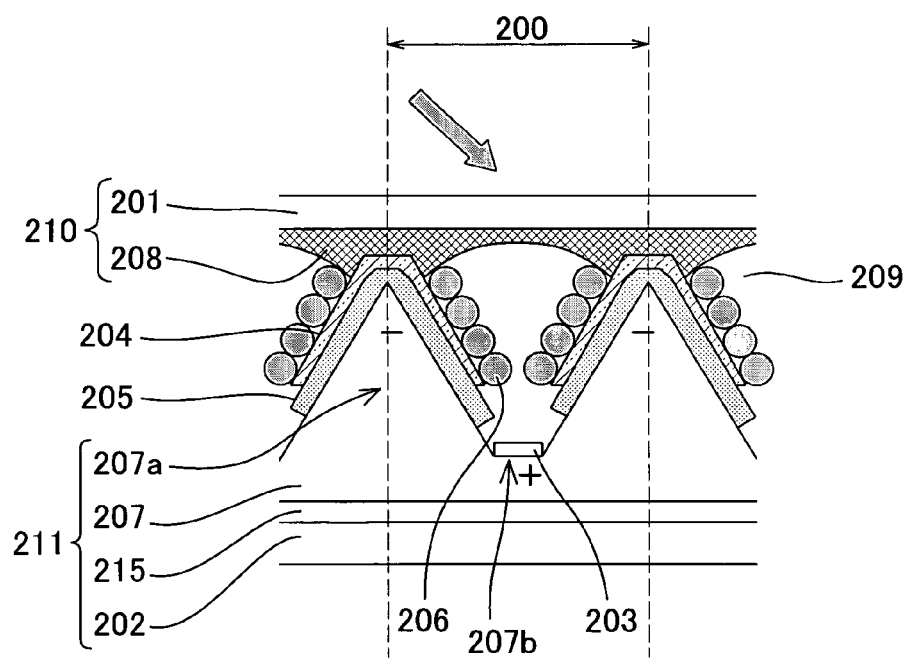
FIG. 18B is a schematic sectional view taken on line L-L of FIG. 18A.

On the other hand, in the black display operation as illustrated in FIGS. 18A and 18B, a signal voltage of a polarity opposite to the polarity of the signal voltage applied in the case of white display is applied across the first and second electrodes 203 and 204. By so doing, the first electrode 203 becomes positive electrode and the second electrode 204 becomes negative electrode. Then, positively charged black particles 206 are caused to travel toward and adhere to the second electrode 204 which is negative electrode by Coulomb force, thereby covering up the surface of the second electrode 204. When pixel 200 is viewed from the opposite substrate 210 side with black particles 206 thus dispersed, black particles 206 are observed whereas white layer 205 can hardly be observed, since white layer 205 underlying the second electrode 204 is covered up with black particles 206. Thus, black display of good quality based on black particles 206 is realized.

As described above, this embodiment realizes white display by collecting black particles 206 into depressed portion 207b of the uneven layer 207 while refracting light with the microlens 208 so as not to allow the depressed portion 207b to be observed, thereby offering improved contrast. In the black display operation it is sufficient to cover up white layer 205 located at projecting portion 207a of the uneven layer 207 which can be illuminated with light and hence can participate in display. Therefore, white layer 205 can be covered up efficiently without any void. Thus, this case also offers improved contrast. In this way this embodiment offers improved display quality in white display and black display both, which results in markedly improved contrast. At an equal driving voltage for example, the prior art construction exhibits a contrast of 6 to 9, whereas the construction according to this embodiment exhibits an improved contrast of 12 to 15. The image display medium thus improved in contrast can realize satisfactory contrast even when the spacing between the TFT array substrate 211 and the opposite substrate 210 (cell gap) is small. Thus, it is possible to make the display device thinner, enhance the response speed and lower the driving voltage.

Figure 1A:
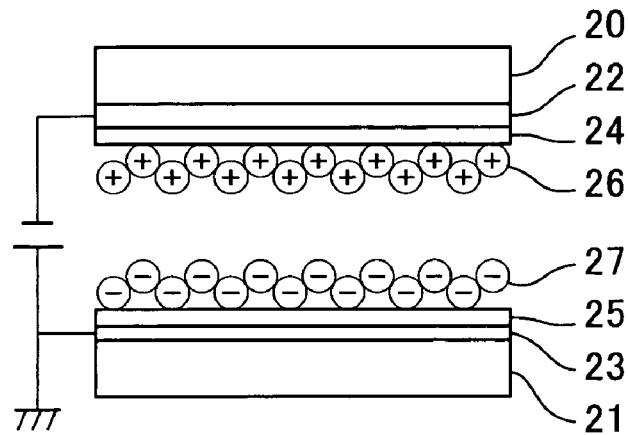
FIG. 1A is a schematic view illustrating the construction of a prior art display device and a black display operation of the device.
Figure 1B:
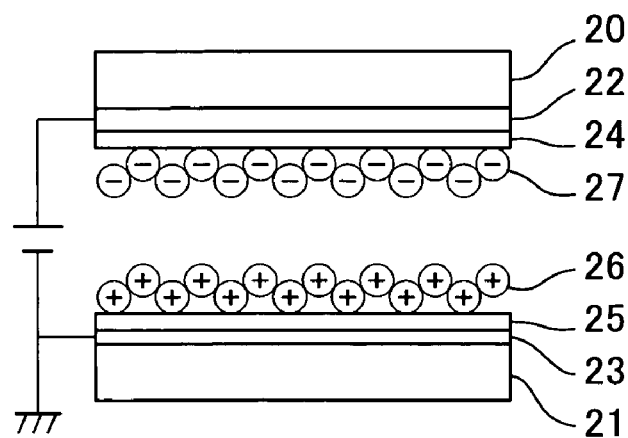
FIG. 1B is a schematic view illustrating the construction of the prior art display device and a white display operation of the device.

Since a single kind of black particles 206 travel in space 209 in both of the white display operation and the black display operation, there will not occur obstruction to travel of particles by another kind of particles, which occurs in the prior art display device using plural kinds of colored particles having different polarities as shown in FIGS. 1A and 1B. Further, black particles 206 traveling in a gaseous phase has a higher traveling speed than in a liquid phase. Moreover, since the display device according to this embodiment is of an arrangement in which first electrode 203 is disposed at the bottom of depressed portion 207b of the uneven layer 207 while second electrode 204 disposed on the slope of projecting portion 207a of the uneven layer 207, black particles 206 can travel between the electrodes more rapidly than in an arrangement having the electrodes disposed on a flat surface. For this reason, the display device according to this embodiment offers an improved response speed and a lowered driving voltage.

In this embodiment, the projecting portion 207a of the uneven layer 207 serves also as a space retainer member (so-called "spacer") for retaining space 209 between the TFT array substrate 211 and the opposite substrate 210, that is, for supporting the two substrates 211 and 210. Therefore, this embodiment does not require any separately-provided space retainer member which is necessary to retain the space between the substrates in the prior art construction.

Further, such projecting portions 207a extend to reach the opposite substrate 210 in this embodiment and hence function as partition wall separating one pixel from another. Thus, spaces 209 are separated from and independent of each other pixel by pixel. For this reason, black particles 206 can be prevented from aggregating at a specific location in the image display medium irrespective of the position of the image display medium and, hence, the amount of black particles 206 packed in the space of each pixel can be kept constant. Thus, it is possible to prevent occurrence of display irregularities.

Embodiment 2-2

Figure 19A:
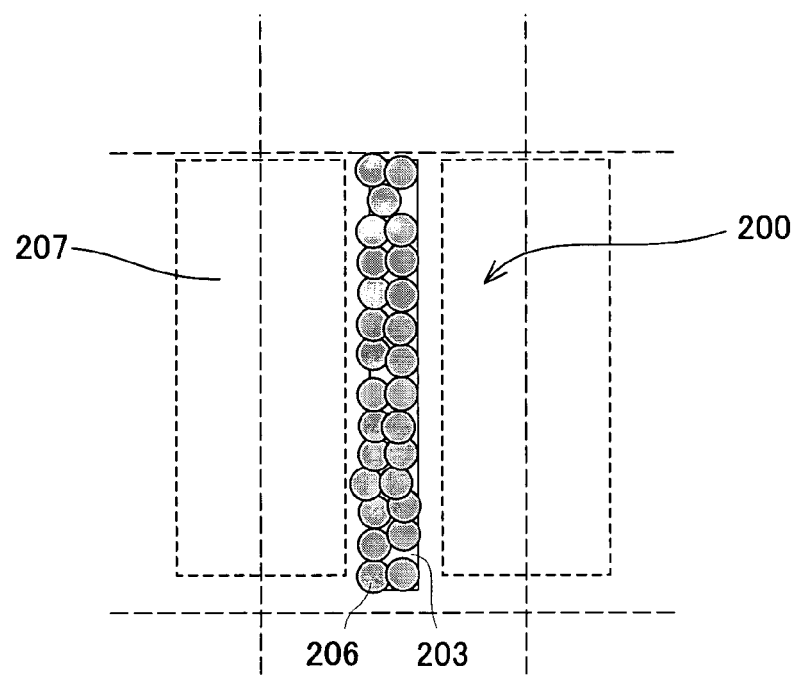
FIG. 19A is a see-through plan view illustrating an arrangement of a pixel forming part of an image display medium included in a display device according to embodiment 2-2 of the present invention and a white display operation of the pixel.
Figure 19B:
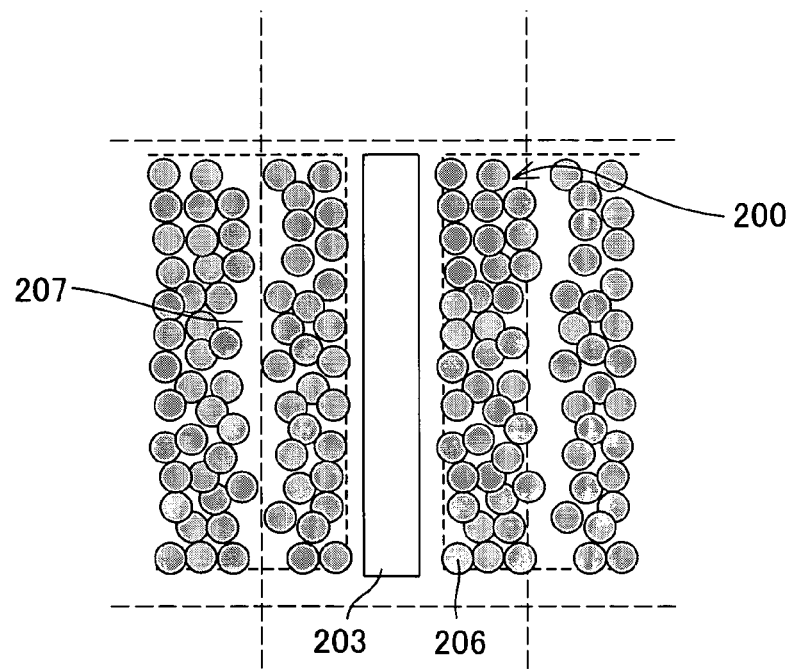
FIG. 19B is a see-through plan view illustrating an arrangement of the pixel forming part of the image display medium included in the display device according to embodiment 2-2 of the present invention and a black display operation of the pixel.

FIGS. 19A and 19B are schematic plan views each illustrating an arrangement of an image display medium included in a display device according to embodiment 2-2 of the present invention. FIG. 19A illustrates a white display operation of the image display medium, while FIG. 19B illustrates a black display operation of the image display medium.

The image display medium according to this embodiment comprises pixels each having the same structure as in embodiment 2-1, but differs from embodiment 2-1 in the following features. That is, in this embodiment depressed portions 207b of uneven layer 207 are provided for respective pixels 200 independently of each other and are formed to extend only in the longitudinal direction of pixel, but not in the lateral direction of pixel. A first electrode 203 is disposed in each depressed portion 207b. Thus, this embodiment has rectangular first electrodes 203 provided for respective pixels 200 and extending in the longitudinal direction of pixel independently of each other, unlike embodiment 2-1 where the common comb-shaped first electrode 203 is disposed to extend in depressed portion 207b extending along each row of pixels 200.

With such an arrangement, in the white display operation black particles 206 are attracted by and travel toward the first electrode 203 located at depressed portion 207b of the uneven layer 207 extending in the longitudinal direction of the pixel of interest, thus taking refugee into the depressed portion 207b as shown in FIG. 19A. In the black display operation, on the other hand, black particles 206 are attracted by and travel toward the second electrode 204 located at projecting portion 207a of the uneven layer 207 as shown in FIG. 19B, as in embodiment 2-1. Thus, this embodiment has advantages similar to those of embodiment 2-1.

Embodiment 2-3

Figure 20A:
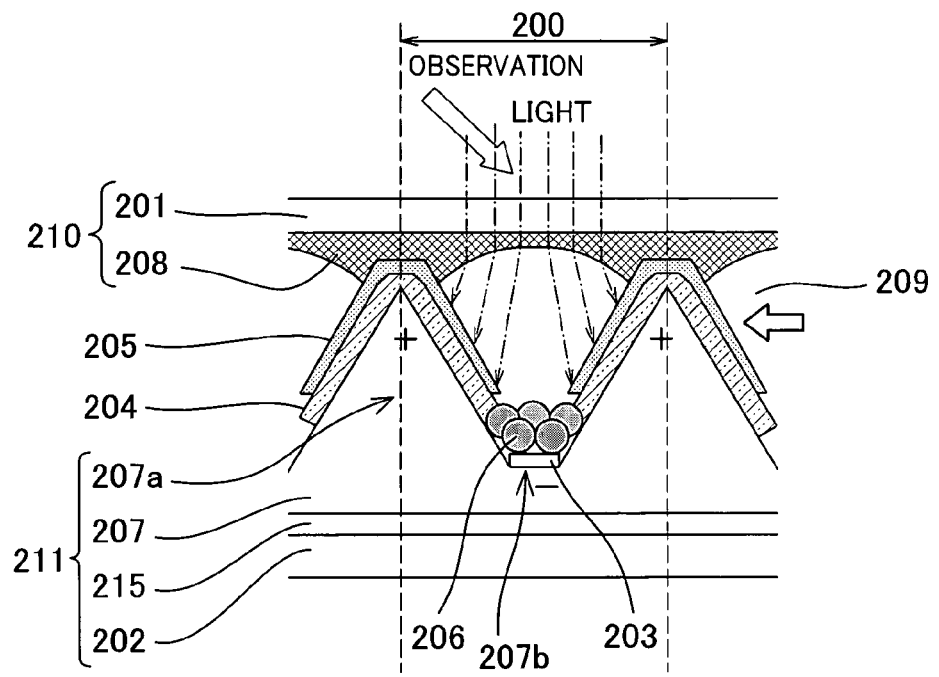
FIG. 20A is a see-through plan view illustrating an arrangement of a pixel forming part of an image display medium included in a display device according to embodiment 2-3 of the present invention and a white display operation of the pixel.
Figure 20B:
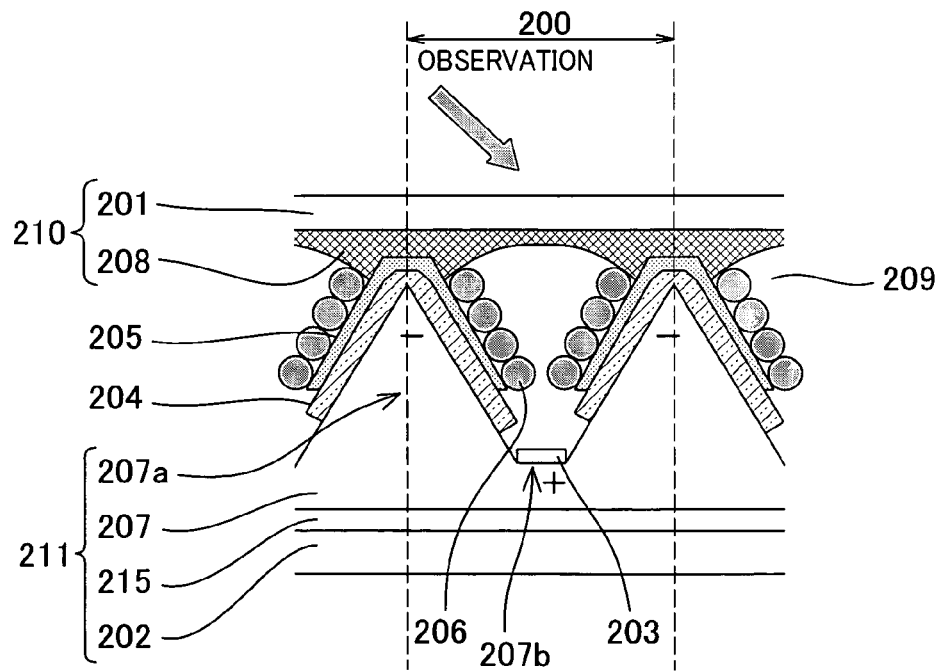
FIG. 20B is a see-through plan view illustrating an arrangement of the pixel forming part of the image display medium included in the display device according to embodiment 2-3 of the present invention and a black display operation of the pixel.

FIGS. 20A and 20B are schematic plan views each illustrating an arrangement of an image display medium included in a display device according to embodiment 2-3 of the present invention. FIG. 20A illustrates a white display operation of the image display medium, while FIG. 20B illustrates a black display operation of the image display medium.

The image display medium according to this embodiment comprises pixels each having the same structure as in embodiment 2-1, but differs from embodiment 2-1 in the following features. That is, this embodiment includes second electrode 204 and white layer 205, which are stacked in the order reverse to the order in which they are stacked in embodiment 2-1. Specifically, second electrode 204 is formed on the surface of projecting portion 207a of the uneven layer 207 and white layer 205 is formed on the second electrode 204, as shown in FIGS. 20A and 20B. In this case, the second electrode 204 may be transparent or may comprise an opaque metal film. Here, the thickness of white layer 205 is 20 μm or more.

With such an arrangement, in the white display operation black particles 206 are caused to travel toward the first electrode 203 located at depressed portion 207b of the uneven layer 207, as shown in FIG. 20A. Thus, white layer 205 is exposed to realize white display. In the black display operation, on the other hand, black particles 206 are attracted by and caused to travel toward second electrode 204 by Coulomb force, as shown in FIG. 20B. Since second electrode 204 underlies white layer 205 in this embodiment, black particles 206 adhere to the surface of white layer 205 after their travel. Accordingly, white layer 205 is covered up with black particles 206, thus resulting in black display based on black particles 206.

Like embodiment 2-1, this embodiment has an arrangement in which depressed portion 207b of the uneven layer 207 is formed to extend in both of the longitudinal direction and lateral direction of pixel and comb-shaped first electrode 203 common to pixels is disposed in the depressed portion 207b. However, a variation of this embodiment is possible in which depressed portion 207b of uneven layer 207 are formed to extend only in the longitudinal direction of pixel, but not in the lateral direction of pixel and first electrodes 203 are formed in depressed portion 207b independently of each other pixel by pixel.

Other Embodiments Included in Embodiment Group 2

In each of the above-described embodiment 2-1 to 2-3, uneven layer 207 is formed on the surface of TFT array substrate 211 to define depressed portion 207b and first electrode 203 is disposed in depressed portion 207 for collecting black particles 206 in depressed portion 207b. Embodiment group 2 may include an embodiment in which TFT array substrate 211 has a flat surface without the provision of uneven layer 207. For example, such an arrangement is possible that first and second electrodes 203 and 204 are disposed on the flat surface of TFT array substrate 211 to cause black particles 206 to travel along the flat surface of the TFT array substrate 211. The aforementioned arrangement in which the surface of TFT array substrate 211 is made uneven and first electrode 203 is disposed in depressed portion 207b as in embodiments 2-1 to 2-3, is preferable from the viewpoint of lowering the driving voltage because this arrangement allows black particles 206 to travel more easily and rapidly than the arrangement for causing black particles 206 to travel along the surface of TFT array substrate 211 made flat.

While an uneven pattern is formed along the interface between the TFT array substrate 211 and the space between the two substrates 211 and 210 by the provision of the uneven layer 207 on the TFT array substrate 211 in each of the above-described embodiments 2-1 to 2-3, such an arrangement for forming an uneven pattern along the interface with the space is not limited thereto. For example, it is possible to provide white layer 205 formed with an uneven pattern on TFT array substrate 211 having a flat surface.

In each of the above-described embodiments 2-1 to 2-3, white layer 205 is provided which contains particles for scattering light such as $TiO_2$ as dispersed therein. However, the constitution of white layer 205 is not limited thereto. For example, it is possible to provide white layer 205 that can be observed to be white by the provision of an uneven pattern for scattering light.

Though each of the above-described embodiments uses positively charged black particles 206, black particles 206 may be negatively charged. In such a case, signal voltage is applied so that first electrode 203 and second electrode 204 become positive electrode and negative electrode, respectively, to realize white display. Alternatively, signal voltage is applied so that first electrode 203 and second electrode 204 become negative electrode and positive electrode, respectively, to realize black display. This is reverse to the cases of embodiments 2-1 to 2-3.

Though each of the above-described embodiments 2-1 to 2-3 employs the combination of black particles 206 and white layer 205, a combination of white particles and black layer may be employed. In the black display operation of such an arrangement, white particles are collected around first electrode 203 disposed in depressed portion 207b to expose the black layer, while in the white display operation white particles are collected around second electrode 204 disposed at projecting portion 207a to cover up the black layer.

While each of the above-described embodiments 2-1 to 2-3 employs the microlens 208 formed with lens portions 208A each having a concave curved surface, it is possible to employ microlens 208 formed with lens portions 208A each having a convex curved surface. In such a case, for example, an arrangement is employed such that white layer 205 is formed on first electrode 203 disposed in depressed portion 207b of uneven layer 207 while lens portion 208A of microlens 8 positioned to gather light onto white layer 205. In the white display operation black particles 206 are caused to travel toward second electrode 204 disposed at projecting portion 207a of uneven layer 207 to remove black particles 206 from white layer 205 located in depressed portion 207b, thereby exposing white layer 205. In the black display operation, on the other hand, black particles 206 are caused to travel toward first electrode 203 disposed in depressed portion 207b to cover up white layer 205 with black particles 206.

In each of the above-described embodiments 2-1 to 2-3, first substrate 203 included in the TFT array substrate 211 and second substrate 201 included in opposite substrate 210 are both formed from transparent resin. First substrate 202 of TFT array substrate 211 on the side opposite away from the viewer side need not necessarily be transparent as long as second substrate 201 included in the substrate on the viewer side, i.e. opposite substrate 210 in this case, is transparent.

Though each of the above-described embodiments 2-1 to 2-3 is configured to provide black and white display, color display is possible if color filters for red (R), green (G) and blue (B) are provided on the opposite substrate side.

Though partition wall (corresponding to projecting portion 207a of uneven layer 207) is provided pixel by pixel in each of the above-described embodiments 2-1 to 2-3, such partition wall need not necessarily be provided pixel by pixel and may be provided for every two, three or more pixels.

Projecting portion 207a of uneven layer 207 functions as partition wall in each of above-described embodiments 2-1 to 2-3. However, it is possible to employ an arrangement provided with partition wall separately, for example, an arrangement in which partition wall is formed from photosensitive resin or the like.

The sectional shape of projecting portion 207a of uneven layer 207 is not limited to those employed in above-described embodiments 2-1 to 2-3. For example, projecting portion 207a may have a triangular sectional shape having any vertical angle except 90°, a trapezoidal sectional shape having a flat top, or other sectional shape.

While each of the above-described embodiments 2-1 to 2-3 has the arrangement wherein first electrode 203, which is connected to the drain electrode of a TFT, serves as a pixel electrode while second electrode 204 serves as a common electrode, it is possible to employ an arrangement such that second electrode 204 is connected to the drain electrode of a TFT to serve as a pixel electrode while first electrode 203 serves as a common electrode. In this case second electrodes 204 serving as pixel electrodes are insulated from each other pixel by pixel and are each connected to the drain electrode of a TFT provided for each pixel.

Figure 2A:
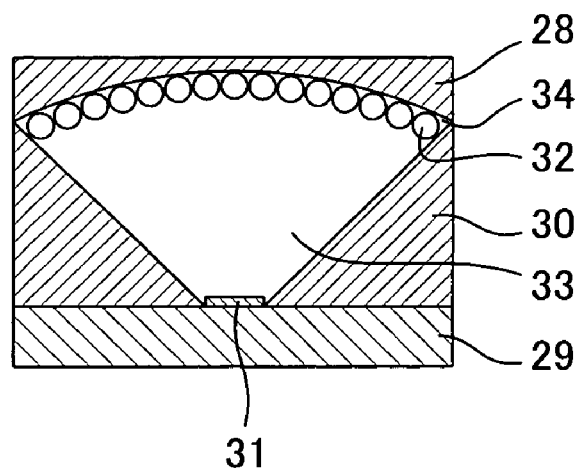
FIG. 2A is a view illustrating a sectional structure of one pixel portion of a conventional electrophoretic display device in a white display operation.
Figure 2B:
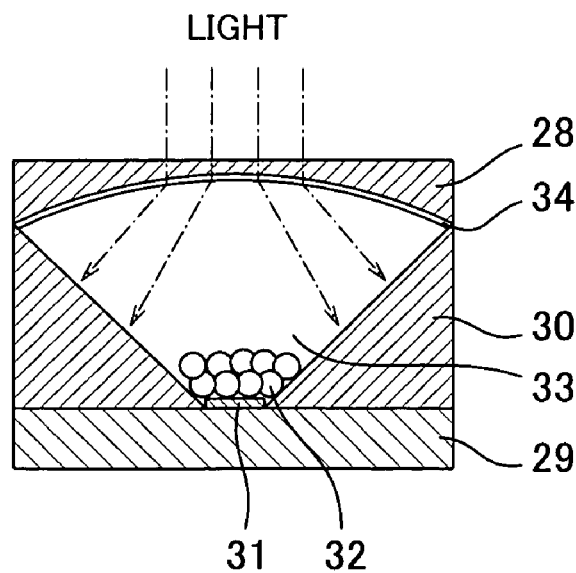
FIG. 2B is a view illustrating a sectional structure of one pixel portion of the conventional electrophoretic display device in a black display operation.

Though the present invention is applied to a display device of the active-matrix drive type in each of the above-described embodiments 2-1 to 2-3, the present invention may be applied to a display device of the passive-matrix drive type. Particularly, a dead band irresponsive to an operating voltage, stated otherwise a threshold operating voltage is essential to the present invention adapted to cause colored particles to travel in a gaseous phase and, hence, the present invention is capable of providing a display device having a passive-matrix drive configuration easily, such a passive-matrix drive configuration having a difficulty in its application to a conventional electrophoretic display device because the passive-matrix configuration undesirably allows colored particles used in such an electrophoretic display device (see FIGS. 2A and 2B) to travel in response to a slight variation in operating voltage such as crosstalk. For example, a paper display device may be of the passive-matrix drive type when it displays newspaper because the responsiveness required for display is low. On the other hand, a display device for large scale image display, which has a relatively large capacity requiring several hundred or more source lines, preferably has an active-matrix drive configuration in order for high definition display to be realized without crosstalk. The active-matrix drive is also preferable for display requiring high display responsiveness such as motion picture display.

The passive-matrix drive configuration, which does not have a switching element (TFT) provided for each pixel in the active-matrix drive configuration, includes longitudinally extending rectangular electrodes and laterally extending rectangular electrodes (hereinafter referred to as "X-electrodes and Y-electrodes) which intersect each other. A Y-electrode is applied with a signal voltage having a polarity same as or opposite to the polarity of a signal voltage applied to an X-electrode to perform on/off control over the pixel located at the point of intersection of the X-electrode and the Y-electrode. One of X-electrode and Y-electrode is connected to one of the first electrode and second electrode described above, while the other one of X-electrode and Y-electrode connected to the other one of the first electrode and second electrode. When a Y-electrode is applied with a signal voltage having a polarity opposite to the polarity of a signal voltage applied to an X-electrode, the total signal voltage applied to the relevant pixel becomes large, which causes the pixel to turn on. Alternatively, when a Y-electrode is applied with a signal voltage having a polarity same as the polarity of a signal voltage applied to an X-electrode, the signal voltage applied to the relevant pixel becomes small as a whole, which causes the pixel to turn off. In thus turning off the pixel based on offsetting between the signal voltages applied to an X-electrode and a Y-electrode, it is difficult for such two voltages to offset each other completely thereby to nullify the whole voltage applied to the relevant pixel, thus resulting in crosstalk voltage. Although such crosstalk voltage becomes a problem in an electrophoretic display device, the construction of the present invention in which colored particles travel in a gaseous phase does not allow such colored particles to travel in accordance with the voltage of possible crosstalk. Accordingly, the current display state can be maintained until a next signal voltage is input.

Embodiment Group 3

Next, description will be made of group 3 of preferred embodiments of display devices according to the present invention.

Embodiment 3-1

Figure 21:
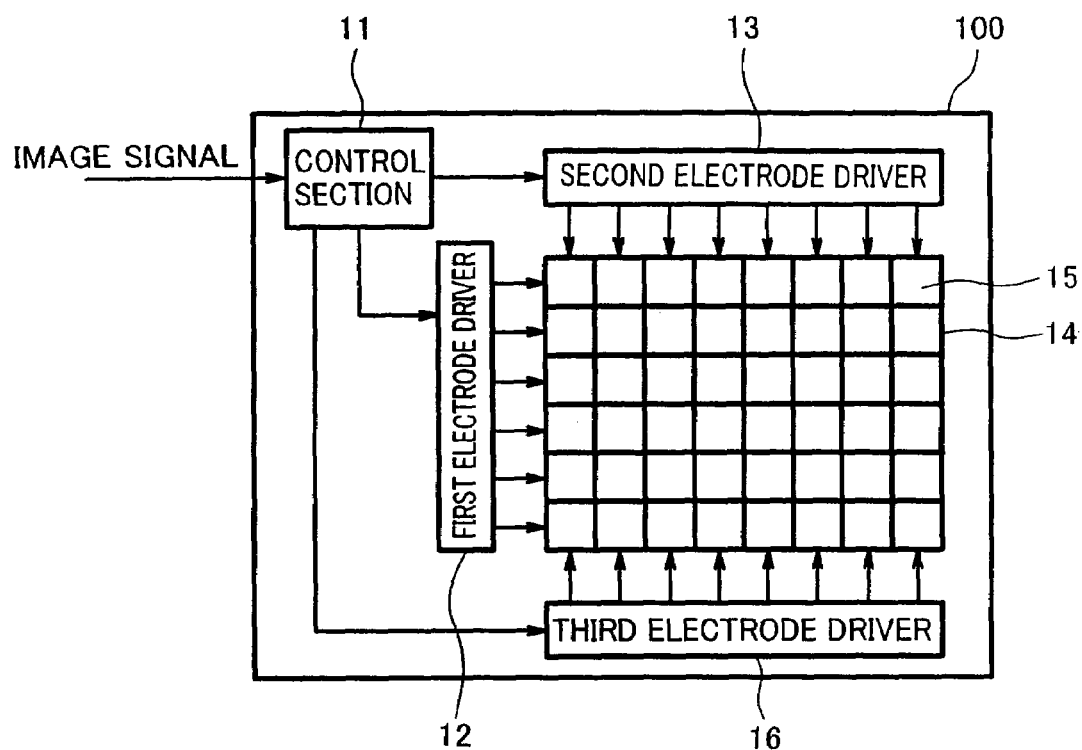
FIG. 21 is a block diagram illustrating the configuration of a display device according to embodiment 3-1 of the present invention.

A display device according to embodiment 3-1 of the present invention is of the so-called "passive-matrix drive type". FIG. 21 is a block diagram illustrating the configuration of the display device according to embodiment 3-1 of the present invention. As shown in FIG. 21, display device 100 according to this embodiment includes display section 14 having pixels 15 each provided with a first electrode, a second electrode and a third electrode, which are adapted to be driven by a first electrode driver 12, a second electrode driver 13 and a third electrode driver 16, respectively. The respective operations of the first, second and third electrode drivers 12, 13 and 16 are controlled by control section 11.

Since other features of the display device 100 according to this embodiment are similar to the corresponding features of embodiment 1-1, like reference characters are used to designate like or corresponding parts to omit description of such similar features.

Figure 22A:
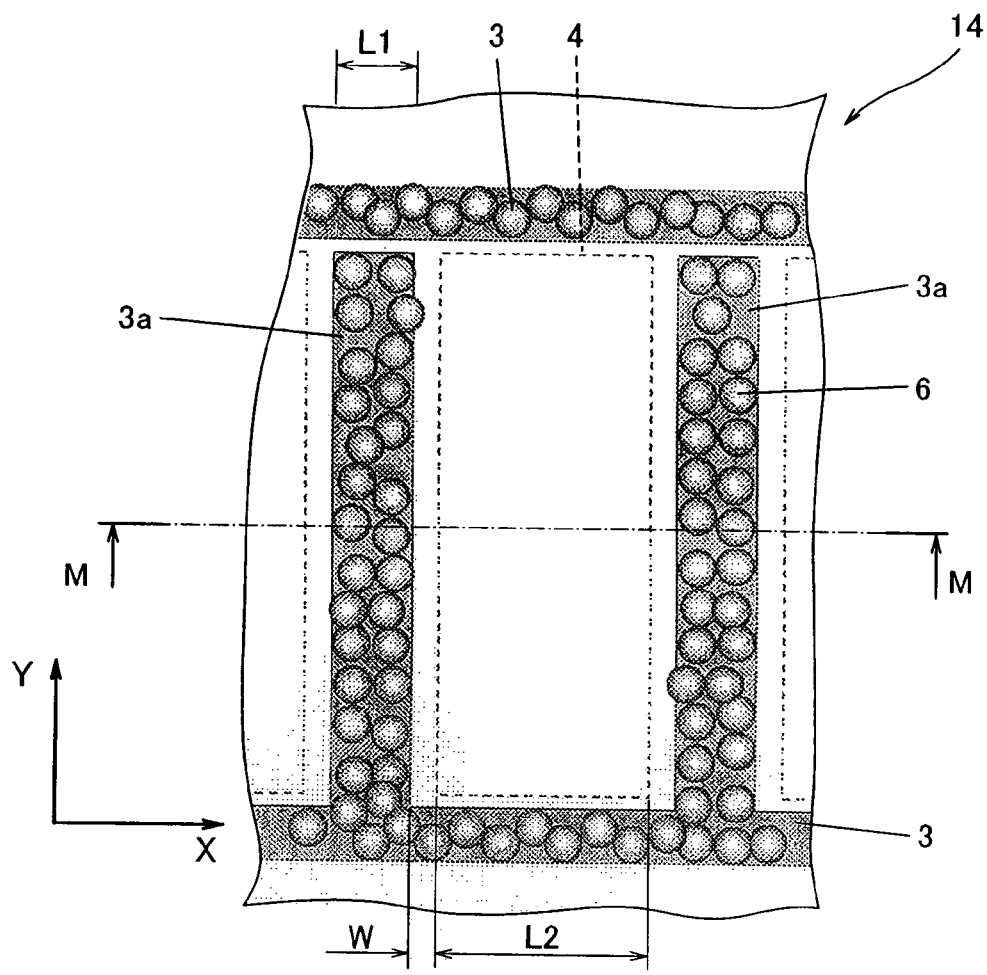
FIG. 22A is a see-through plan view illustrating an essential arrangement of a display section included in the display device according to embodiment 3-1 of the present invention in a white display operation.
Figure 22B:
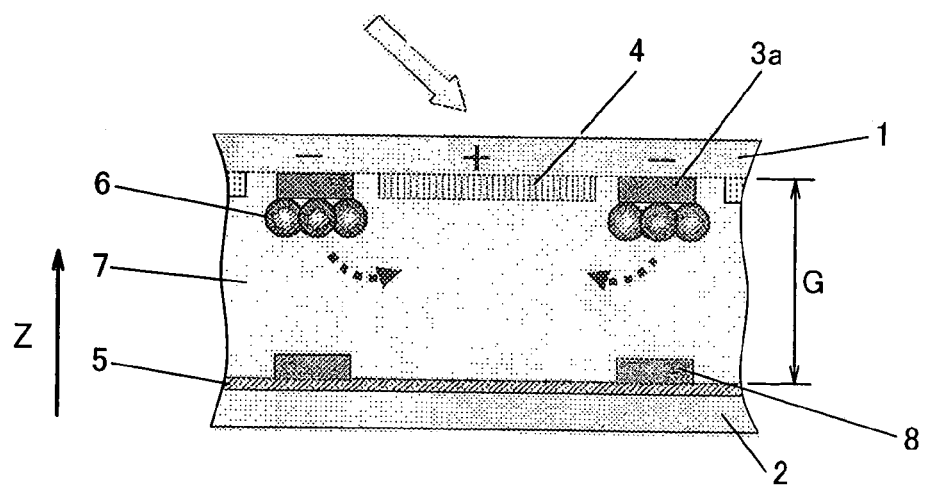
FIG. 22B is a sectional view taken on line M-M of FIG. 22A.
Figure 23A:
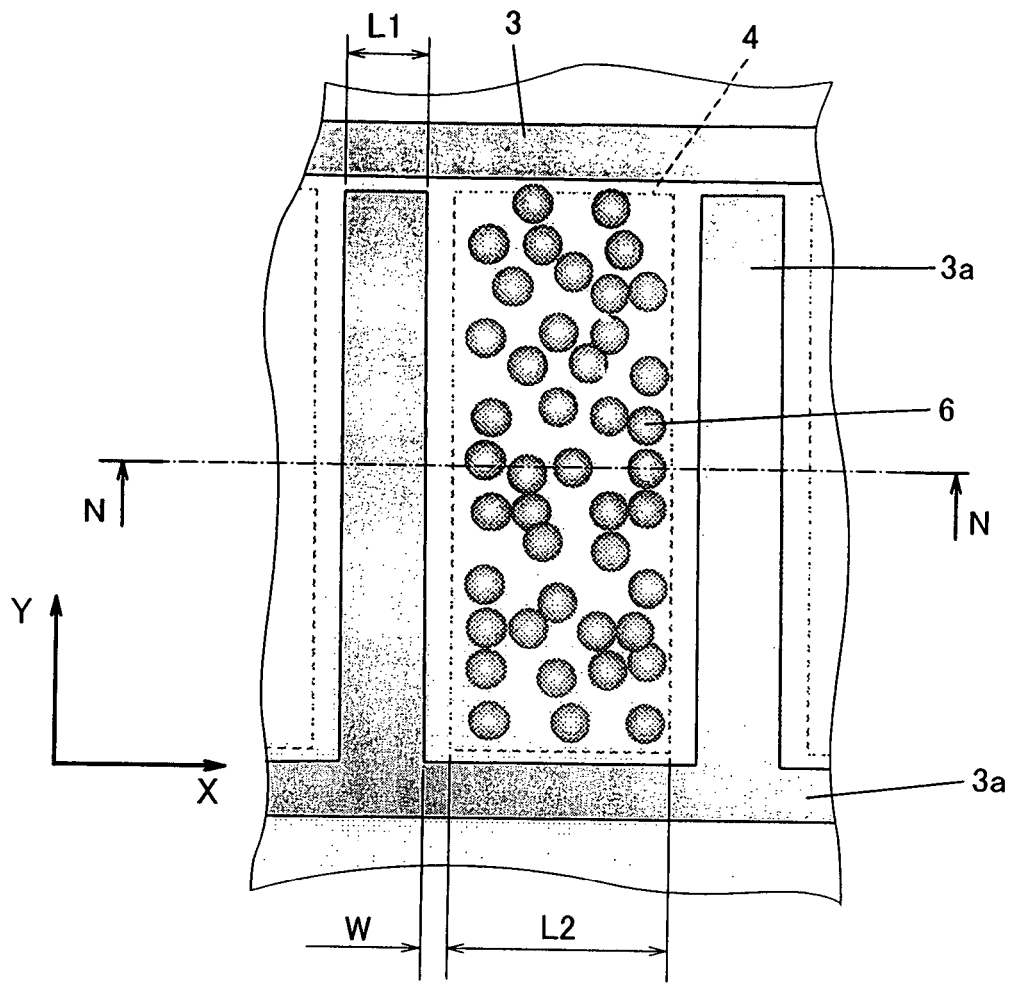
FIG. 23A is a see-through plan view illustrating an essential arrangement of the display section included in the display device according to embodiment 3-1 of the present invention in a medium gray-level display operation.
Figure 23B:
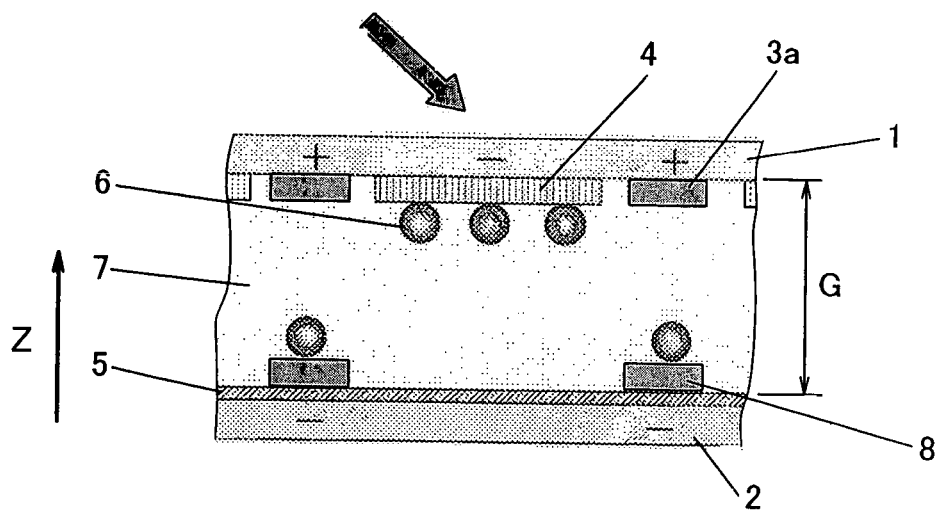
FIG. 23B is a sectional view taken on line N-N of FIG. 23A.
Figure 24A:
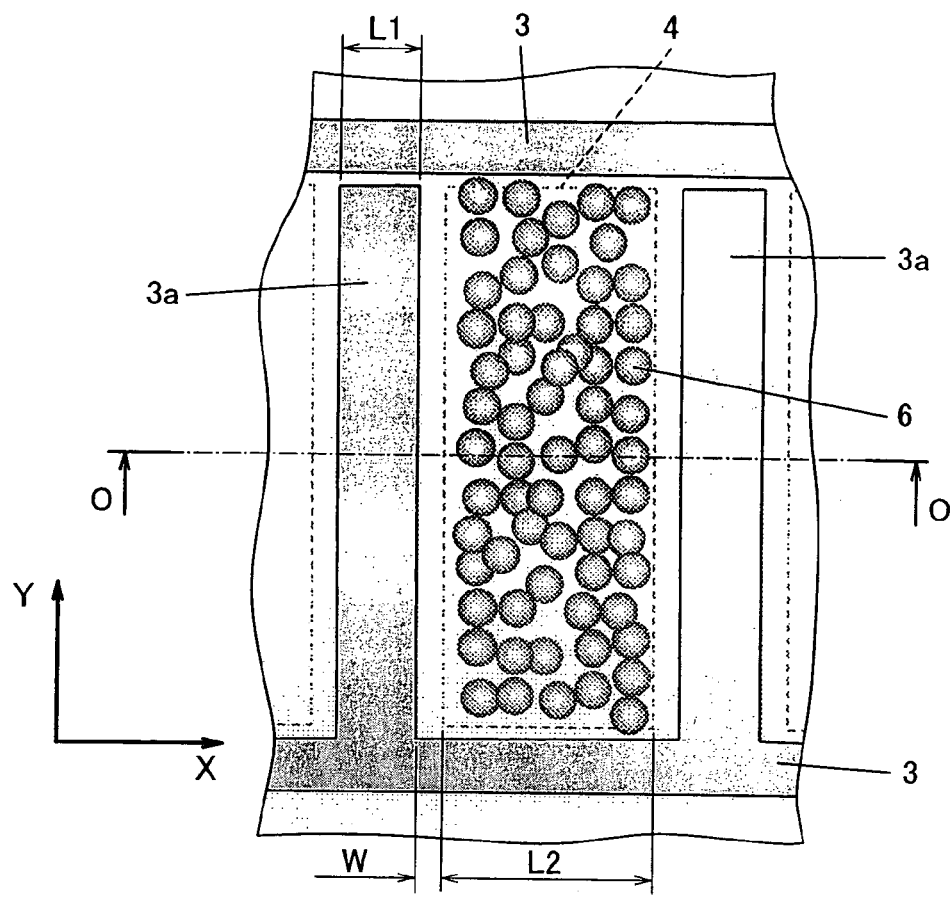
FIG. 24A is a see-through plan view illustrating an essential arrangement of the display section included in the display device according to embodiment 3-1 of the present invention in a black display operation.
Figure 24B:
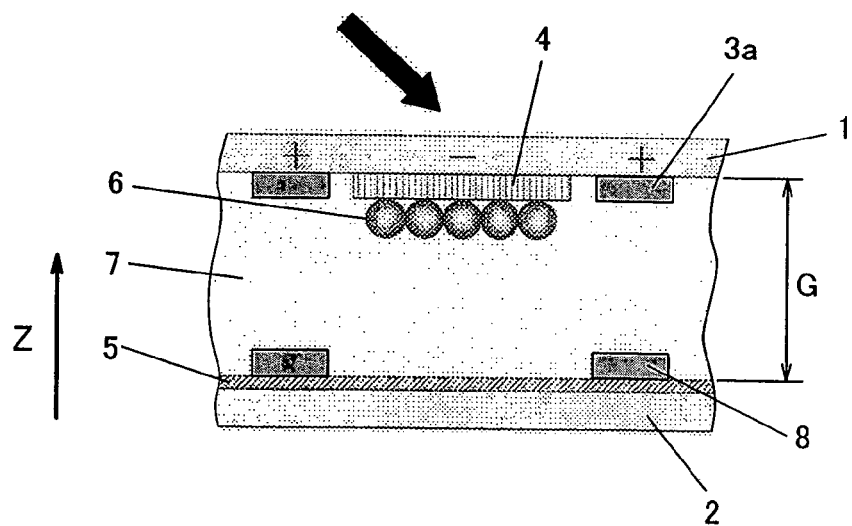
FIG. 24B is a sectional view taken on line O-O of FIG. 24A.

FIG. 22A is a see-through plan view illustrating an essential arrangement of the display section 14 included in the display device according to embodiment 3-1 of the present invention in a white display operation; FIG. 22B is a sectional view taken on line M-M of FIG. 22A; FIG. 23A is a see-through plan view illustrating an essential arrangement of the display section 14 included in the display device according to embodiment 3-1 of the present invention in a medium gray-level display operation; FIG. 23B is a sectional view taken on line N-N of FIG. 23A; FIG. 24A is a see-through plan view illustrating an essential arrangement of the display section 14 included in the display device according to embodiment 3-1 of the present invention in a black display operation; and FIG. 24B is a sectional view taken on line O-O of FIG. 24A. For ease of description, X-direction, Y-direction and Z-direction in these figures will be referred to as the lateral direction, longitudinal direction and vertical direction, respectively, of the display section 14.

As shown in FIGS. 21 to 24B, the display section 14 includes two substrates: upper substrate 1 and lower substrate 2. The upper substrate 1 and lower substrate 2 each comprise a transparent resin film having a thickness ranging from about 0.1 mm to about 0.5 mm. It should be noted that each of the upper and lower substrates 1 and 2 preferably has a thickness ranging from about 0.1 mm to about 0.2 mm in order to realize a flexible display device so-called "electronic paper".

The upper substrate 1 and the lower substrate 2 are disposed opposite to each other with spacers (not shown) intervening therebetween. An air layer 7 formed between the upper and lower substrates 1 and 2 contains a plurality of positively charged colored particles 6. The colored particles 6 are spherical black particles synthesized from acrylic particles, black carbon or the like and have a particle diameter ranging from about 2 µm to about 20 µm. The colored particles 6 preferably have a uniform particle diameter to prevent aggregation thereof.

Further, colored particles 6 preferably have a small specific gravity and excellent fluidity. A specific structure for realizing such particles is constructed by fixing spherical fine particles of silica each having a diameter of 30 nm to a spherical acrylic particle having a diameter of 5 µm in a manner to cover the entire surface thereof by a mechanochemical method or a like method. The fine silica particles used here are those electrostatically charged and, hence, the colored particles 6, as a whole, have an electrostatic property. For colored particles 6 to have a smaller specific gravity, it is desirable that the acrylic particles to be used be hollow or porous. The colored particles each having such a structure exhibit improved fluidity and, accordingly, the frictional resistance which will result during travel of the particles is decreased and the kinetic energy required for the particles to travel is also decreased. Thus, the device can operate at a higher response speed and can be driven at a lower voltage.

The aforementioned spacers maintain a gap G of about 100 µm in which the air layer 7 is formed. The packing of colored particles 6 in the air layer 7 is about 10% to about 30% by volume relative to the volume of the air layer 7. After packing of colored particles 6 in the air layer 7, the peripheral edge portions of the upper and lower substrates 1 and 2 are hermetically sealed with an epoxy adhesive or the like.

The underside of the upper substrate 1 is formed with a comb-shaped first electrode 3 having plural comb tooth portions 3a, and a rectangular second electrode 4 provided for each pixel and interposed between adjacent comb tooth portions 3a, 3a of the first electrode 3. The second electrode 4 is a transparent electrical conductor comprising ITO (Indium Tin Oxide) or a like material. In this embodiment, the width L1 of each comb tooth portion 3a of the first electrode 3 is 10 µm while the width L2 of the second electrode 4 is 50 µm. The spacing w1 between one comb tooth portion 3a of the first electrode 3 and second electrode 4 situated adjacent thereto is 5 µm. Such first electrodes 3 are joined with each other in the lateral direction of the display section 14, while such second electrodes 4 are electrically connected to each other in the longitudinal direction of the display section 14 via wiring not shown.

The upper side of the lower substrate 2 is formed with a reflecting layer 5 for reflecting light becoming incident from above. The reflecting layer 5 is a white layer comprising $TiO_2$ (titania), $Al_2O_3$ (alumina), or the like.

The reflecting layer 5 has an upper surface formed with a third electrode 8 shaped similar to the first electrode 3. The third electrode 8 and the first electrode 3 are disposed as superposed on each other in plan view.

The operation of the display device thus constructed according to this embodiment will be described below with reference to FIGS. 21 to 24B. In the display device 100 the control section 11 outputs control signals to the first electrode driver 12 and the second electrode driver 13, respectively, in accordance with an image signal inputted from an external device. As a result, the first electrode driver 12 applies a predetermined voltage to the first electrode 3, while, on the other hand, the second electrode driver 13 applies a voltage corresponding to the image signal to the second electrode 4 formed at each pixel in a manner timed to the application of voltage by the first electrode driver 12. This causes colored particles 6 in each pixel 15 to travel in the manner to be described later, thereby varying the light transmittance of each pixel 15 with respect to light to be reflected by the reflecting layer 5. As a result, the viewer observes an image corresponding to the image signal.

White display of each pixel 15 is realized as follows. In accordance with control signals outputted from the control section 11, the first electrode driver 12 and the second electrode driver 13 apply a negative voltage V1 and a positive voltage V2 to the first electrode 3 and the second electrode 4, respectively. In this case, the colored particles 6, which are positively charged as described above, are attracted by and adhere onto the first electrode 3 as shown in FIGS. 22A and 22B. Since the second electrode 4 comprises a transparent electrical conductor as described above, the white color of the reflecting layer 5 formed over the upper side of the lower substrate 2 is observed.

On the other hand, black display of each pixel 15 is realized as follows. In accordance with control signals outputted from the control section 11, the first electrode driver 12 and the second electrode driver 13 apply a positive voltage V5 and a negative voltage V6 to the first electrode 3 and the second electrode 4, respectively. In this case, the positively charged colored particles 6 are attracted by and adhere onto the second electrode 4 as shown in FIGS. 24A and 24B. As a result, the colored particles 6 which are colored black are observed.

Medium gray-level display of each pixel 15 is realized as follows. In accordance with control signals outputted from the control section 11, the first electrode driver 12, the second electrode driver 13 and the third electrode driver 16 apply a positive voltage V3, a negative voltage V2 and a negative voltage V4 to the first electrode 3, the second electrode 4 and the third electrode 8, respectively. In this case, positively charged colored particles 6 are attracted by and adhere onto the second and third electrode 4 and 8 and adhere thereto as shown in FIGS. 23A and 23B. As a result, the number of colored particles 6 adhering to the second electrode 4 is reduced as compared to the case of black display, thus realizing medium gray-level display.

When the display device according to this embodiment realized white display by applying −40 V and +40 V to the first electrode 3 and the second electrode 4, respectively, a reflection density of 0.4 was measured. When the display device realized medium gray-level display by applying +30 V, −30 V and −10 V to the first electrode 3, the second electrode 4 and the third electrode 8, respectively, a reflection density of 0.9 was measured. Further, when the display device realized black display by applying +40 V and −40V to the first electrode 3 and the second electrode 4, respectively, a reflection density of 1.4 was measured.

This embodiment is capable of controlling the number of colored particles 6 to be caused to adhere to the second electrode 4 easily and highly precisely by varying the value of voltage to be applied to each of the first, second and third electrodes 2, 4 and 8. For example, by varying the voltage to be applied to the third electrode 8 with the voltages to be applied to the respective first and second electrodes 2 and 4 kept constant, this embodiment is capable of realizing more precise gray scale control.

Embodiment 3-2

Figure 25A:
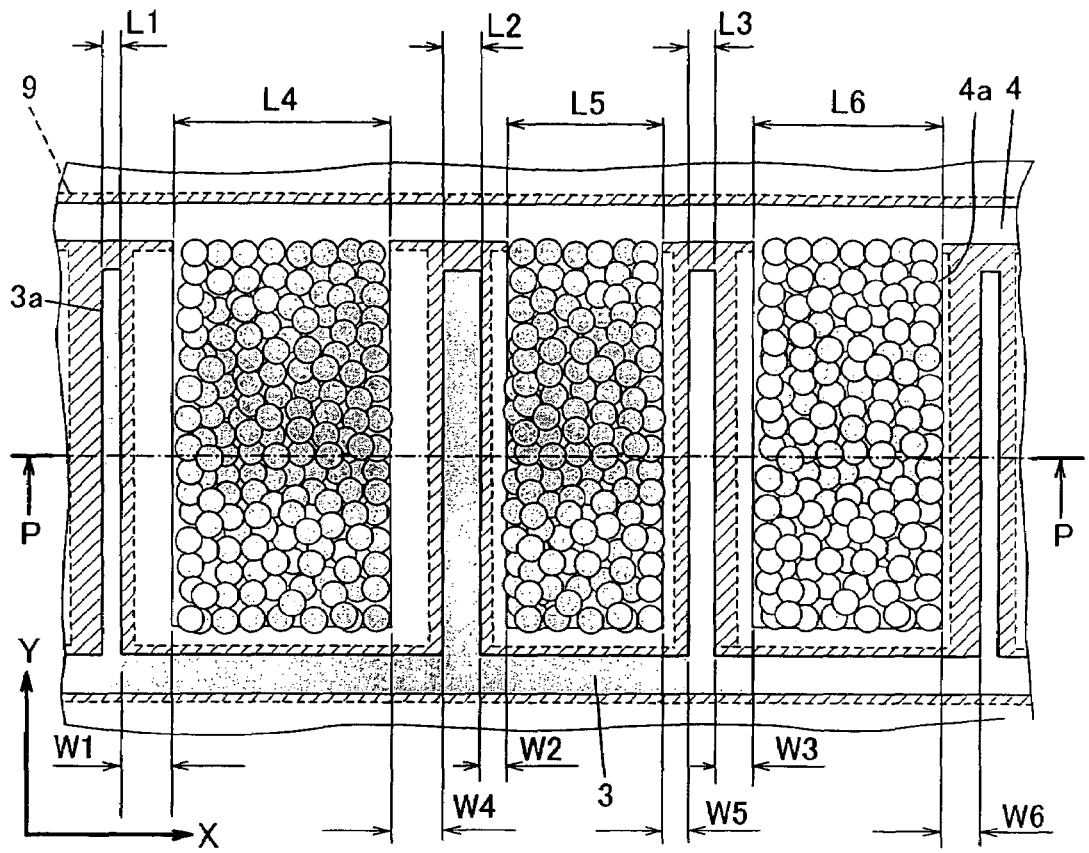
FIG. 25A is a see-through plan view illustrating an essential arrangement of a display section included in a display device according to embodiment 3-2 of the present invention.
Figure 25B:
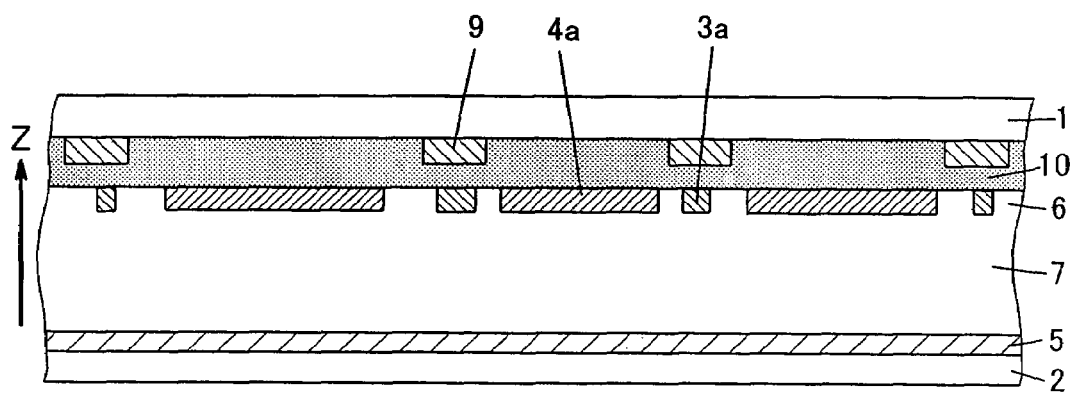
FIG. 25B is a sectional view taken on line P-P of FIG. 25A.

FIG. 25A is a see-through plan view illustrating an essential arrangement of display section 14 included in a display device according to embodiment 3-2 of the present invention; and FIG. 25B is a sectional view taken on line P-P of FIG. 25A. For convenience, colored particles are not illustrated in these figures. The display device according to this embodiment performs display using a set of three adjacent pixels as a unit (hereinafter referred to as "pixel set"). FIG. 25 illustrates an arrangement of one such pixel set.

As shown in FIGS. 25A and 25B, the display section 14 includes upper substrate 1, the underside of which is formed with a black matrix layer 10 having a black matrix 9 arranged in a lattice pattern extending along rows and columns of pixels arranged in a matrix.

The layer comprising the black matrix layer 10 has a lower surface formed with comb-shaped first electrode 3 having plural comb tooth portions 3a and comb-shaped second electrode 4 having plural comb tooth portions 4a. The first and second electrode 3 and 4 are transparent electrodes each comprising ITO or the like. The first and second electrodes 3 and 4 are arranged in such manner that the comb tooth portions 3a and the comb tooth portions 4b mesh with each other.

The comb tooth portions 3a located in one pixel set are different in width L1, L2, L3 from each other, as shown in FIGS. 25A and 25B. Similarly, the comb tooth portions 4a located in one pixel set are different in width L4, L5, L6 from each other. Further, the spacing W1, W2, W3, W4, W5, W6 between one comb tooth portion 3a and an adjacent comb tooth portion 4a is different from that between another comb tooth portion 3a and an adjacent comb tooth portion 4a in one pixel set.

Since other features of the display device according to this embodiment are similar to the corresponding features of embodiment 1-1, like reference characters are used to designate like or corresponding parts to omit description of such similar features.

In the display device thus constructed, different electric fields are generated in respective pixels even when the first and third electrodes 3 and 8 are applied with equal voltage throughout a pixel set. Accordingly, the three pixels constituting one pixel set have different gray scale characteristics.

When a pixel set consisting of three pixels is used as a unit of display, one pixel set has the following four display patterns:

(1) black display by all the three pixels;
(2) black display by two of the three pixels and white display by the remaining one pixel;
(3) black display by one of the three pixels and white display by the remaining two pixels; and
(4) white display by all the three pixels.

In each of the display patterns (2) and (3), the three pixels provide three display combinations. The display device according to this embodiment provides different gray-level displays in accordance with these three display combinations. Accordingly, the display device can realize display of eight gray levels, one belonging to each of the display patterns (1) and (4), three belonging to each of the display patterns (2) and (3).

In contrast, an arrangement where the comb tooth portions 3a have equal width L1, L2, L3, the comb tooth portions 4a have equal width L4, L5, L6 and the spacing W1, W2, W3, W4, W5, W6 between one comb tooth portion 3a and an adjacent comb tooth portion 4a is not varied, can provide only one gray level for each of the display patterns (1) to (4). Therefore, a display device having such an arrangement can provide display of only four gray levels.

Thus, the display device according to this embodiment is capable of realizing finer gray scale control than conventional by appropriately combining displays of the three pixels having different gray scale characteristics.

Embodiment 3-3

Figure 26:
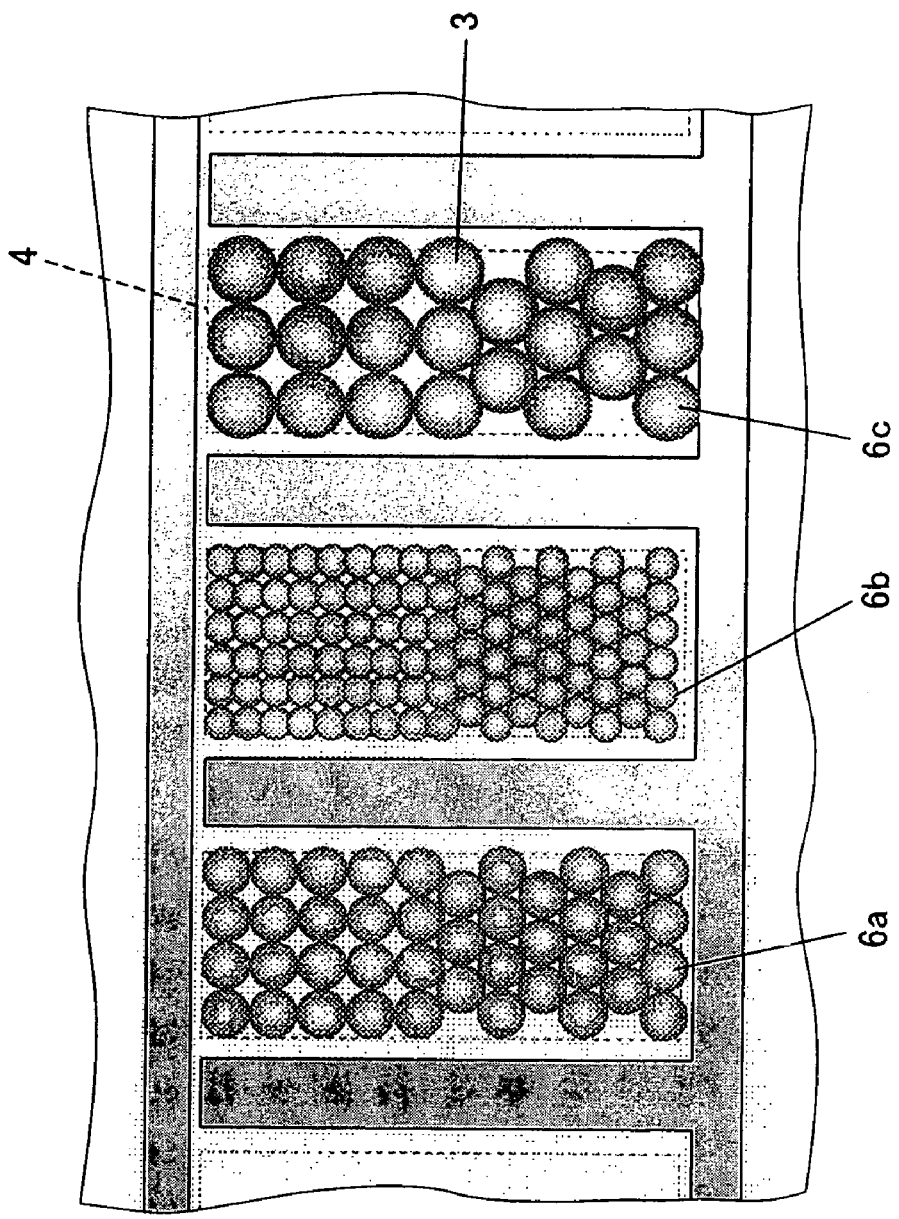
FIG. 26 is a see-through plan view illustrating an essential arrangement of a display section included in a display device according to embodiment 3-3 of the present invention in a black display operation.

FIG. 26 is a see-through plan view illustrating an essential arrangement of a display section included in a display device according to embodiment 3-3 of the present invention. Like embodiment 3-2, this embodiment performs display using a pixel set consisting of three adjacent pixels as a unit. FIG. 26 illustrates an arrangement of one such pixel set.

As shown in FIG. 26, the three pixels constituting one pixel set contains colored particles 6a, 6b and 6c, respectively, which are different in particle diameter from each other. The colored particles have increasing particle diameter in the order of 6b, 6a and 6c. Here, the average particle diameter of the colored particles 6a, 6b and 6c is preferably not less than 1 μm and not more than 10 μm.

Since other features of the display device according to this embodiment are similar to the corresponding features of embodiment 1-1, like reference characters are used to designate like or corresponding parts to omit description of such similar features.

In the display device thus constructed, when equal voltage is applied across first and second electrodes 3 and 4, colored particles 6a, 6b and 6c adhere to the first and second electrodes 3 and 4 differently; specifically, the number and arrangement of colored particles of one kind adhering to the first and second electrodes 3 and 4 are different from those of colored particles of another kind. Accordingly, the three pixels provide three displays having different gray scale characteristics. Thus, the display device according to this embodiment is capable of realizing finer gray scale control than conventional by appropriately combining displays of the three pixels having different gray scale characteristics.

Embodiment 3-4

A display device according to embodiment 3-4 provides color display, unlike the display devices according to embodiments 3-1 to 3-3 each providing black and white display.

Figure 27:
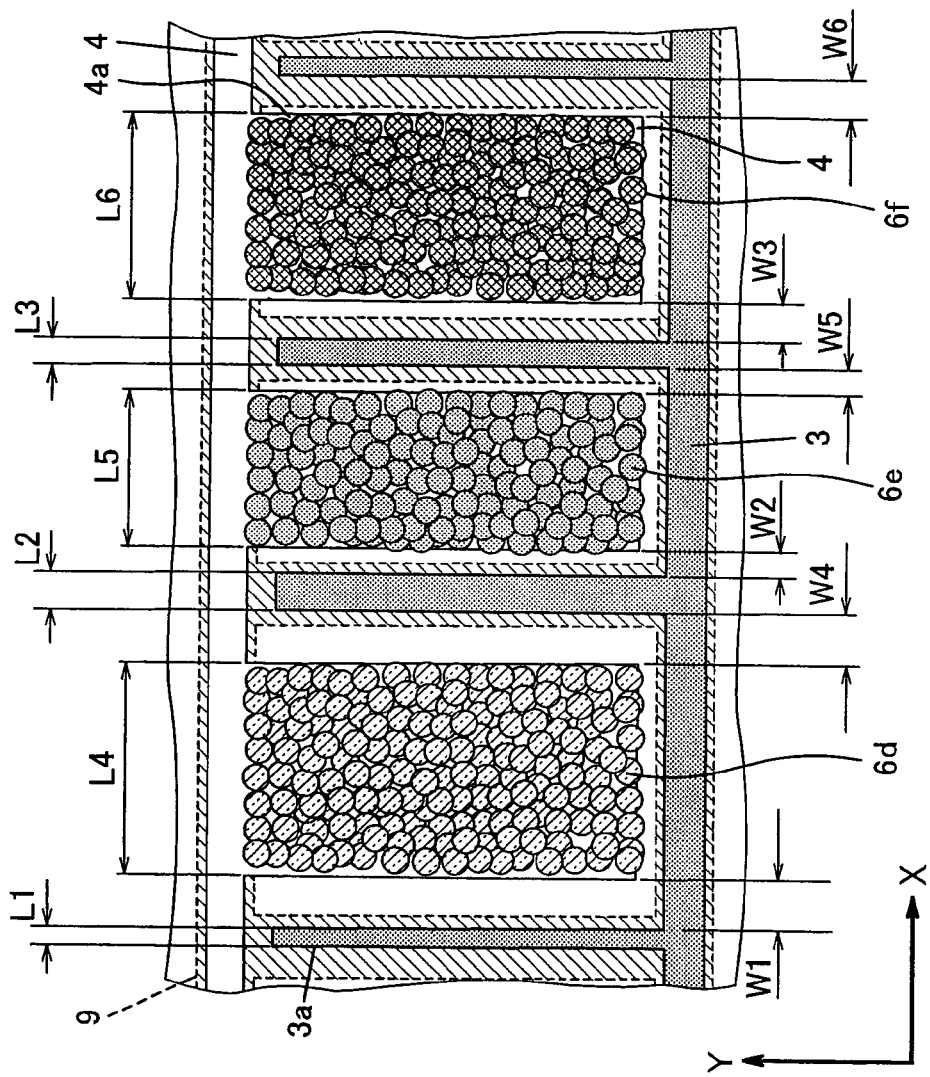
FIG. 27 is a see-through plan view illustrating an essential arrangement of a display section included in a display device according to embodiment 3-4 of the present invention.

FIG. 27 is a see-through plan view illustrating an essential arrangement of a display section included in the display device according to embodiment 3-4 of the present invention. Like embodiment 3-2, this embodiment performs display using a pixel set consisting of three adjacent pixels as a unit. FIG. 27 illustrates an arrangement of one such pixel set.

In FIG. 27, reference characters 6d, 6e and 6f designate blue particles, green particles and red particles, respectively. Accordingly, one pixel set consists of three pixels capable of displaying three colors, blue, green and red, respectively.

If such three-color particles are mixed in a single pixel, color display of good quality cannot be realized. For this reason, particles of each color are encapsulated in each of spaces separated with partition wall pixel by pixel, as shown in FIGS. 11A and 11B.

Other features of the display device according to this embodiment are similar to the corresponding features of embodiment 3-2. Specifically, comb tooth portions 3a located in one pixel set are different in width L1, L2, L3 from each other. Similarly, comb tooth portions 4a located in one pixel set are different in width L4, L5, L6 from each other. Further, the spacing W1, W2, W3, W4, W5, W6 between one comb tooth portion 3a and an adjacent comb tooth portion 4a is different from that between another comb tooth portion 3a and an adjacent comb tooth portion 4a in one pixel set.

Width L1-L6 and spacing W1-W6 are each thus varied because the three colors, red, blue and green are different in visibility from each other. Width L1-L6 and spacing W1-W6 are each varied so that the area for displaying blue, which is the lowest in visibility, is made largest, the area for displaying green, which is the highest in visibility, is made smallest.

In the display device according to this embodiment, width L1 of comb tooth portion 3a associated with a pixel for displaying blue is the smallest, width L3 of comb tooth portion 3a associated with a pixel for displaying red is intermediate and width L2 of comb tooth portion 3a associated with a pixel for displaying green is the largest. Width L4 of comb tooth portion 4a associated with the pixel for displaying blue is the largest, width L6 of comb tooth portion 4a associated with the pixel for displaying red is intermediate and width L5 of comb tooth portion 4a associated with the pixel for displaying green is the smallest. Further, spacing W1, W4 between comb tooth portion 3a and comb tooth portion 4a associated with the pixel for displaying blue is the largest, spacing W2, W5 between comb tooth portion 3a and comb tooth portion 4a associated with the pixel for displaying red is intermediate and spacing W3, W6 between comb tooth portion 3a and comb tooth portion 4a associated with the pixel for displaying green is the smallest.

With such an arrangement, the pixels for the respective colors, red, green and blue each have a gray scale characteristic suited to the optical property of each color and hence are capable of gray scale display efficiently. Thus, the display device according to this embodiment is capable of providing efficient color display of good quality having a remarkably improved gray scale characteristic as compared to color display provided by the prior art.

It is to be noted that highly efficient color display having an excellent gray scale property can be realized if particles of the three colors having different particle diameters are used to obtain gray scale characteristics suited to the respective optical properties of particles of the different colors.

While this embodiment uses particle groups of the three colors, red, blue and green for realizing color display, particle groups of three colors, cyan, magenta and yellow may be used.

Other Embodiments Included in Embodiment Group 3

As described above, the display devices according to embodiments 3-1 to 3-3 are of the passive-matrix drive type. However, these display devices may be turned into display devices of the active-matrix drive type, as in the case of other embodiments included in embodiment group 1.

Embodiment Group 4

Finally, description will be made of group 4 of preferred embodiments of display devices according to the present invention.

Embodiment 4-1

A display device according to embodiment 4-1 of the present invention is of the so-called "passive-matrix drive type". Since the construction and operation of the display device according to this embodiment are the same as in embodiment 1-1 except colored particles, description of common construction and operation is omitted. Hereinafter, the structure of each particle for use in the display device according to this embodiment will be described with reference to FIGS. 28 to 35.

Figure 28:
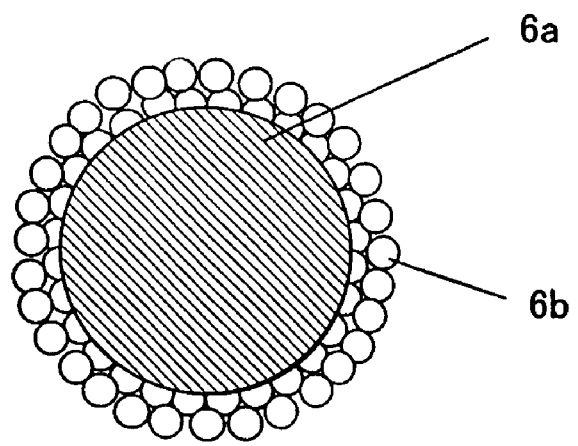
FIG. 28 is a sectional view schematically illustrating the structure of a particle for use in a display device according to embodiment 4-1 of the present invention.

FIG. 28 is a sectional view schematically illustrating the structure of a particle for use in a display device according to embodiment 4-1 of the present invention. As shown in FIG. 28, colored particle 6 comprises a parent particle 6a as a core, and plural child particles 6b fixed to the parent particle 6a in a manner to cover the surface thereof. Such colored particles 6 preferably have a small specific gravity and exhibit superior fluidity. With colored particles 6 each having such a composite structure comprising parent particle 6a and child particles 6b, van der Waals force working between colored particles 6 or between a substrate and colored particles 6 depends upon the particle diameter of child particles 6 in particular and, hence, the colored particles 6, as a whole, exhibit improved fluidity.

This embodiment uses a spherical acrylic particle having a diameter of 5 μm as parent particle 6a and spherical fine particles of silica each having a diameter of 16 nm as child particles 6b, fine silica particles being treated to have an electrostatic property so that colored particle 6, as a whole, has an electrostatic property. The material of parent particle 6a may be another resin such as styrene resin or melamine resin. Silica is used for child particles 6b because it can be treated so as to be electrostatically charged stably and heavily by a silane coupling agent.

This embodiment employs a method of preparing parent particles 6a, which comprises: allowing polymer particles dispersed in an aqueous medium not containing a swelling agent to absorb a monomer and an oil-soluble dye; and polymerizing the monomer thus absorbed. This method is capable of preparing monodisperse parent particles 6a having a uniform particle diameter.

Since parent particle 6a is formed from resin, parent particle 6a has a true specific gravity as small as 1.2 g/cm$^3$ and a low softening point. On the other hand, child particle 6b has a true specific gravity of 2.1 g/cm$^3$, which is larger than that of parent particle 6a. However, the ratio of child particles 6b blended with parent particles 6a is low, which results in small influence on colored particles 6 as a whole. Further, child particle 6b having a higher softening point than parent particle 6a can be fixed to parent particle 6a easily by a mechanochemical process or a like process.

In this embodiment, child particles 6b were fixed to each parent particle 6a in a manner to cover the entire surface thereof by a dry impact blending method, which a kind of mechanochemical process. The ratio of parent particles 6a:child particles 6b blended for the entire surface of each parent particle 6a to be covered with child particles 6b ranged from 100:3 to 100:5 by weight, which is slightly higher than a theoretical blending ratio. The "theoretical blending ratio", as used herein, is a value calculated based on the assumption that the entire surface of each parent particle 6a is covered with a single layer of child particles 6b. The actual blending ratio was set slightly higher than the theoretical blending ratio because the dry impact blending method has limitations in forming a uniform layer of child particles 6b and, hence, it is difficult to cover the entire surface of each parent particle 6a with a single layer of child particles 6b.

Colored particles 6 each having such a structure as to cover the entire surface of each parent particle 6a with child particles 6b as in this embodiment exhibited a remarkably improved humidity resistance characteristic as compared to acrylic polymer toner with no coverage with child particles for use in prior art display devices. Specifically, when the humidity increased from 50% to 90%, the amount of electrostatic charge carried on the polymer toner decreased 55% from the initial amount, whereas the amount of electrostatic charge carried on the composite particles used in this embodiment decreased not more than about 15%.

For this reason, the resin film used for each of the upper and lower substrates 1 and 2 does not require any special moisture-proofing treatment and, hence, it is possible to use an inexpensive commercially-available film such as PET film for such substrates.

Figure 34:
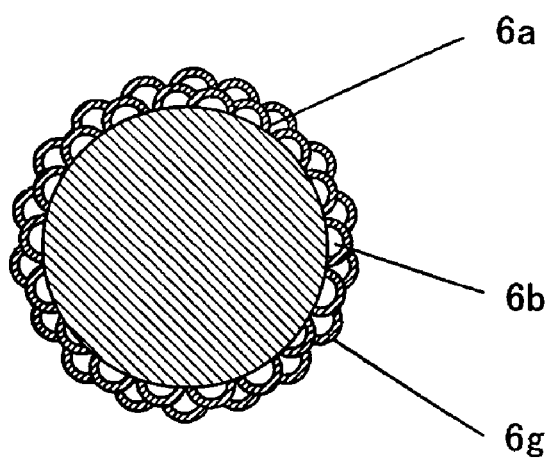
FIG. 34 is a sectional view schematically illustrating the structure of a colored particle prepared by using child particles obtained by wet milling.

Desirable methods for treating child particles 6b to have an electrostatic property include a method utilizing wet milling in which child particles 6b are wet-milled with a mill using a milling medium which is loaded with a surface-treating agent and beads as the milling medium. FIG. 34 is a sectional view schematically illustrating the structure of colored particle 6 prepared by using such child particles 6b obtained by wet milling. In FIG. 34, reference character 6g designates an electrostatically charged film formed using a silane coupling agent or the like as the surface-treating agent.

This method is capable of treating child particles 6b in a monodisperse state to have an electrostatic property and, hence, child particles 6b can be electrostatically charged particle by particle. Therefore, there is no possibility of occurrence of an inconvenience such that an aggregate of child particles 6 having been treated to have an electrostatic property is milled to expose untreated surfaces of child particles 6b.

While black colored particles 6 are treated so as to be positively charged in this embodiment, it is needless to say that they may be negatively charged.

The structure of colored particle 6 employed in this embodiment is also effective in conventional display devices of the so-called "vertical field type". In this case white particles are needed in addition to black colored particles 6. That is, the particles to be used comprise two particle groups comprising different kinds of particles, respectively. In the case where the particles to be used comprise two particle groups of different kinds, it is sufficient that particles of only one of the two groups have a composite structure in which child particles are fixed to each parent particle as in this embodiment. This is because if both of the two particle groups are made to have such a composite structure, electrostatic attractive force exerts larger influence than van der Waals force when one particle group and the other particle group are positively charged and negatively charged, respectively, which results in an inconvenience that aggregation of particles occurs more easily.

Among possible arrangements each comprising two particle groups of different kinds, an arrangement in which black particles each have a composite structure using negatively charged child particles and white particles that are neither covered with child particles nor treated to have an electrostatic property, is capable of image display of good quality with less likelihood of aggregation of particles.

One method of preparing such white particles, which can be employed here, comprises dispersing a pigment in an acrylic monomer and then polymerizing the monomer. When titanium oxide ($TiO_2$) particles having an average particle diameter ranging from 200 nm to 400 nm are used as child particles to be fixed to the surface of each white parent particle, resulting particles show an idealistic white color by virtue of light scattering effect of titanium oxide even if the parent particles are colorless and transparent. Thus, white particles having improved fluidity can be obtained easily.

In the case where parent particles to be used are originally colored and hence do not need to be colored with child particles, the cohesive force of particles can be minimized by using child particles having an average particle diameter not less than 10 nm and not more than 20 nm from the equation of van der Waals force and, hence, the driving voltage of the display device can be lowered.

When the particles to be used are designed to have improved fluidity with great importance attached to the reflectance thereof, it is desirable that each white particle be not covered with child particles but entirely coated with a first coating layer comprising an opaque material which does not allow light to pass therethrough.

Figure 35:
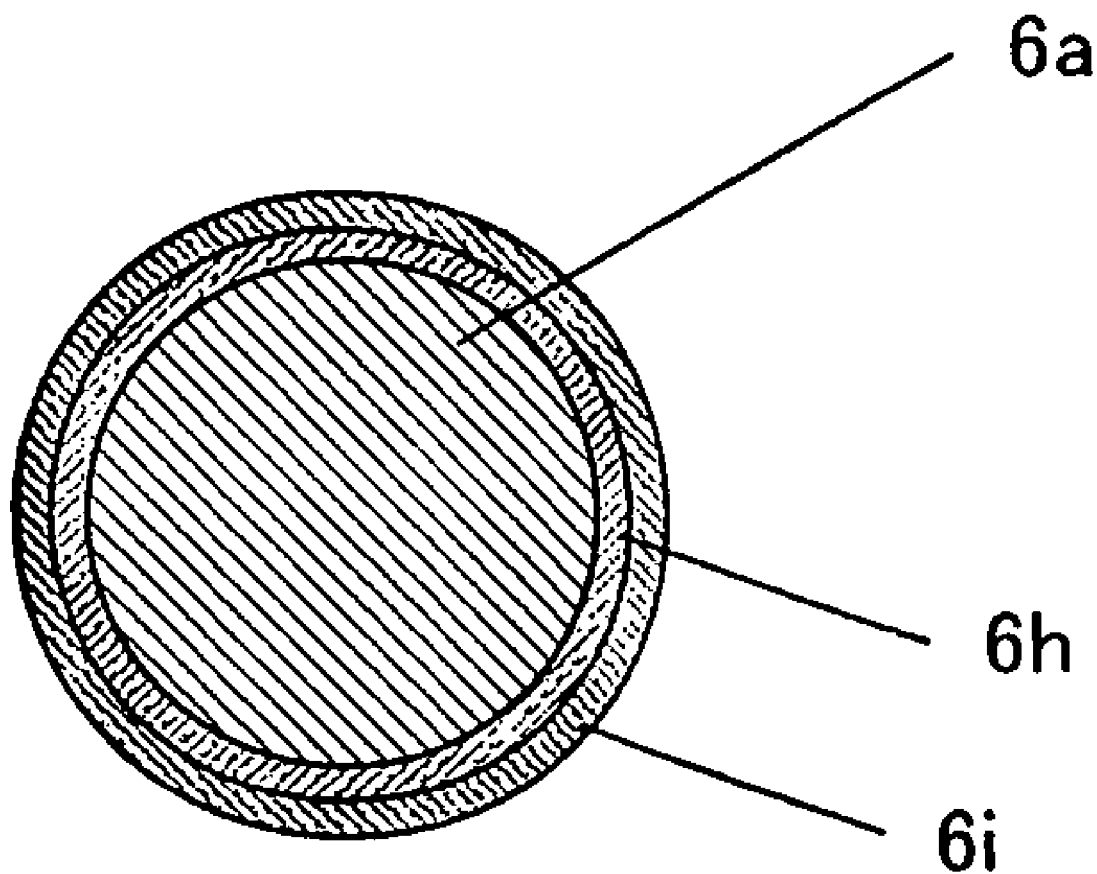
FIG. 35 is a sectional view schematically illustrating the structure of another type of particle for use in the display device according to embodiment 4-1 of the present invention.

FIG. 35 is a sectional view schematically illustrating the structure of another type of particle for use in the display device according to embodiment 4-1 of the present invention. In FIG. 35, reference character 6h designates white first coating layer comprising aluminum, titanium or the like which is formed to cover the entire surface of each parent particle 6a and reference character 6i designates a second coating layer formed to cover the entire surface of the first coating layer 6h using a silane coupling agent or the like. When each parent particle is thus coated with a metal film having dense texture, it is possible to provide a display device exhibiting high reflectance with reduced loss of reflected light as compared to a display device using particles each having a structure in which a parent particle is covered with child particles.

Embodiment 4-2

A display device according to embodiment 4-2 uses colored particles imparted with electrical conductivity. Since other features of the display device according to this embodiment are similar to the corresponding features of embodiment 4-1, description thereof is omitted.

Figure 29:
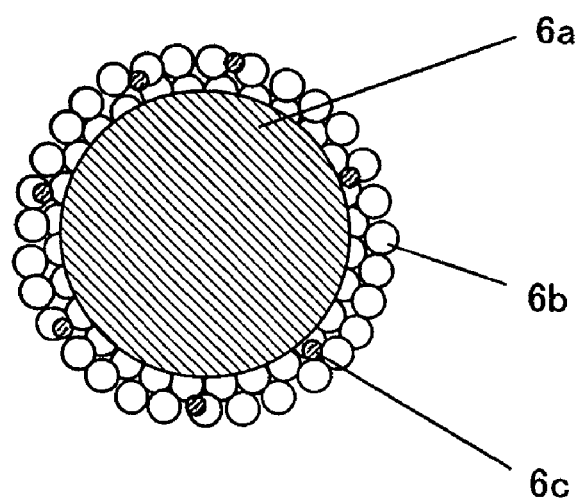
FIG. 29 is a sectional view schematically illustrating the structure of a particle for use in a display device according to embodiment 4-2 of the present invention.

FIG. 29 is a sectional view schematically illustrating the structure of a particle for use in the display device according to embodiment 4-2 of the present invention. As shown in FIG. 29, colored particle 6 comprises a parent particle 6a as a core, plural child particles 6b fixed to the parent particle 6a in a manner to cover the surface thereof, and electrical conductive particles 6c comprising metal powder such as of chrome scattered among child particles 6b. Colored particle 6 thus added with electrical conductive particles 6c has an electrostatic property as well as electrical conductivity as a whole.

Like embodiment 4-1, this embodiment uses spherical acrylic particles each having a diameter of 5 μm as parent particles 6a and spherical fine particles of silica each having a diameter of 16 nm as child particles 6b, the fine silica particles being treated to have an electrostatic property.

Also, like embodiment 4-1, this embodiment employed a dry impact blending method to fix child particles 6b to each parent particle 6a. The blending ratio of parent particles 6a:child particles 6b for the entire surface of each parent particle 6a to be covered with child particles 6b ranged from 100:3 to 100:5 by weight, which is slightly higher than a theoretical blending ratio.

The amount of electrical conductive particles 6c added ranges from 0.1% to 1% by weight of parent particles 6a. Addition of too much electrical conductive particles 6c is likely to cause short circuit to occur between first electrode 3 and second electrode 4 and is therefore not preferable.

By thus imparting colored particles 6 with some electrical conductivity, colored particles 6 can be prevented from being charged up due to accumulation of too much electrostatic charge.

Embodiment 4-3

A display device according to embodiment 4-3 uses colored particles each comprising a parent particle having plural layers. Since other features of the display device according to this embodiment are similar to the corresponding features of embodiment 4-1, description thereof is omitted.

Figure 30A:
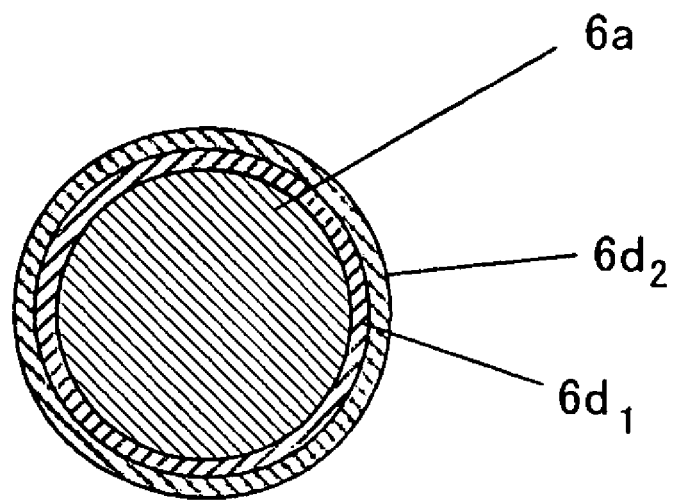
FIG. 30A is a sectional view schematically illustrating the structure of a parent particle for use in a display device according to embodiment 4-3 of the present invention.

FIG. 30A is a sectional view schematically illustrating the structure of a parent particle forming a particle for use in the display device according to embodiment 4-3 of the present invention. As shown in FIG. 30A, parent particle 6a as a core comprises a melamine resin and the entire surface thereof is coated with first coating layer $6d_1$, comprising a silica film. Further, the entire surface of the first coating layer $6d_1$, is coated with second coating layer $6d_2$ comprising the same melamine resin as parent particle 6a. Here, the second coating layer $6d_2$ desirably has a thickness about a half of the diameter of each child particle 6b to be described later.

In fixing child particles 6b to each parent particle 6a in a manner to cover the entire surface thereof by the dry impact blending method, too long processing time at increased rotary speed will cause parent particles 6a to soften too much, which may result in a phenomenon that child particles 6b are buried into each parent particle 6a. Once such a phenomenon has occurred, the effect of improving the fluidity of colored particles 6 cannot be obtained. On the other hand, too short processing time at decreased rotary speed will raise a problem that child particles 6b are fixed to each parent particle 6a insufficiently.

To avoid such problems, this embodiment employs the dry impact blending method to fix child particles 6b onto the entire surface of second coating layer $6d_2$ covering each parent particle 6a and first coating layer $6d_1$, as shown in FIG. 30A.

Figure 30B:
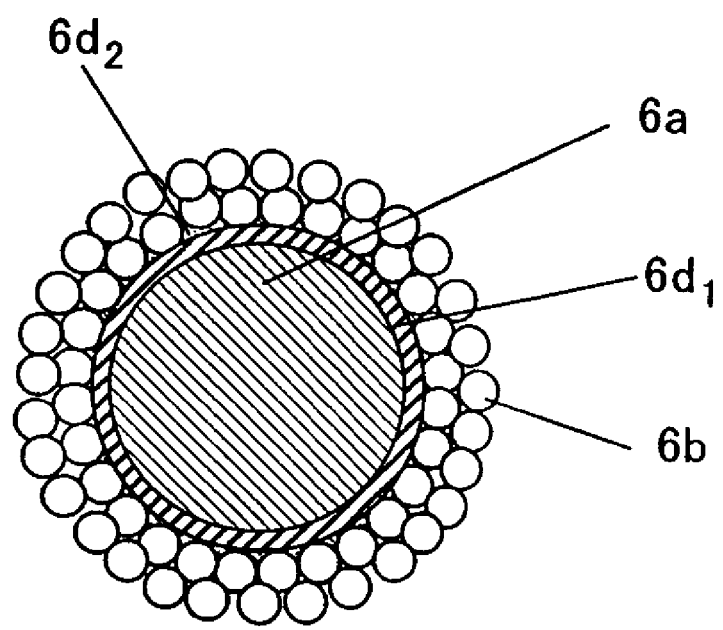
FIG. 30B is a sectional view schematically illustrating the structure of a particle for use in the display device according to embodiment 4-3 of the present invention.

FIG. 30B is a sectional view schematically illustrating the structure of a particle for use in the display device according to embodiment 4-3 of the present invention. As shown in FIG. 30B, child particles 6b are not buried into the first coating layer $6d_1$, since the first coating layer $6d_1$, has a higher softening point than the child particles 6b. Further, since the second coating layer $6d_2$ has a lower softening point than the child particles 6b, the child particles 6b are fixed to parent particle 6a while remaining at the surface layer of the second coating layer $6d_2$.

Thus, composite particles having high fluidity can be obtained even when the dry impact blending conditions have respective relatively wide ranges.

Embodiment 4-4

A display device according to embodiment 4-4 uses colored particles 6 each comprising parent particle 6a having a porous or hollow structure. Since other features of the display device according to this embodiment are similar to the corresponding features of embodiment 4-1, description thereof is omitted.

When particles, as a whole, have a smaller specific gravity, the particles exhibit improved fluidity and hence cause lower frictional resistance to occur during their travel while requiring smaller kinetic energy for their travel. Accordingly, a display device using such particles is capable of image display at a higher response speed while being driven at a lower voltage.

For the specific gravity of colored particles to be reduced, various forms of particle can be conceived including a colored particle having a porous parent particle, a colored particle rendered hollow, and the like.

Figure 31:
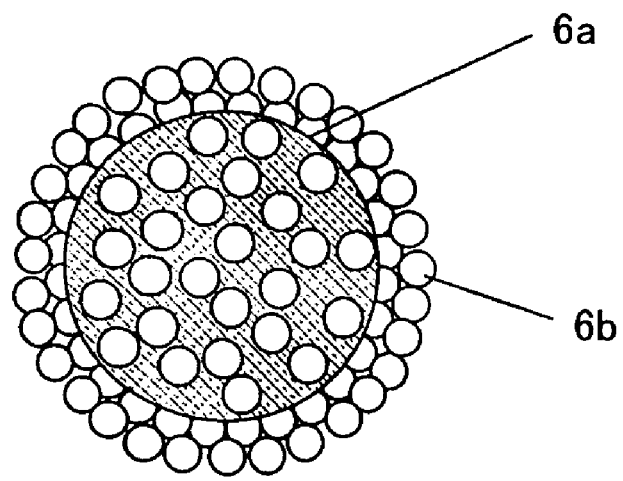
FIG. 31 is a sectional view schematically illustrating the structure of a particle for use in a display device according to embodiment 4-4 of the present invention.
Figure 32:
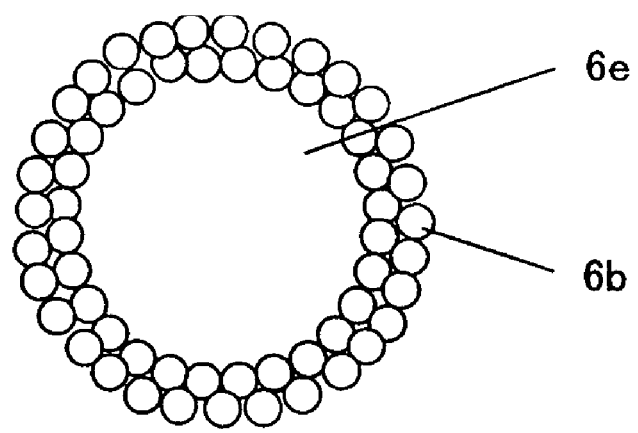
FIG. 32 is a sectional view schematically illustrating the structure of a particle for use in the display device according to embodiment 4-4 of the present invention.

FIGS. 31 and 32 are each a sectional view schematically illustrating the structure of a particle for use in the display device according to embodiment 4-4 of the present invention. When porous parent particle 6a as shown in FIG. 31 is used, the specific gravity of parent particle 6a can be reduced with increasing number of pores. Alternatively, when each colored particle 6 has a hollow 6e as shown in FIG. 32, the specific gravity of each colored particle 6 can be reduced further. An exemplary process for rendering each colored particle 6 hollow includes fixing child particles 6b to parent particle 6a in the manner as in embodiment 4-1 and then dissolving the parent particle 6a by means of a solvent to form hollow 6e.

Embodiment 4-5

A display device according to embodiment 4-5 uses particles each comprising a composite particle and an additional layer. Since other features of the display device according to this embodiment are similar to the corresponding features of embodiment 4-1, description thereof is omitted.

Figure 33:
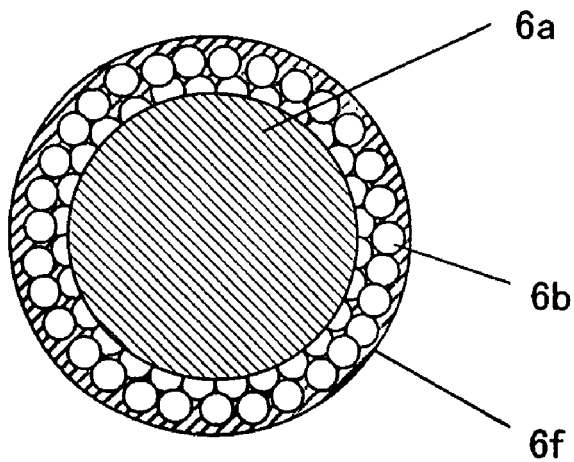
FIG. 33 is a sectional view schematically illustrating the structure of a particle for use in a display device according to embodiment 4-5 of the present invention.

FIG. 33 is a sectional view schematically illustrating the structure of a particle for use in the display device according to embodiment 4-5 of the present invention. As shown in FIG. 34, plural child particles 6b are fixed to parent particle 6a in a manner to cover the entire surface thereof and a water-repellent film 6f is further formed to cover the plural child particles 6b. For colored particle 6 to have such a structure, it is sufficient to fix child particles 6b to parent particle 6a in the same manner as in embodiment 4-1 and then form water-repellent film 6f comprising a monomolecular fluorine film to cover the child particles 6b.

When colored particle 6 is thus structured, the water-repellent film 6f acts to make liquid-state moisture difficult to exert its bridging force on colored particles 6. For this reason, the possibility of mutual adhesion between colored particles 6, adhesion between colored particles 6 and the substrates, and the like is lowered, whereby the occurrence of an event such that application of an electric field cannot cause colored particles to travel can be inhibited. This contributes to improvements in reflectance and contrast.

Though this embodiment uses the water-repellent film 6f comprising a monomolecular fluorine film, a hydrophobic film treated with a silane coupling agent or the like may be used instead of the water-repellent film 6f.

Other Embodiments Included in Embodiment Group 4

As described above, the display devices according to embodiments 4-1 to 4-5 are of the passive-matrix drive type. However, these display devices may be turned into display devices of the active-matrix drive type, as in the case of other embodiments included in embodiment group 1.

While the foregoing display devices according to embodiments 4-1 to 4-5 are each configured to utilize a horizontal electric field by using in-plane electrodes as the electrodes for driving composite colored particles 6 each comprising parent particle 6a and child particles 6b, the same effect as obtained by these display devices will be obtained when a configuration for utilizing a vertical electric field by using first electrode 3 and second electrode 4 that are formed on upper substrate 1 and lower substrate 2, respectively, is applied to any one of embodiments 4-1 to 4-5.

A single kind of particles, i.e. black particles are used as colored particles 6 in each of foregoing embodiments. The same effect as obtained by the above-described display devices can be obtained even when two kinds of particles, i.e. black and white, or plural kinds of particles, e.g. red, green and blue are used.

For example, even when a white particle is used as parent particle 6a, use of spherical fine particles of $TiO_2$ having a favorable white color characteristic as child particles 6b will make it possible to further improve the color characteristic of the device.

Color display can be realized by combining these differently colored particles. However, it is needless to say that the provision of color filters for the three primary colors of light or the provision of other components will make it possible to realize color display.

The embodiments included in embodiment groups 1 to 4 according to the present invention have been described. Various forms of display device can be realized by combining some of these embodiments appropriately depending on applications or the like of the display device.

As has been described above, the display device of the present invention is useful as a thin flexible display device.

While only certain presently preferred embodiments of the present invention have been described in detail, as will be apparent for those skilled in the art, various modifications and other variations can be made in embodiments without departing from the spirit and scope of the present invention as defined by the following claims.

What is claimed is:

1. A display device comprising:
    a pair of substrates disposed opposite to each other, at least one of which is transparent;
    a plurality of particles having an electrostatic property contained in a gaseous phase provided between the pair of substrates;
    first and second electrodes provided for each of pixels arranged in a matrix for driving the particles; and
    a voltage applying portion for applying voltage to the first and second electrodes in accordance with an image signal, wherein:
    the particles each comprise a parent particle as a core, and plural child particles fixed to the parent particle in a manner to cover a substantially entire surface of the parent particle; and
    when voltage is applied to the first and second electrodes by the voltage applying portion, the particles are caused to travel between the first and second electrodes in accordance with the voltage applied so as to display an image corresponding to the image signal.

2. The display device in accordance with claim 1, wherein the plurality of particles comprise two kinds of particles which are electrostatically charged to have different polarities, at least one of the two kinds of particles comprising a parent particle as a core, and plural child particles fixed to the parent particle in a manner to cover a substantially entire surface of the parent particle.

3. A display device comprising:
    a pair of substrates disposed opposite to each other, at least one of which is transparent;
    a plurality of particles having an electrostatic property contained in a gaseous phase provided between the pair of substrates;
    first and second electrodes provided for each of pixels arranged in a matrix for driving the particles; and
    a voltage applying portion for applying voltage to the first and second electrodes in accordance with an image signal, wherein:
    the particles each comprise a parent particle as a core, a first coating layer coating an entire surface of the parent particle and comprising a material having a higher softening point than that of the parent particle, a second coating layer coating an entire surface of the first coating layer and comprising the same material as that of the parent particle or a material having a lower softening point than that of the parent particle, and plural child particles fixed to the second coating layer in a manner to cover a substantially entire surface of the second coating layer; and
    when voltage is applied to the first and second electrodes by the voltage applying portion, the particles are caused to travel between the first and second electrodes in accordance with the voltage applied so as to display an image corresponding to the image signal.

4. The display device in accordance with claim 1, wherein the parent particle has a smaller specific gravity and a lower softening point than the child particles.

5. The display device in accordance with claim 1, wherein either or both of the parent particle and the child particles are spherical.

6. The display device in accordance with claim 1, wherein the child particles each comprise a fine particle of silica surface-treated to have an electrostatic property.

7. The display device in accordance with claim 1, wherein the child particles are colored particles.

8. The display device in accordance with claim 1, wherein the child particles are wet-milled by a mill using a milling medium to be stirred, the mill being loaded with a surface-treating agent and beads as the milling medium.

9. The display device in accordance with claim 1, wherein the child particles are titanium oxide particles having an average particle diameter not less than 200 nm and not more than 400 nm.

10. The display device in accordance with claim 2, wherein one of the two kinds of particles comprises black particles and negatively charged child particles are adhering to the black particles exclusively.

11. The display device in accordance with claim 1, wherein the child particles are silica particles having an average particle diameter not less than 10 nm and not more than 20 nm.

12. A display device comprising:
    a pair of substrates disposed opposite to each other, at least one of which is transparent;
    a plurality of particles having an electrostatic property contained in a gaseous phase provided between the pair of substrates;
    first and second electrodes provided for each of pixels arranged in a matrix for driving the particles; and
    a voltage applying portion for applying voltage to the first and second electrodes in accordance with an image signal, wherein:
    the particles each comprise a parent particle as a core, a first coating layer coating an entire surface of the parent particle and comprising an opaque material which does not allow light to pass therethrough, and a second coating layer coating an entire surface of the first coating layer and comprising an insulating material; and when voltage is applied to the first and second electrodes by the voltage applying portion, the particles are caused to travel between the first and second electrodes in accordance with the voltage applied so as to display an image corresponding to the image signal.

* * * * *